United States Patent
Collins et al.

(10) Patent No.: US 12,347,831 B2
(45) Date of Patent: Jul. 1, 2025

(54) ENERGY STORAGE METHOD USING ALUMINUM OXIDE PROTECTED LITHIUM METAL TUNABLE 3D SILICON BATTERIES

(71) Applicant: International Business Machines Corporation, Armonk, NY (US)

(72) Inventors: John Collins, Tarrytown, NY (US); Stephen W. Bedell, Wappingers Falls, NY (US); John Ott, Greenwood Lake, NY (US); Devendra K. Sadana, Pleasantville, NY (US)

(73) Assignee: International Business Machines Corporation, Armonk, NY (US)

( * ) Notice: Subject to any disclaimer, the term of this patent is extended or adjusted under 35 U.S.C. 154(b) by 612 days.

(21) Appl. No.: 16/908,103

(22) Filed: Jun. 22, 2020

(65) Prior Publication Data
US 2021/0399346 A1 Dec. 23, 2021

(51) Int. Cl.
*H01M 10/0585* (2010.01)
*H01M 4/1391* (2010.01)
(Continued)

(52) U.S. Cl.
CPC ..... *H01M 10/0585* (2013.01); *H01M 4/1391* (2013.01); *H01M 10/0525* (2013.01); *H01M 10/054* (2013.01); *H01M 10/0565* (2013.01)

(58) Field of Classification Search
CPC ............ H01M 4/1391; H01M 4/0445; H01M 4/0459; H01M 4/1395; H01M 4/134;
(Continued)

(56) References Cited

U.S. PATENT DOCUMENTS

| 6,900,114 B2 | 5/2005 | Ohmi et al. |
| 7,368,332 B2 | 5/2008 | Moriwaki et al. |

(Continued)

FOREIGN PATENT DOCUMENTS

| WO | WO2011156419 A2 | 12/2011 |
| WO | WO2017/093074 | 11/2016 |

(Continued)

OTHER PUBLICATIONS

Xiaogang Han et al.; "Negating interfacial impedance in garnet-based solid-state Li metal batteries"; Xiaogang Han, Yunhul Gong, Kun (Kelvin) Fu, Xingfeng He, Gregory T. Hitz, Jiaqi Dai, Alex Pearse, Boyang Liu, Howard Wang, Gary Rubloff, Yifel Mo, Venkataraman Thangadural, Eric D. Wachsman, and Liangbing Hu; "Nature Materials" Published online: Dec. 19, 2016, DOI:10.1038/NMAT 4821.

(Continued)

*Primary Examiner* — Jonathan G Leong
*Assistant Examiner* — Katharine A Caughron
(74) *Attorney, Agent, or Firm* — Kelsey Skodje

(57) ABSTRACT

One or more trenches in a silicon substrate have an electrically active surface at a trench base and metal layer disposed on the electrically active surface. Precursor materials are disposed and/or formed on the metal layer in the trench. An anode is patterned either exclusively in the 3D trench or in the 3D trench, sidewalls and field of the substrate, where the anode patterning transforms and/or moves the precursor materials in the trench into some novel compositions of matter and other final operational structures for the device, e.g. layers of metallic Lithium for energy storage and different concentrations of Lithium-silicon species in the substrate. A multi-faceted mechanism is disclosed for Al2O3 silicon interfacial additives. When the anode is patterned both in and outside the 3D wells, Al2O3 provides an for (Continued)

electron-conductive Li-metal interface that enables homogenous plating on both the insulated substrate field as well as active silicon trench base where Al2O3 acts as a barrier to Li—Si diffusion. When the anode is patterned only in the 3D trench, Al2O3 additive creates a robust, flexible, Li-permeable interface upon charge cycling, which preserves the 3D textured structure of the porous silicon anode. Additionally, the Al2O3 additive is mobilized deeper into the bulk silicon in parallel with Li+ and a conductive plasticizer upon progressive cycling—where the lithiated Al2O3 particles nucleate at defect sites and prevent mechanical degradation of the silicon anode through a combined bridge and spacer mechanism. By selecting different defined anode patterns to deposit on the 3D substrate, final operational characteristics, properties, structures, and charge storage performance for the device can be predictably designed and manufactured.

20 Claims, 34 Drawing Sheets

(51) Int. Cl.
  *H01M 10/0525* (2010.01)
  *H01M 10/054* (2010.01)
  *H01M 10/0565* (2010.01)

(58) Field of Classification Search
  CPC ........ H01M 4/386; H01M 4/62; H01M 4/131; H01M 4/0447; H01M 4/366; H01M 4/382; H01M 10/0585; H01M 10/0525; H01M 10/054; H01M 10/0565; H01M 10/0436; H01M 10/058; H01M 50/116; H01M 2004/021; Y02E 60/10; Y02P 70/50
  See application file for complete search history.

(56) References Cited

U.S. PATENT DOCUMENTS

| | | | |
|---|---|---|---|
| 8,889,295 B2 | 11/2014 | Yushin et al. | |
| 9,142,833 B2 | 9/2015 | Tolbert et al. | |
| 9,327,472 B1 | 5/2016 | Zehavi et al. | |
| 10,193,135 B2 | 1/2019 | Sharma et al. | |
| 10,403,889 B2 | 9/2019 | Peled et al. | |
| 10,581,109 B2 | 3/2020 | de Souza et al. | |
| 10,644,356 B2 | 5/2020 | de Souza et al. | |
| 10,777,842 B2 | 9/2020 | de Souza et al. | |
| 10,833,301 B2 | 11/2020 | Collins | |
| 11,031,631 B2 | 6/2021 | Collins | |
| 11,233,288 B2 | 1/2022 | Collins | |
| 2011/0183186 A1* | 7/2011 | Klootwijk | H01M 6/40 29/623.5 |
| 2014/0011088 A1* | 1/2014 | Lopatin | H01M 4/386 429/211 |
| 2014/0272547 A1* | 9/2014 | Ramasubramanian | H01M 10/0585 429/246 |
| 2015/0004485 A1 | 1/2015 | Chen et al. | |
| 2016/0164134 A1* | 6/2016 | Forster | H01M 10/0436 29/623.5 |
| 2017/0098823 A1 | 4/2017 | Yushin et al. | |
| 2017/0104224 A1* | 4/2017 | Hahn | H01M 10/0463 |
| 2017/0214083 A1* | 7/2017 | Darolles | H01M 4/662 |
| 2018/0076452 A1* | 3/2018 | Sasaki | C01G 45/006 |
| 2019/0006664 A1 | 1/2019 | Kano et al. | |
| 2019/0044151 A1 | 2/2019 | Elam et al. | |
| 2019/0115625 A1 | 4/2019 | Sadana et al. | |
| 2019/0207251 A1 | 7/2019 | Choi et al. | |
| 2019/0214082 A1 | 7/2019 | Li et al. | |
| 2019/0319242 A1 | 10/2019 | Dadheech et al. | |
| 2020/0014058 A1 | 1/2020 | de Souza et al. | |
| 2020/0014060 A1 | 1/2020 | de Souza et al. | |
| 2020/0020895 A1 | 1/2020 | Collins et al. | |
| 2020/0212492 A1 | 7/2020 | Collins et al. | |
| 2020/0335826 A1 | 10/2020 | Collins et al. | |
| 2020/0014018 A1 | 11/2020 | de Souza et al. | |
| 2020/0014059 A1 | 11/2020 | de Souza et al. | |
| 2020/0395628 A1 | 12/2020 | Collins et al. | |
| 2020/0403190 A1 | 12/2020 | Collins et al. | |
| 2021/0151719 A1 | 5/2021 | Collins et al. | |
| 2021/0265606 A1 | 8/2021 | Dang et al. | |
| 2021/0273230 A1* | 9/2021 | Van Den Ham | H01M 4/0416 |
| 2021/0399275 A1 | 12/2021 | Collins et al. | |

FOREIGN PATENT DOCUMENTS

| | | |
|---|---|---|
| WO | WO2019077426 A1 | 4/2019 |
| WO | WO2020008285 A1 | 1/2020 |

OTHER PUBLICATIONS

Liping Wang et al.; "Long lifespan lithium metal anodes enabled by Al2O3 sputter coating"; Liping Wang, Lei Zhang, Qingji Wang, Wenjun Li, Bo Wu, Weishang Jia, Yuehui Wang, Jingze Li, Hong Li; "Energy Storage Materials" vol. 10, Jan. 2018, pp. 16-23, available at ScienceDirect.

N. E. Preobrazhenshiy et al.; "Anodes for Li-Ion Batteries Based on p-Si with Self-Organized Macropores"; N. E. Preobrazhenskiy*, E. V. Astrova, S. I. Pavlov, V. B. Voronkov, A. M. Rumyantsev, and V. V. Zhdanov; "Physics of Semiconductor Devices"; ISSN 1063-7826, Semiconductors, 2017, vol. 51, No. 1, pp. 78-87. © Pleiades Publishing, Ltd., 2017. Original Russian Text © N.E. Preobrazhenskiy, E.V. Astrova, S.I. Pavlov, V.B. Voronkov, A.M. Rumyantsev, V.V.

Maria Helena Braga et al.; "Nontraditional, Safe, High Voltage Rechargeable Cells of Long Cycle Life"; Maria Helena Braga, Chandrasekar M. Subramaniyam, Andrew J. Murchison, and John B. Goodenough; J. A. Chem. Soc. 2018 140, 6343-6352.

Zheng Liang et al. "Polymer Nanofiber-Guided Uniform Lithium Deposition for Battery Electrodes"; Zheng Liang, Guangyuan Zheng, Chong Liu, Nian Liu, Weiyang Li, Kai Yan, Hongbin Yao, Po-Chun Hsu, Steven Chu, and Yi Cui; "Nano Letters", pubs.acs.org/NanoLett, ACS Publications, American Chemical Society.

James H. Pikul, Hui Gang Zhang, Jiung Cho, Paul V. Braun, & William P. King; "High-power lithium ion microbatteries from interdigitated three-dimensional bicontinuous nanoporous electrodes"; "Nature Communications"Published Apr. 16, 2013; 4:1732; DOI; 10.1038/ncomms 2747.

U.S. Appl. No. 17/366,521, filed Jul. 2, 2021 and any related art cited in this Application.

U.S. Appl. No. 16/994,813, filed Aug. 17, 2020 and any related art cited in this Application.

* cited by examiner

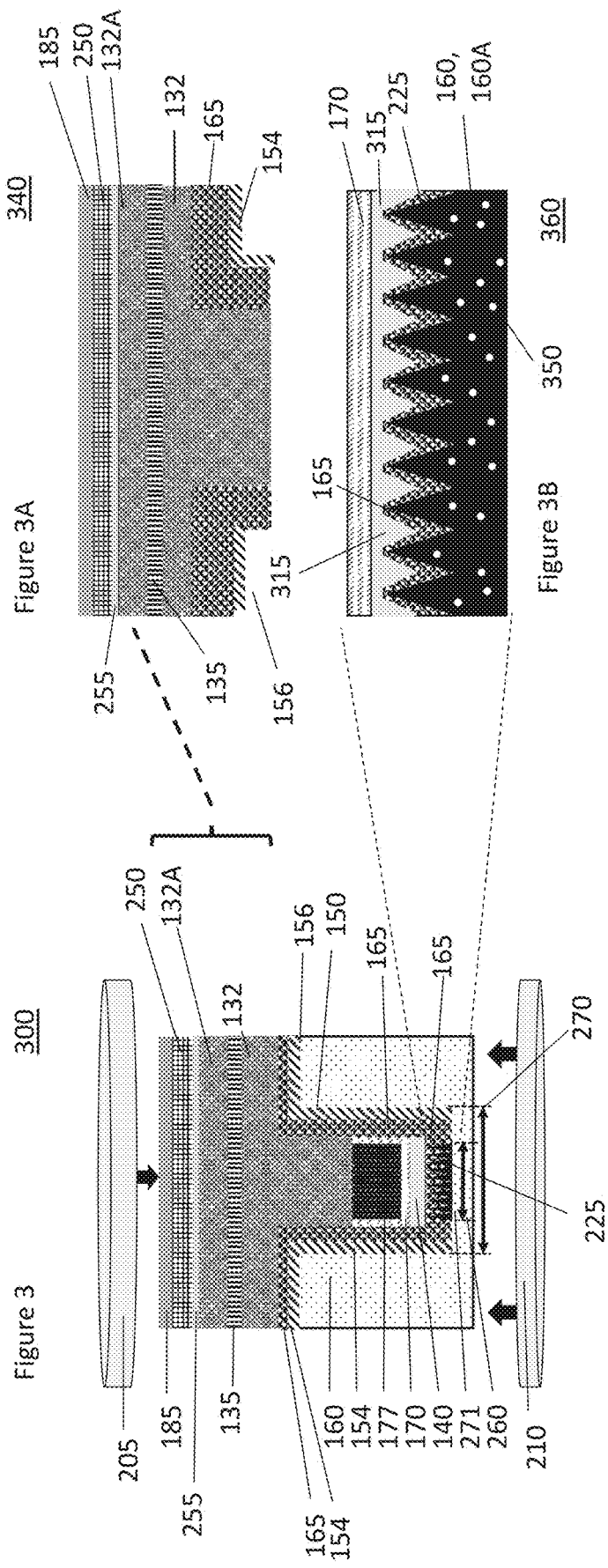

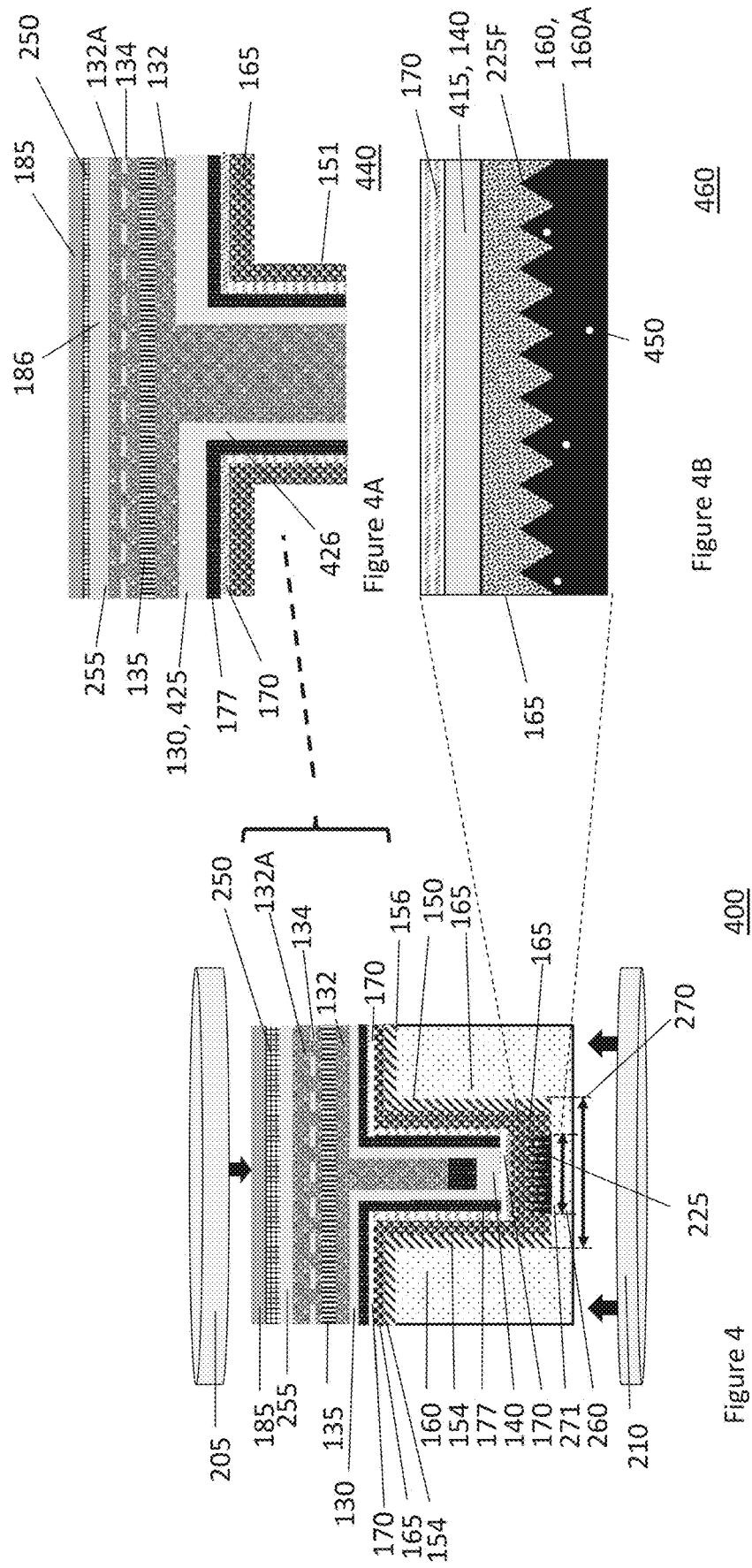

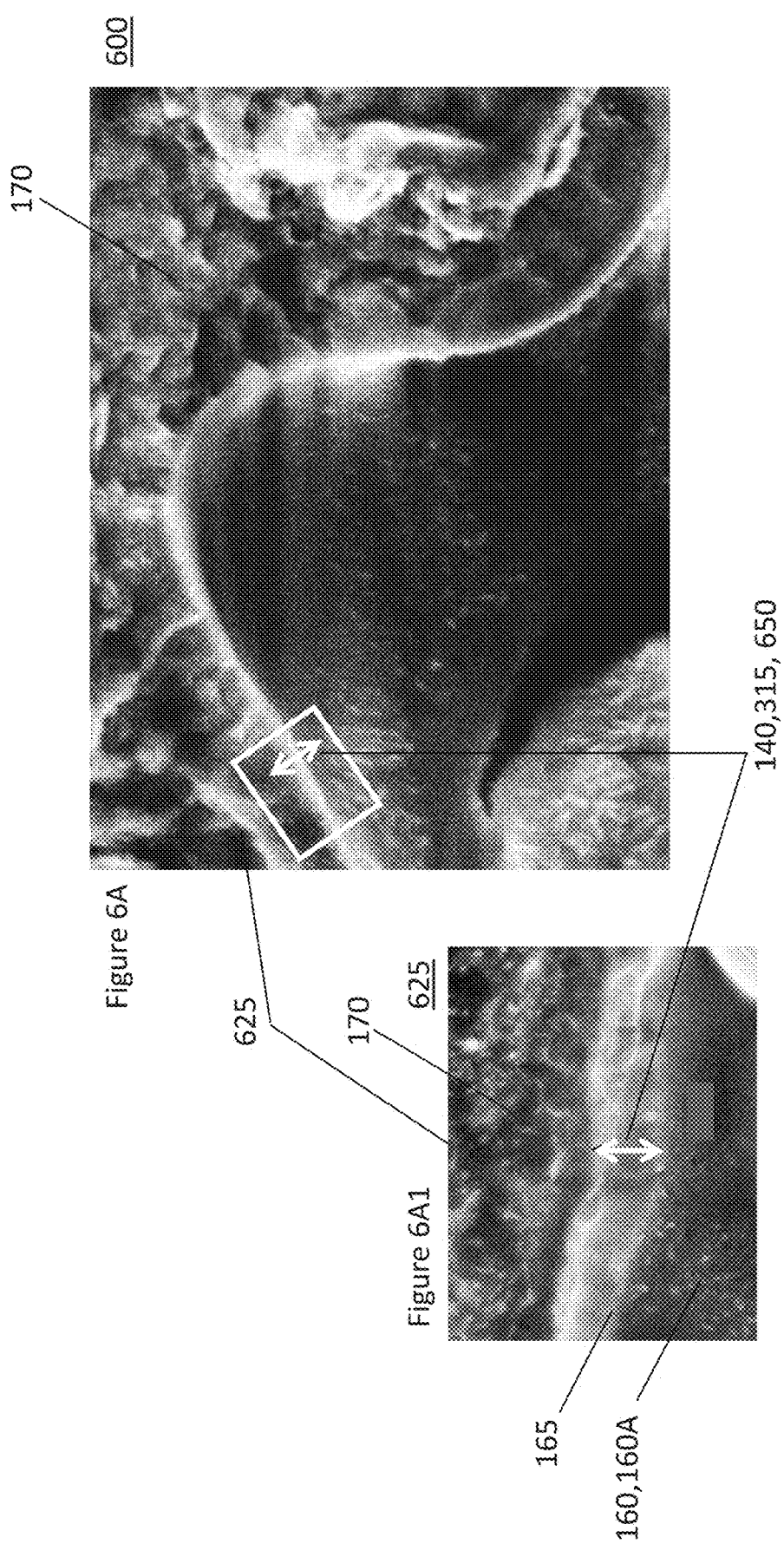

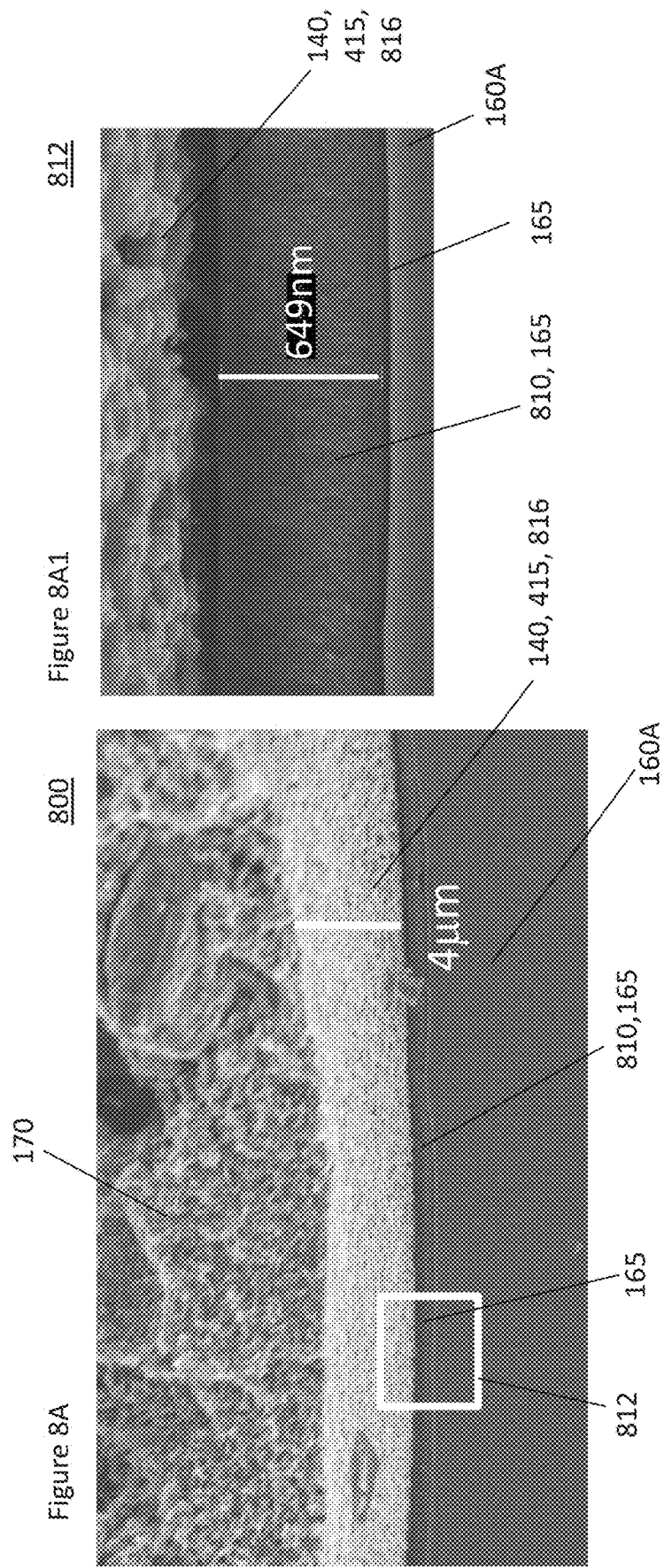

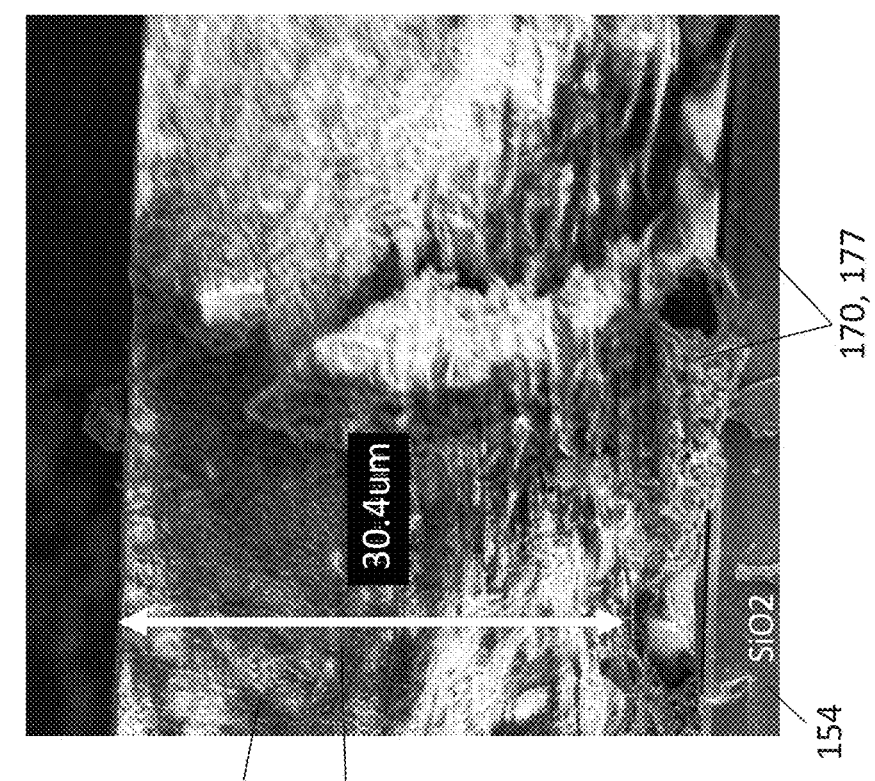
Figure 8B3
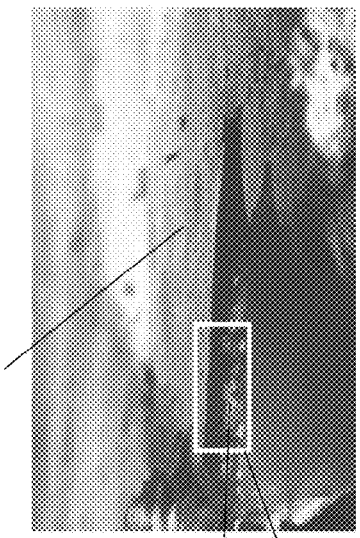
Figure 8B1
Figure 8B2

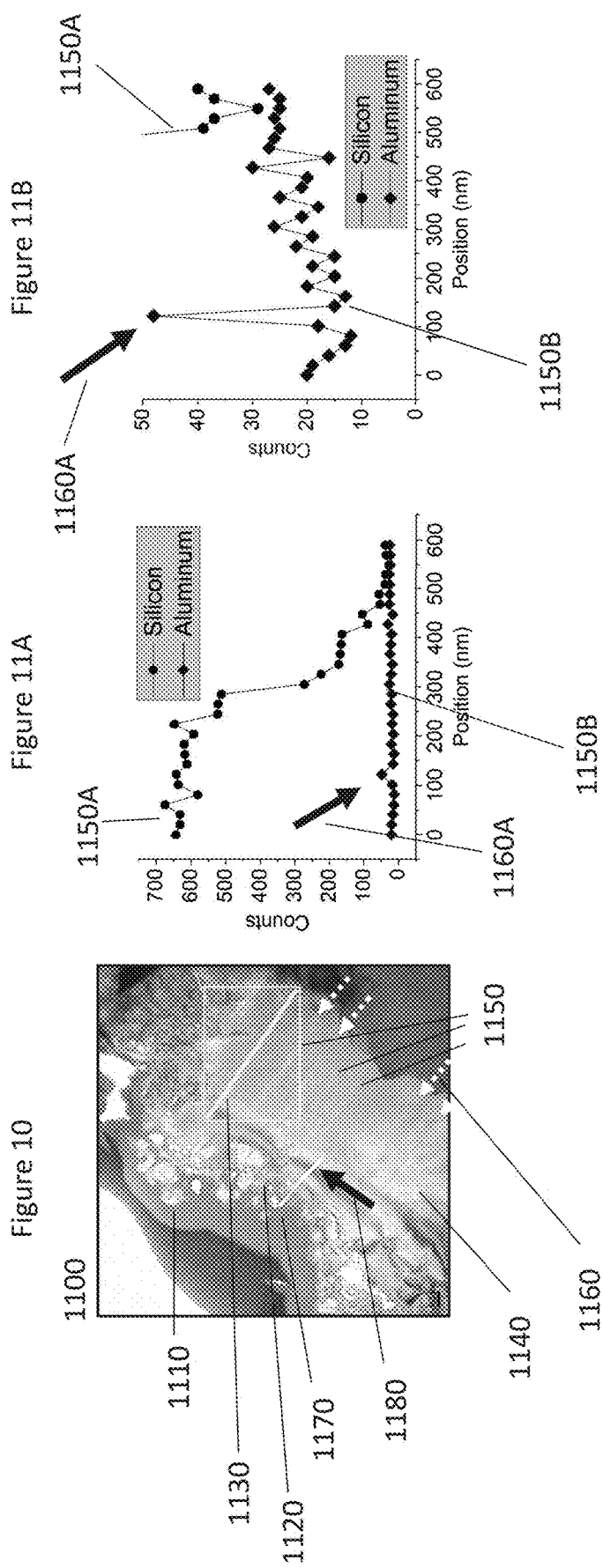

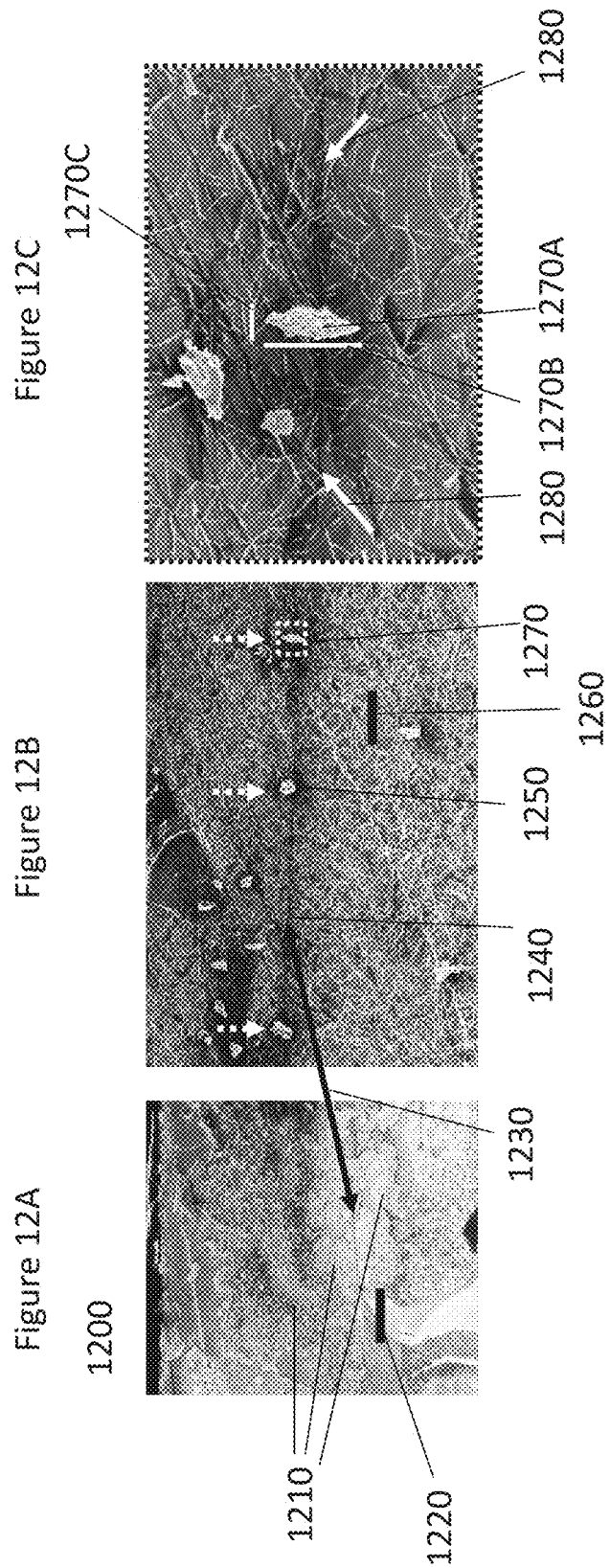

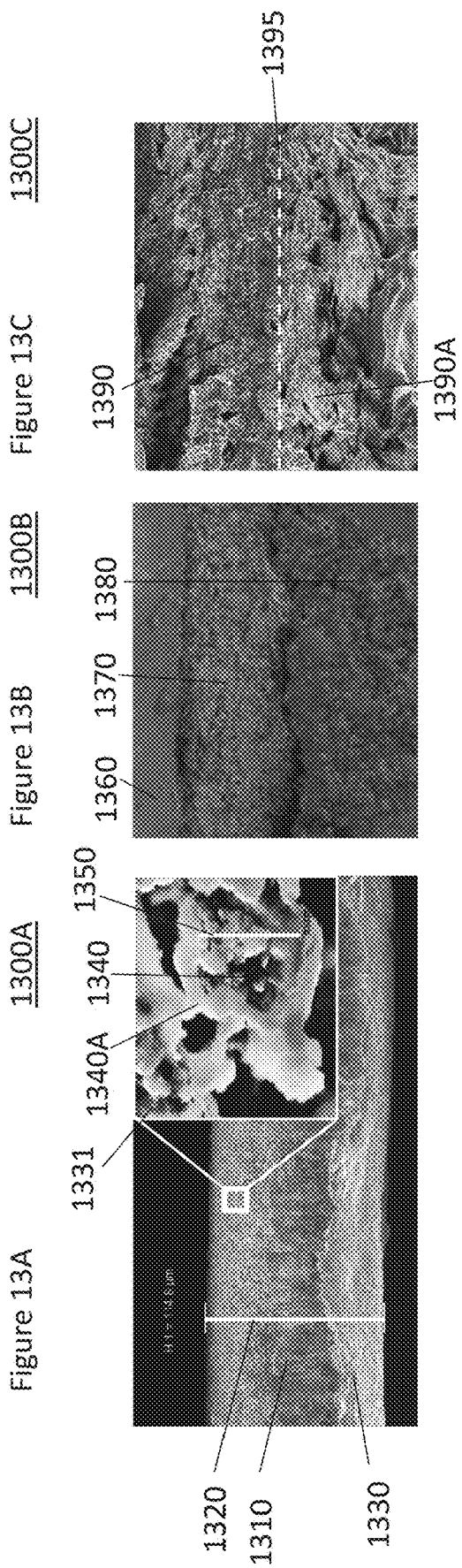

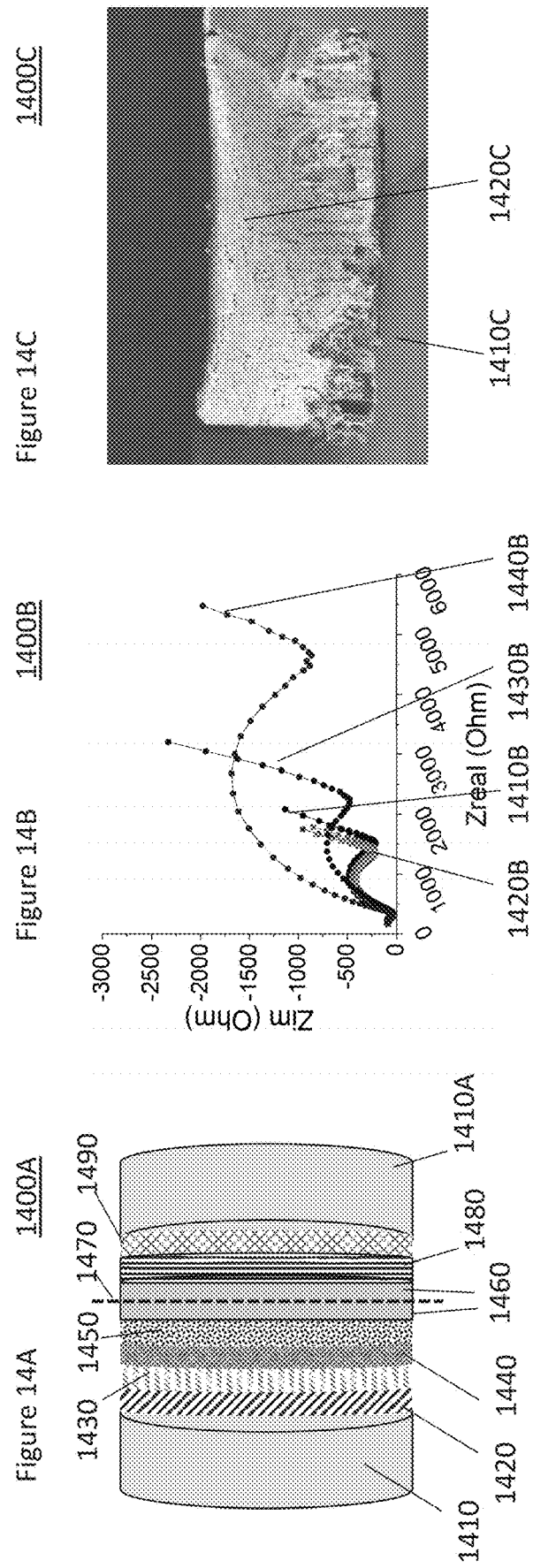

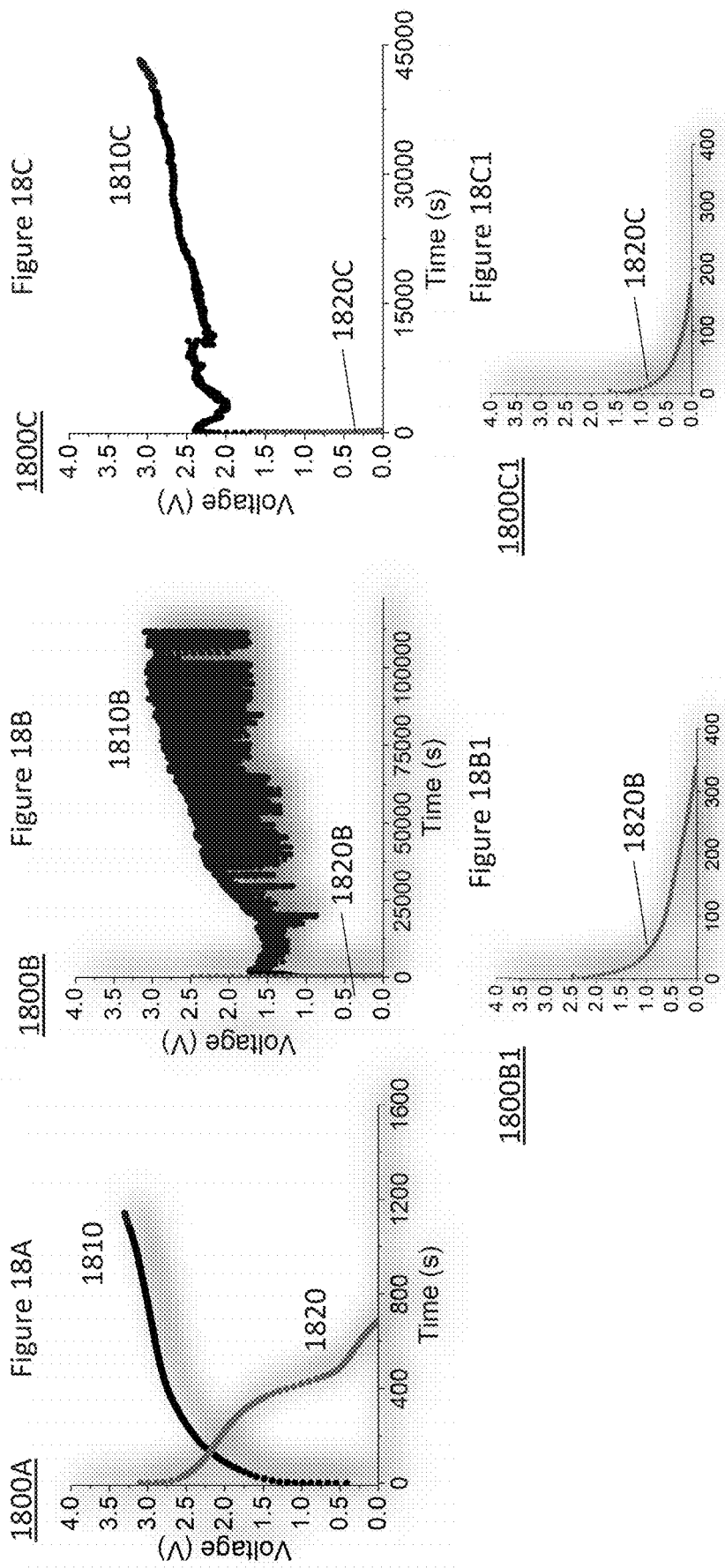

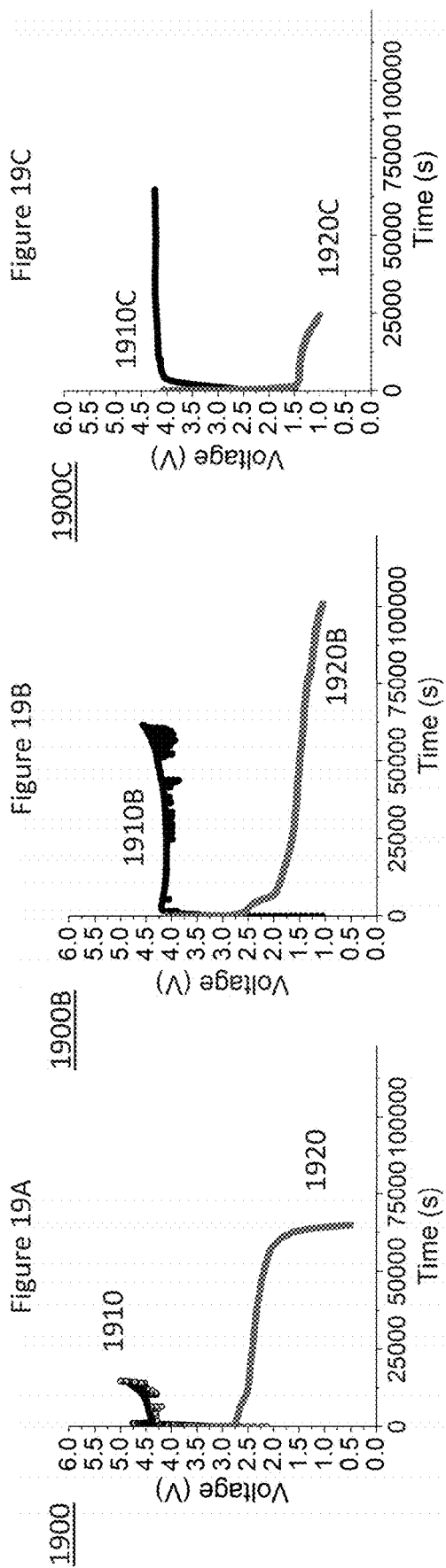

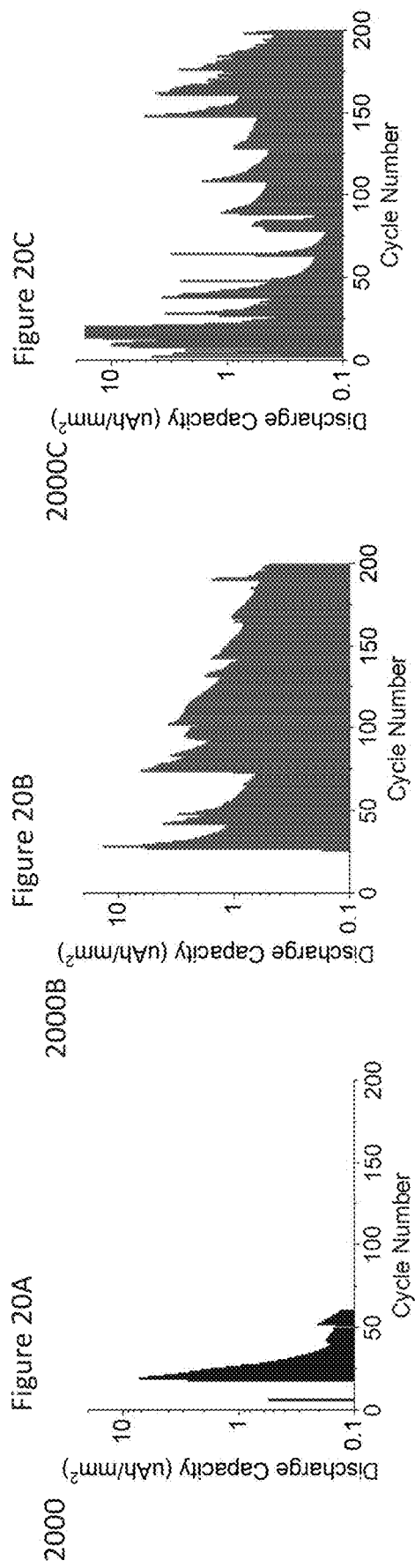

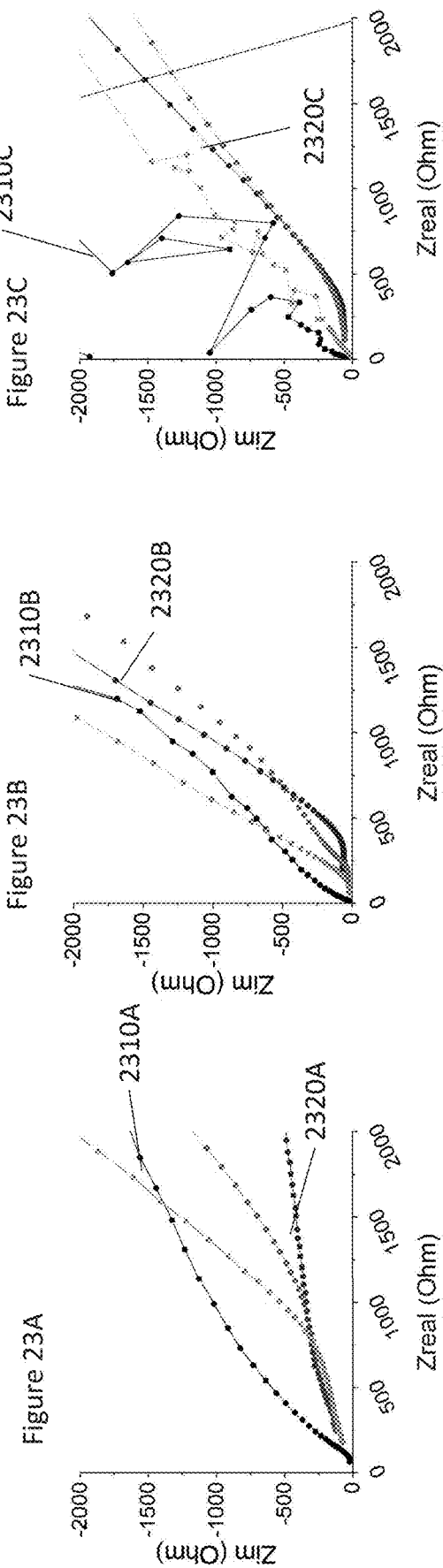

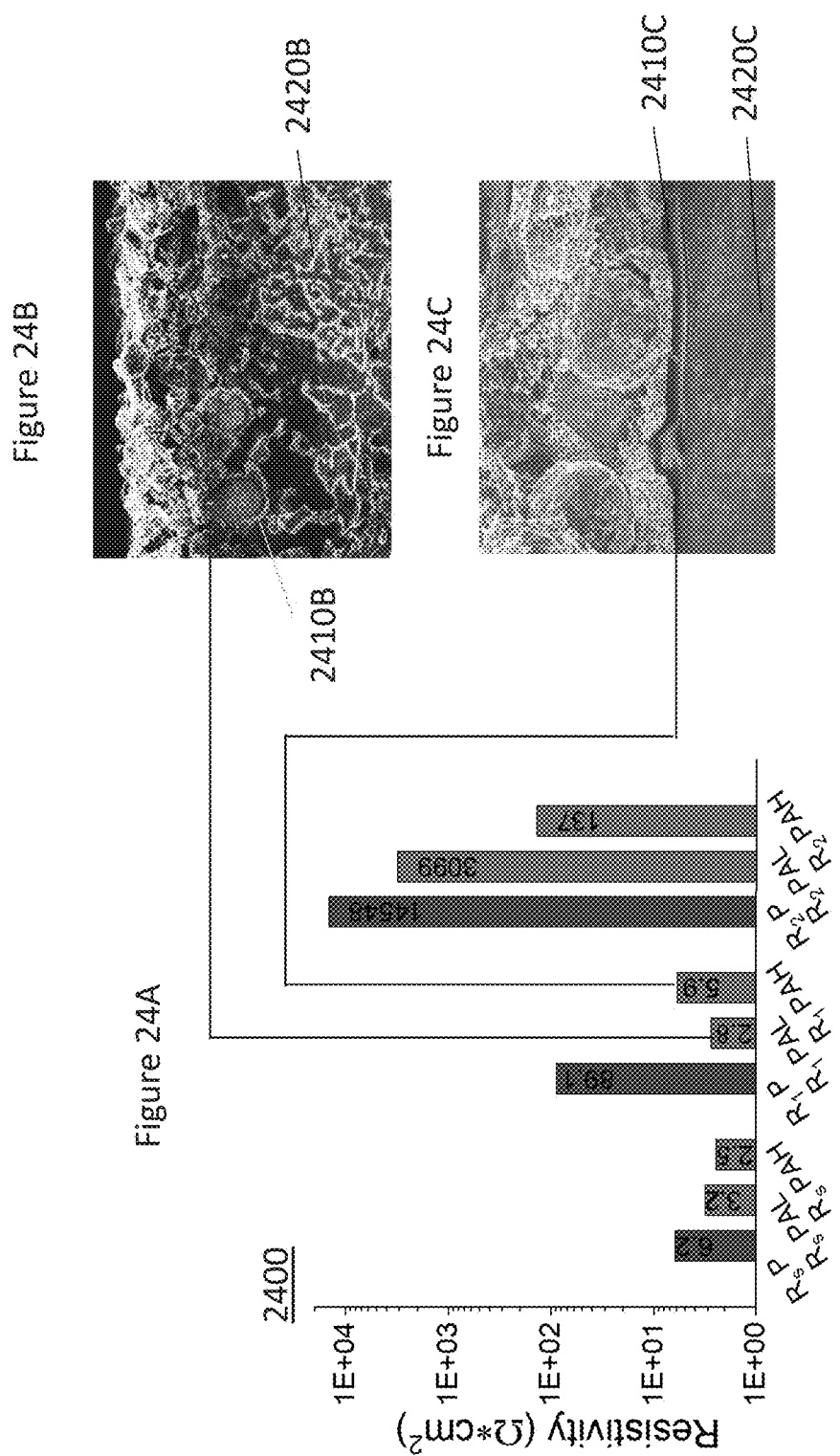

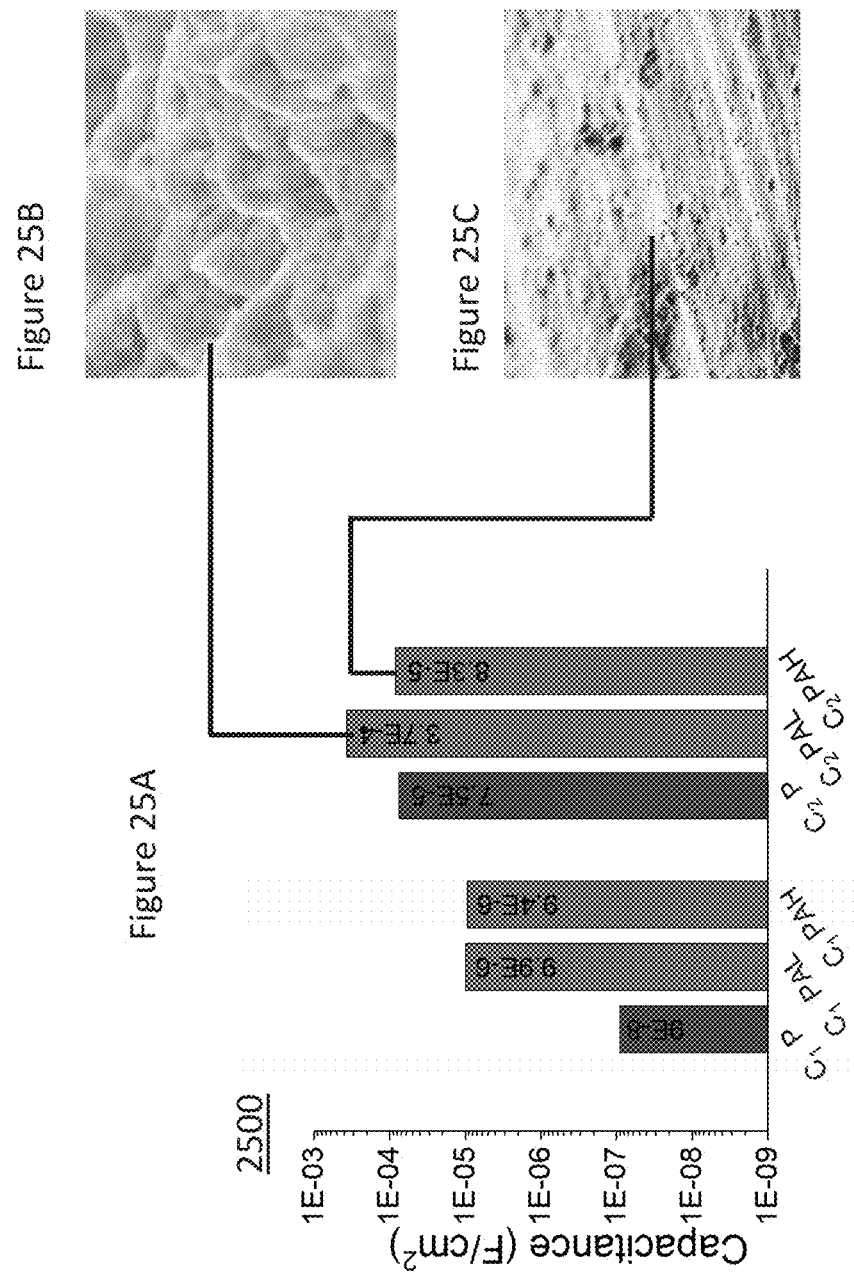

Figure 27

| | Max. Mill. Active Thickness (nm) | Active Area (cm²) | Volumetric Energy Density Range (kWh/cm²·nm) | Volumetric Power Density Range (kW/cm²·nm) | C-Rate |
|---|---|---|---|---|---|
| P | 800 – 400 | 0.01 | 26.0 – 52.0 | 1.5 – 2.9 | 0.06 |
| PA1 | 800 – 400 | 0.01 | 26.8 – 53.7 | 0.96 – 1.9 | 0.04 |
| PA2 | 800 – 400 | 0.01 | 22.0 – 44.0 | 1.4 – 2.8 | 0.07 |
| PA3 | 800 – 400 | 0.10 | 0.84 – 1.7 | 0.22 – 0.45 | 0.3 |

2700

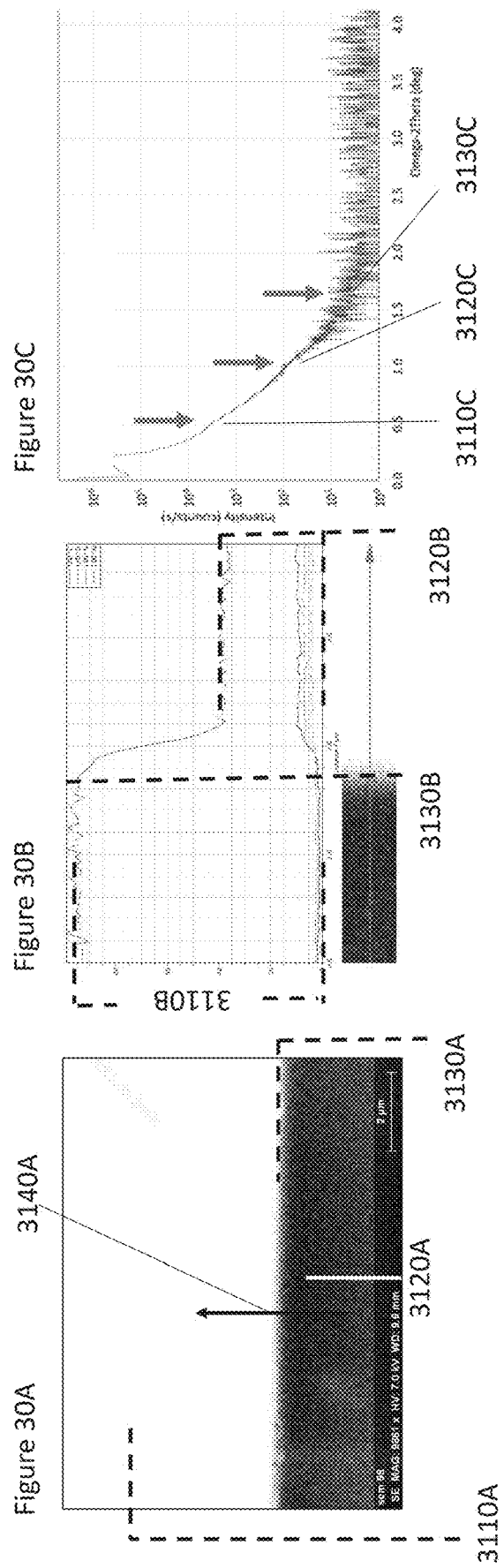

ENERGY STORAGE METHOD USING ALUMINUM OXIDE PROTECTED LITHIUM METAL TUNABLE 3D SILICON BATTERIES

BACKGROUND

The present invention relates to energy storage devices and methods of making and operating those devices. More specifically, the invention relates to energy storage devices improved by using $Al_2O_3$ composite 3D patterned and porous silicon electrodes, and their in-situ electrochemical formation products that enable anode layered lithium-based energy storage devices.

The integration of energy storage devices, e.g. batteries, in microprocessor and memory chips is a significant requirement for the IoT (Internet of Things) devices. In addition to IoT applications, emerging applications requiring these on-board next generation energy storage devices include mobile devices; sensory equipment; autonomous environmental, biological, and social functioning machines; smart dust; IoT sensor devices; and/or biomedical sensory/medication-delivery devices. In addition, there is a need to scale electrochemically active materials and electrochemical processes to conventional applications, e.g., electric vehicles, mobile computing and telecommunication devices, grid storage, etc. To achieve this integration, lithium metal electrode material will be integrated into the overall cell structures of semi-solid or all solid-state energy storage devices due to lithium (Li) metal's extremely high theoretical specific capacity (3860 mAh/g.)

Over the next generation, as human controlled and autonomous devices increasingly become miniaturized, total energy consumption requirements from the respective energy sources powering the electronic devices will decrease. However, even though power consumption is expected to be lower than 1 Watt for these devices, the energy and power density per unit volume will continue to increase for miniaturized devices because miniaturization causes device volumes to decrease as well. Therefore, energy storage devices embedded in Complementary Metal Oxide Semiconductor (CMOS) circuits will need high energy and power density.

Despite the high energy capacity of lithium energy storage devices, e.g. lithium batteries, there is a need to improve the energy/power capacity and density and design predictability and versatility of these devices. In addition, there is a need to manufacture these battery structures using commonly known manufacturing (e.g. CMOS) processes to mass produce high capacity energy storage devices to lower cost.

As stated, Lithium based microbatteries are the candidate of choice to power ever-shrinking microelectronic devices due to their potential for high energy density, high power delivery, and for some embodiments, the versatility for in-situ integration of Lithium. State-of-the-art integrated microelectronic devices require energy/power source footprints of less than or equal to 1 $mm^2$ with roughly 1 to 100 $uAh/mm^2$ capacity for full device functionality and long-term device sustainability—where average capacity of the majority of such a devices over their lifetime is expected to be less than or equal to 5 $uAh/mm^2$ and with periodic capacity needs greater than or equal to 5 $uAh/mm^2$. While larger batteries with higher surface areas, not classified as microbatteries, can achieve these energy densities and capacity, batteries with footprints less than 1 $mm^2$ which can be easily integrated into microelectronic substrates, cannot. Further, the present integrated microbattery power sources lack the energy or power density per unit mass or volume to meet long-run time or cycling requirements.

To expand performance of lithium-based, solid-state microbatteries, focus is placed on the charge transfer across the silicon interface. Interfacial additives and in-situ chemistries are significant contributors in controlling this charge transfer throughout the bulk substrate and interfacial regions and reduced impedance levels at the cell level. Notably, Aluminum Oxide ($Al_2O_3$), organic/inorganic hybrids, are some of the leading additives used for increasing electrode and cell performance. $Al_2O_3$ on silicon has popular "self-healing" benefits, yet the mechanism remains unknown for this benefit.

Aluminum metal has long been a high voltage stable metal which not only acts as a viable current collector for electrode materials but also as a medium with unique Lithium plating and Lithium nucleation properties. Aluminum is known as a material which enables enhanced stabilization of Lithium-containing electrodes. Accordingly, the use of metals and metal oxides as Li-plating nucleation sites has been investigated in the prior art.

Controlling the 3D spatial geometry of Li-metal distribution within the microbattery is necessary to improve both safety and cell performance of microbatteries, especially in up and coming silicon-active energy storage devices. Factors such as the control of consistent Li-plating and stripping planar mechanisms are most relevant to this Li-metal distribution geometry, including Li-metal dendrite suppression, and high cycle life advancement of high-energy Li-metal cells. However, the prior art lacks predictable and controllable methods and structures that enable these Li-metal distribution geometries, particularly where microbatteries are integrated with CMOS technologies and manufacturing processes.

There is a need for improved methods and materials to improve rates, concentration, and reversibility of Li-metal attaching to microbattery metal electrodes as well as sustainability of Li—Si type charge storage, without the deleterious effects due to silicon volume changes when lithiated, during both microbattery formation and operation.

SUMMARY

Embodiments of devices, structures, methods of making, and compositions of materials for lithium energy storage devices are disclosed. In some embodiments, the energy storage device has a silicon (Si) substrate with one or more trenches. Each trench has a trench base with an electrically active surface. A metal layer between 0.1 nanometer (nm) and 0.7 nm thick is disposed on the electrically active surface. In some embodiments, the metal layer is made of Aluminum Oxide ($Al_2O_3$). Precursor materials are disposed and/or formed on the metal layer, on the trench walls, and/or in the substrate. These precursor materials include a conductive polymer adhesive layer disposed on the metal layer, an anode disposed on the conductive polymer adhesive layer, a graphite/Li-salt/polymer saturated polyacrylonitrile (PAN) separator optionally containing a Lithium metal field layer formed on the field and SiO2 insulated portions of the Silicon anode substrate; a solid polymer electrolyte (SPE) disposed on the optional Lithium metal field layer or insulated field layer; a PAN separator saturated in the SPE and a cathode disposed on the SPE.

In addition to the methods of choosing and assembling the precursor materials and otherwise making the structure, methods of cycling an initially applied electrical current with a current magnitude are disclosed. The initial cycling current transforms and/or moves the precursor materials in the energy storage structure into some novel compositions of matter and other final operational structures within the device, e.g. layers of metallic Lithium and variations of Lithium ion density in formed Lithium-silicon coordinated structures in the silicon substrate. Protective structures for the anode are also created.

Volumetric energy and power densities can be adjusted based on the degree and type of charge storage mechanism in the formed composite anode structure.

In addition, in alternative embodiments, the microbattery is made with a patterned trench base and layering of components on the trench walls and field.

Methods of making, tuning, operation, and use are disclosed along with compositions of matter.

BRIEF DESCRIPTION OF THE DRAWINGS

Various embodiments of the present invention will be described below in more detail, with reference to the accompanying drawings, now briefly described. The Figures show various apparatus, structures, and related method steps of the present invention.

FIG. 3 is a block diagram of a novel energy storage partially in-situ PAL cell structure with the anode layered only in the trench and with an Al2O3 layer conformally layered on the trench bottom, walls, and the field.

FIG. 3A is a diagram of a novel energy storage PAL cell showing some electrolyte and cathode parts during current cycling with formation of a little or no Lithium metal cathode layer.

FIG. 3B is a diagram of a novel energy storage PAL cell showing the trench base region and anode confined only to trench regions of the device with primarily Li—Si type charge storage confined to the active silicon region at the base of the trench.

FIG. 4 is a block diagram of an energy storage, e.g. battery, PAH embodiment after the device precursor materials complete current cycling with an anode layered on the trench bottom, trench sides, and on the field.

FIG. 4A is an expanded view (not to scale) of a field region of the PAH energy storage device showing Lithium metal layer on the trench sides and field and a thick Lithium metal cathode layer.

FIG. 4B is an expanded view (not to scale) of the anode region of the PAH energy storage device showing a low density of (Li-ion) charge stored in the substrate.

FIG. 6A is a micrograph of a Lithium metal anode layer at the silicon-aluminum-LiTFSi-PANI interface resulting from Li and $Al_2O_3$ interaction at a trench base after long term (more than 250 charge/discharge cycles) operational current cycling.

FIG. 6A1 is a micrograph of a magnified area of the Lithium metal anode layer shown in FIG. 6.

FIG. 8A is a micrograph of an effect on the Lithium metal anode layer at the trench base after long term operational current cycling for a cell with an anode within the 3D trench, layered on the trench bottom, trench sidewalls, and on the field, a PAH cell.

FIG. 8A1 is a magnified portion of FIG. 8A showing the Lithium metal anode layer at the trench base after long term operational current cycling for a cell with an anode layered on the 3D trench bottom, trench sidewalls, and on the field, a PAH cell.

FIG. 8B1 is a micrograph of an effect, after long term operational current cycling, of Li-metal plating on the field when LiTFSI-PANI and graphite is layered on the field and is in contact with the PAN separator for a cell with an anode layered within the 3D trench on the trench bottom, trench sidewalls, and on the field.

FIG. 8B2 is a micrograph showing a non-lithiated separator over the 3D trench opening and a thick and smooth Li-metal field layer which has homogeneously plated through the field-residing portion of the separator for a cell with an anode layered within the 3D trench on the trench bottom, trench sidewalls, and on the field after long term operational current cycling.

FIG. 8B3 is a micrograph showing a Lithium metal field layer plated through the separator for a cell with an anode layered within the 3D trench on the trench base, trench sidewalls, and on the field after long term operational current cycling.

FIG. 10 shows TEM cross section of a set of peaks and valleys taken from the sample shown in FIG. 9A.

FIG. 11A is a plot of the quantitative results from an EDS line spectra representative of the line 1130 shown in FIG. 10.

FIG. 11B displays an augmented portion of the FIG. 11A plot of the quantitative results from the EDS line spectra, displaying the relative concentrations of silicon and aluminum.

FIG. 12A is a low magnification SEM cross section of the bulk active silicon region from a portion of an enlarged textured porous silicon disc (15.5 mm diameter) representative of a PAL cell after greater than 250 operational current charge/discharge cycles-displaying the lithiation of the silicon bulk throughout with a continuous crack indication.

FIG. 12B is a high magnification SEM cross section of the bulk active silicon region from a portion of an enlarged textured porous silicon disc (15.5 mm diameter) representative of a PAL cell after greater than 250 operational current charge/discharge cycles displaying the lithiation of the silicon bulk showing bridging the crack in 3 distinct locations.

FIG. 12C is a high magnification SEM cross section of the bulk active silicon region from a portion of an enlarged textured porous silicon disc (15.5 mm diameter) representative of a PAL cell after greater than 250 operational current charge/discharge cycles-displaying the lithiation of the silicon bulk throughout showing bridging the crack and mechanically binding of two separate sides together.

FIG. 13A is an SEM cross section of a LMOF/SPE composite electrode calendered with an SPE saturated PAN separator resulting in approximately a 114 micron thick composite cathode and separator structure.

FIG. 13B is an SEM cross section showing an aluminum foil laminated LMOF/SPE composite cathode with good adhesion to the SPE.

FIG. 13C is a high magnification SEM cross section showing an LMOF/SPE composite cathode displaying excellent adhesion to SPE and showing seamless integration of the two layers.

FIG. 14A is a schematic of a coin cell containing a Li-metal anode, SPE electrolyte and an LMOF/SPE composite cathode.

FIG. 14B is a series of Nyquist plots illustrate the cell resistance decreasing from a 4.3 V upper charge limit to 4.8 V upper charge limit, followed by an increase in cell resistance when charged to 5.0 V and even further increase in cell resistance when charged to 5.3 V upper voltage limit.

FIG. 14C is an SEM cross section of a representative silicon packaged microbattery after a few charge and discharge current cycles illustrating the hardening effect of the Li-conductive plasticizer component of the SPE, succinonitrile (SN). upon electrochemical charge and discharge.

FIG. 18A is a plot of the initial charge and discharge profiles of a P cell.

FIG. 18B is a plot of the initial charge and discharge profiles of a PAL cell.

FIG. 18B1 is a magnified plot of the initial discharge cycle shown in FIG. 18B.

FIG. 18C is a plot of the initial charge and discharge profiles of a PAH cell.

FIG. 18C1 is a magnified plot of the initial discharge cycle shown in FIG. 18C.

FIG. 19A is a plot of the maximum charge and discharge profiles of a P cell.

FIG. 19B is a plot of the maximum charge and discharge profiles of a PAL cell.

FIG. 19C is a plot of the maximum charge and discharge profiles of a PAH cell.

FIG. 20A is a plot of the long-term cycling discharge capacity plot in uAh/mm$^2$ for a P cell.

FIG. 20B is a plot of the long-term cycling discharge capacity plot in uAh/mm$^2$ for the first 200 cycles of PAL cell.

FIG. 20C is a plot of the long-term cycling discharge capacity plot in uAh/mm$^2$ for the first 200 cycles of a PAH cell.

FIG. 23A displays an augmented portion of the full Nyquist plots of a P cell shown in FIG. 22A, highlighting the high and mid-frequency (>1 Hz) regions of each EIS spectra acquired at the 4 distinct life cycle stages: Pre-cycle, prior to maximum capacity, after maximum capacity and at the end of cell life cycle.

FIG. 23B displays an augmented portion of the full Nyquist plots of a PAL cell shown in FIG. 22B, highlighting the high and mid-frequency (>1 Hz) regions of each EIS spectra acquired at the 4 distinct life cycle stages: Pre-cycle, prior to maximum capacity, after maximum capacity and at the end of cell life cycle.

FIG. 23C displays an augmented portion of the full Nyquist plots of a PAH cell shown in FIG. 22C, highlighting the high and mid-frequency (>1 Hz) regions of each EIS spectra acquired at the 4 distinct life cycle stages: Pre-cycle, prior to maximum capacity, after maximum capacity and at the end of cell life cycle.

FIG. 24A displays the average resistivity values (normalized to the square area of the cathode for each cell) of all 4 EIS spectra acquisition stages of P, PAL and PAH, cells during their cycle life with cycle-life average series resistance (Rs), a composite anode resistance (R1) and composite cathode resistance (R2) displayed quantitatively.

FIG. 24B is an SEM cross section, taken post cycle-life of a PAL cell showing the seamlessly integrated, low resistivity composite anode at the active silicon interface.

FIG. 24C is an SEM cross section, taken post cycle-life of a PAH cell showing the composite anode at the active silicon interface displaying a void-containing, higher resistance interface.

FIG. 25A displays the average capacitance values (normalized to the square area of the cathode for each cell) of all 4 EIS spectra acquisition stages of the P, PAL, and PAH cells during their cycle life.

FIG. 25B is an SEM cross section taken post cycle-life of a PAL cell showing the aluminum current collector which initially had the LMOF/SPE composite cathode adhered to it where the 3D textured Aluminum/Li/LMOF-SPE surface observed post-cycling displays higher surface area than the a PAH cell analog due to incomplete transformation of the LMOF/SPE cathode to Li-metal.

FIG. 25C is an SEM cross section taken post cycle-life of a PAH cell, showing the aluminum current collector which initially had the LMOF/SPE composite cathode adhered to it where the 2D very smooth Aluminum/Li-plated surface observed post-cycling displays lower surface area than the a PAL cell analog due complete transformation of the LMOF/SPE cathode to Li-metal.

FIG. 27 is the quantitative table associated with the Ragone plot in FIG. 26 illustrating the volumetric energy density, the volumetric power density, C-Rate, active anode used in the density calculations and the maximum (conservative) and minimum (best case) values used as thickness values in calculating the density values of the P, PAL, and PAH cells.

FIG. 30A is an SEM cross section showing a top Si-only surface, the silicon bulk under the top surface, the interface between the two regions, and the line which maps the trajectory for the EDS line spectra utilized for obtaining EDS spectra of FIG. 31B.

FIG. 30B is the EDS line spectra from the cross section shown in FIG. 30A showing the relative elemental concentrations of silicon, carbon, aluminum, and oxygen.

FIG. 30C shows the X-ray reflection spectra of the sample shown/used in FIGS. 30A and 30B where very subtle fringe lattice features are highlighted.

DETAILED DESCRIPTION

Figure 1:
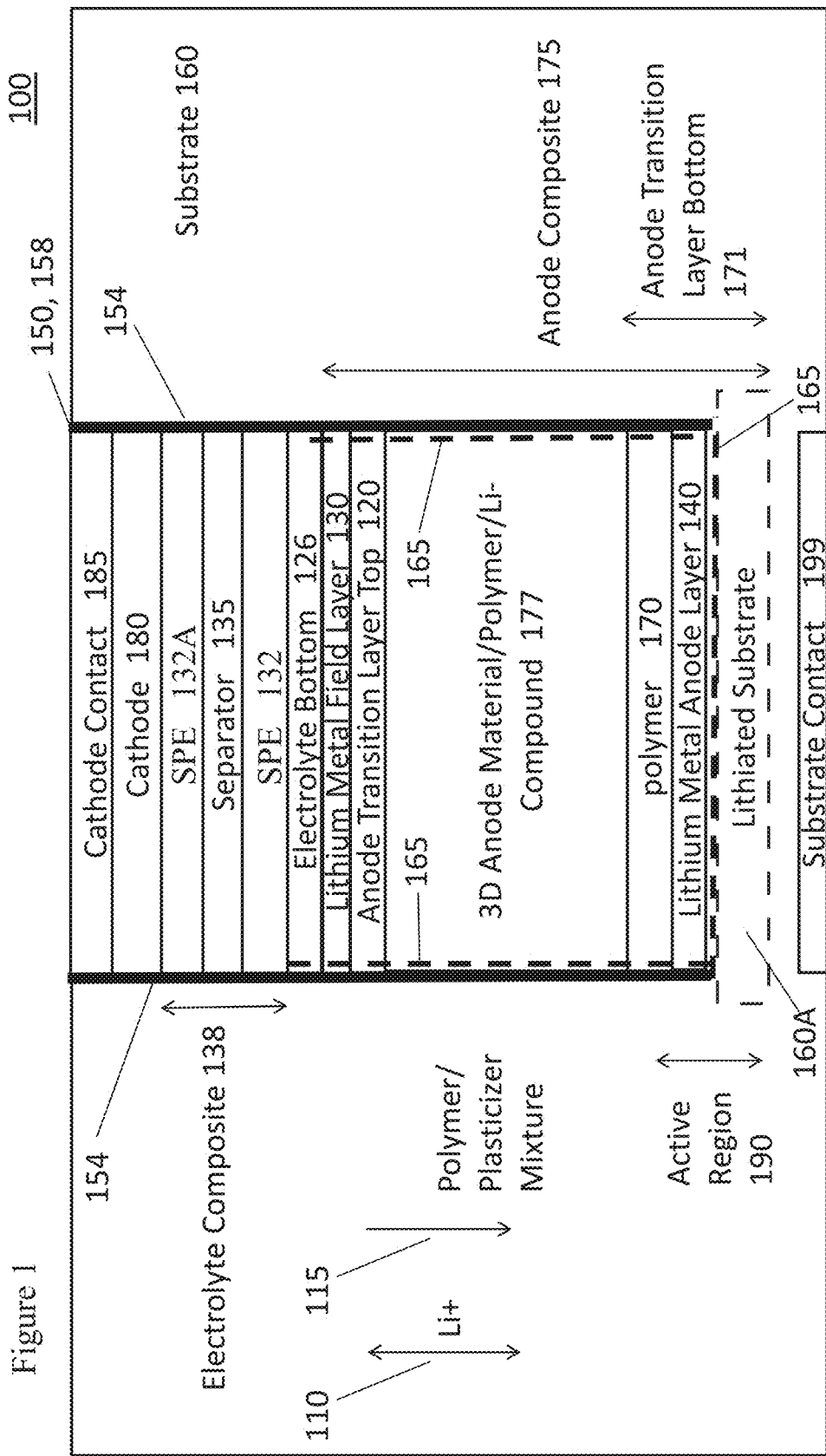
FIG. 1 is a block diagram of one example conceptual structure of an energy storage device, e.g. a lithium battery, entirely disposed within a trench with an $Al_2O_3$ liner (a PAL cell) after an initial galvanostatic cycling current is applied, showing composite components of an energy storage structure, e.g. a battery.

It is to be understood that embodiments of the present invention are not limited to the illustrative methods, apparatus, structures, systems and devices disclosed herein but instead are more broadly applicable to other alternative and broader methods, apparatus, structures, systems and devices that become evident to those skilled in the art given this disclosure.

In addition, it is to be understood that the various layers, structures, and/or regions shown in the accompanying drawings are not drawn to scale, and that one or more layers, structures, and/or regions of a type commonly used may not be explicitly shown in a given drawing. This does not imply that the layers, structures, and/or regions not explicitly shown are omitted from the actual devices.

In addition, certain elements may be left out of a view for the sake of clarity and/or simplicity when explanations are not necessarily focused on such omitted elements. Moreover, the same or similar reference numbers used throughout the drawings are used to denote the same or similar features, elements, or structures, and thus, a detailed explanation of the same or similar features, elements, or structures will not be repeated for each of the drawings.

The devices, structures, and methods disclosed in accordance with embodiments of the present invention can be employed in applications, hardware, and/or electronic systems. Suitable hardware and systems for implementing embodiments of the invention may include, but are not limited to, internet of things (IoT) devices, sensory devices, micro and nano electronic devices, miniaturized computer devices, personal computers, communication networks, electronic commerce systems, portable communications devices (e.g., cell and smart phones), solid-state media storage devices, expert and artificial intelligence systems, functional circuitry, neural networks, analog memory devices, ion-based resistance modulated computing and memory devices, etc. Systems and hardware incorporating the semiconductor devices and structures are contemplated embodiments of the invention. In addition, systems of any scale which utilize silicon material or substrates for circuitry, computing or power function-such as mobile devise—can utilize the inventions described herein As used herein, "height" refers to a vertical size of an element (e.g., a layer, trench, hole, opening, etc.) in the cross-sectional or elevation views measured from a bottom surface to a top surface of the element, and/or measured with respect to a surface on which the element is located.

Conversely, a "depth" refers to a vertical size of an element (e.g., a layer, trench, hole, opening, etc.) in the cross-sectional or elevation views measured from a top surface to a bottom surface of the element. Terms such as "thick", "thickness", "thin" or derivatives thereof may be used in place of "height" where indicated.

As used herein, "lateral", "lateral side", "side", and "lateral surface" refer to a side surface of an element (e.g., a layer, opening, etc.), such as a left or right-side surface in the drawings.

As used herein, "width" or "length" refers to a size of an element (e.g., a layer, trench, hole, opening, etc.) in the drawings measured from a side surface to an opposite surface of the element. Terms such as "thick", "thickness", "thin" or derivatives thereof may be used in place of "width" or "length" where indicated.

As used herein, terms such as "upper", "lower", "right", "left", "vertical", "horizontal", "top", "bottom", and derivatives thereof shall relate to the disclosed structures and methods, as oriented in the drawing figures. For example, as used herein, "vertical" refers to a direction perpendicular to the top surface of the substrate in the elevation views, and "horizontal" refers to a direction parallel to the top surface of the substrate in the elevation views.

As used herein, unless otherwise specified, terms such as "on", "overlying", "atop", "on top", "positioned on" or "positioned atop" mean that a first element is present on a second element, wherein intervening elements may be present between the first element and the second element. As used herein, unless otherwise specified, the term "directly" used in connection with the terms "on", "overlying", "atop", "on top", "positioned on" or "positioned atop," "disposed on," or the terms "in contact" or "direct contact" means that a first element and a second element are connected without any intervening elements, such as, for example, intermediary conducting, insulating or semiconductor layers, present between the first element and the second element.

It is understood that these terms might be affected by the orientation of the device described. For example, while the meaning of these descriptions might change if the device was rotated upside down, the descriptions remain valid because they describe relative relationships between features of the invention.

Among other things, three of the embodiments include: an embodiment with no aluminum metal layer, and the anode layer deposited only in the trench and trench walls, i.e. "P" cell; an embodiment with an aluminum metal layer disposed on the trench base and the trench walls, and on a field of the device, with an anode layer deposited only in the trench and trench walls, i.e., a P Aluminum or "PAL" cell with low Li-metal plating symmetry, as explained below; and an embodiment with an aluminum layer and anode on the trench base, trench walls, and field, with an anode layer deposited in the trench, on the trench walls and on the field, i.e. a "PAH" cell or P Aluminum with high Li-metal plating symmetry, as explained below.

In addition, generally disclosed is a unique feature-rich microbattery design with "in-silicon" packaging of electrochemically active material entirely or partially within 3D trench bottom patterned trenches at wafer level. The design theoretically enables the energy storage device to be integratable (sidewall-packaged) within the Si-wafer volume of microelectronic silicon substrates. Further, tunable porosity (<50 nm) and Si-spike texturing at the 3D trench base enables versatile control of aspect ratios, pore size, and pore depth of a robust conduit to the bulk silicon wafer.

For the PAL cell, the deposition of a very thin (0.5 nm) layer of $Al_2O_3$ agglomerates into larger particles upon electrochemical cycling. The in-trench-only patterned anode design, PAL, creates an in-situ thin Li-metal encapsulated Al2O3 agglomerated "cap" on the active silicon surface which enables sustainable long-term cycling via low resistance $Li^+$PANI/Li-metal/Si interfacial integration. In addition to the static Li-metal encapsulated Al2O3 agglomerated "cap", a second, mobile-Al2O3 mechanism prevents the degradation of the crystalline silicon bulk and associated high cell resistance. Al2O3 is shown to migrate deeper into the silicon bulk, in parallel with Li-ions and Li-conductive succinonitrile species—where progressive cycling further lithiates and agglomerates Al2O3 particles as they are carried deeper into the silicon substrate with the Li-conductive species. The mobilized Al2O3 particles nucleate at defect sites where their enlarged size acts as a spacer element, compensating for stress on the silicon system as it expands and contracts with cycling. Further, the defect-adsorbed Al2O3 particles physically bind together separated bulk material—allowing for cell resistance to remain at high performing, low magnitudes during repeated volume changes.

In the PAL cell embodiment, the combined in-situ formed cap and mobile-defect-repairing Lithiated Al2O3 enables very low resistivity (2.8 Ohms*$cm^2$) resulting in extended, reversible Li+ ion diffusion for greater than 270 cycles, a volumetric power density range of 0.96-1.9 uW/$cm^2$*um and an energy density of 26-53 uWh/$cm^2$*um.

In the PAH embodiment, the trench and field layered anode design for the PAH embodiment does not utilize Li—Si diffusion for primary charge storage, and instead results in a pseudo-symmetric Li-metal battery enabled by utilizing the agglomerated Al2O3 as a stable plating surface in parallel with a conductive PAN fibermat which homogenously frames the Li-metal as it grows thicker on the substrate field.

Additionally, the in-situ formed symmetric Li-metal microbattery (PAH) enables very high maximum discharge capacity (16.8 uAh/$mm^2$) with extended, reversible Li+ ion diffusion for greater than 208 cycles (>1.6 uAh/$mm^2$ average discharge capacity), a volumetric power density range of 0.22-0.45 uW/$cm^2$*um and an energy density of 0.84-1.7 uWh/$cm^2$*um. When adjusted for same active anode areas, the PAH cell has nearly twice the power density than the PAL cell with roughly one-third of the energy density.

Next generation advances of in-silicon designs envisioned will incorporate fully packaged (⅚ from silicon substrate and ⅙ from 3D top contact seals) to enable complete packaged high power and energy dense power sources, where the bulk of the electronic device substrate provides both patterned integrated circuit and battery form and function.

Embodiments of processes, apparatus, and compositions of materials are disclosed where high voltage and capacity composite electrodes (e.g. anode and cathode) and high voltage stable and ionically conductive solid-polymer-electrolyte are combined with electrochemically active surface additives (e.g. Aluminum oxide, Al, and Lithium bis(trifluoromethanesulfonyl)imide containing polyaniline, LiTFSI-PANI) to enable a low-resistance/impedance and reversible Lithium metal layer formations hybridized with Lithium-Silicon and Li-intercalation charge storage structures.

Figure 2A:
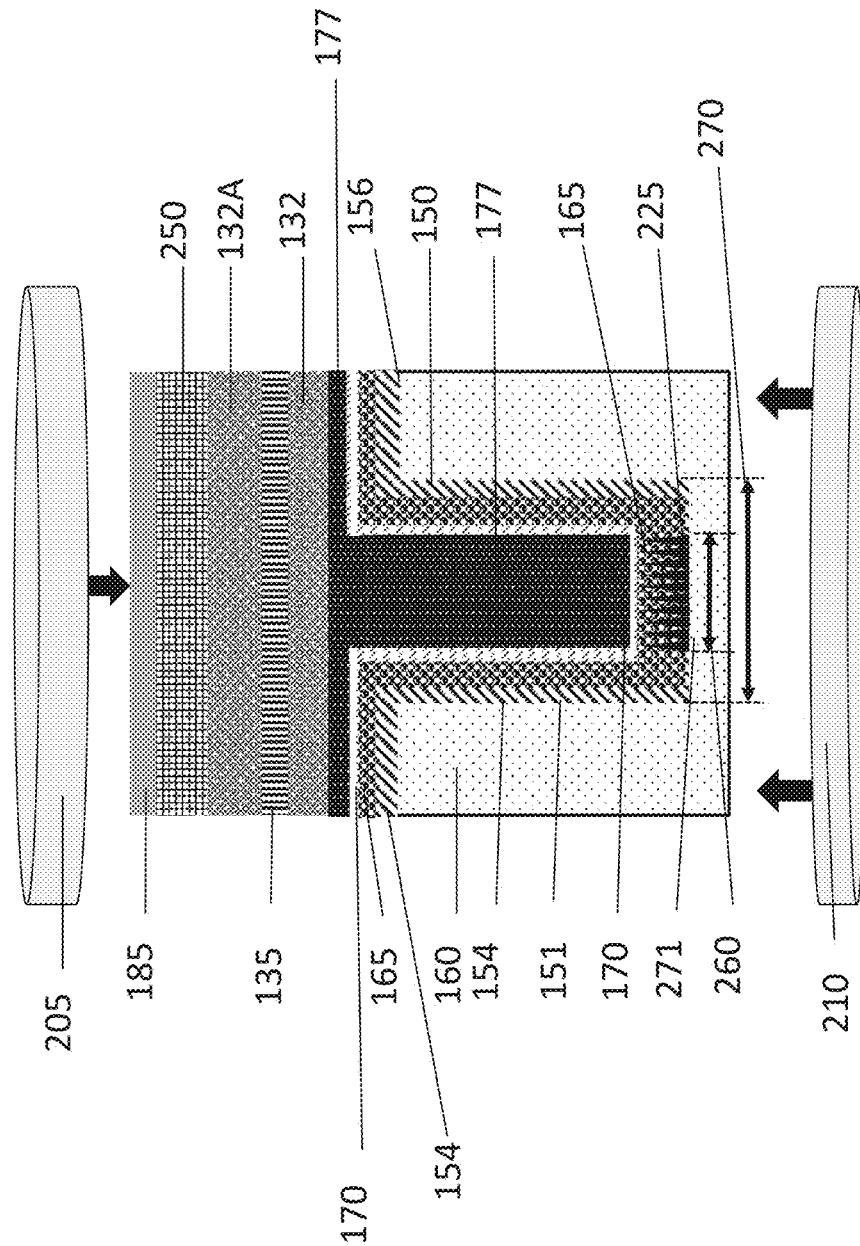
FIG. 2A is a diagram of a novel energy storage partially in-situ structure, with a trench wall and field layered anode layer, showing some component parts during current cycling before formation of a Lithium metal anode layer extending from the field to trench sidewall and the trench base of the device.

In some embodiments, see FIG. 2A, the bulk (or all) of the microbattery, e.g. the PAL embodiment, is housed entirely within (in-situ) an electrically insulating, patterned 3D silicon substrate. The silicon substrate, in combination with conformally deposited materials on a patterned/textured trench base 271 and insulating layers 154 on the trench sidewalls 151 form both an insulative packaging material as well as active electrode.

In general for the In-silicon microbatteries, the relative degree of active silicon electrode access to Lithium ion (Li+) diffusion as well as the thickness of Li-metal plating layers in the device is tuned by the user via composite electrode formation and is dependent on anode patterning conditions, e.g. deposition protocols of active anode materials applied to the device causing a transformation of the active anode area and the relative active anode area which incorporates active silicon material from the substrate. Hence, the final functioning form of the device disclosed herein, is an in-situ formed device. Ex-situ and partial ex-situ devices are also envisioned. In other words, the capacity, characteristics, and operation of the battery/microbattery can be designed, selected, controlled, manufactured, and implemented by precursor material selection, optional metal layer deposition at the substrate surface (optionally patterned/textured), and reforming/transforming microbattery components using a tunable process of anode deposition in/on various components of the device.

Precursor materials/additives like Aluminum metal. Aluminum Oxide ($Al_2O_3$), and additional corrosion-preventing and Li-conductive additives (e.g., LiTFSI-PANI) are combined and transformed, with the use of carbon based material (e.g., graphite), for use on/in the anode and above the device field, on the device sidewalls and across the bottom surface of the device 3D trench (trench bottom) to enable sustainable and reversible combinations of Lithium charge storage including Li-intercalation, Li—Si alloying and/or Li-metal metal plating. Furthermore, the precursor materials are chosen and implemented to suppress the electrochemically active silicon substrate breakdown during initial cycling (tuning) and over cycling due to operational charging and discharging.

The steps of the anode deposition and patterning process determine the relative area of active anode (e.g. for PAL cells entirely within trench or for PAH cell within trench and layered on sidewalls and layered on the field surface) and consequently determines the thickness of the Lithium-metal layers formed as well as the degree of intercalation-type charge storage, Li-metal plating at both the anode and cathode interfaces, and/or Li—Si type charge storage that will be present on/in the microbattery anode, 3D trench sidewalls, and field. Accordingly, these processes and different embodiment structures enable the consistent fabrication/making of hybrid, high power microbatteries with tunable energy and power densities and the resultant microbattery structures and compositions of matter.

In some embodiments, one composition of matter is an organic dielectric fibermat, used in the electrolyte composition. The fibermat (e.g., polyacrylonitrile (PAN)) can be used for the dual function of a dielectric separator as well as a flexible 2D substrate which energetically guides Li-metal as it plates and strips upon surfaces (e.g., carbon-containing surfaces) present in the battery/microbattery and in contact with the separator. Not only does the separator maintain dielectric separation, of the two electrode (anode and cathode) materials, but it also works as a scaffold-type structure to maintain homogeneity in Li-plating/stripping morphological structures-thereby suppressing the formation of cell-destroying Li-dendrite structures. Additionally, the use of conductive carbon-coated or adsorbed separators can be used to effectively suppress deleterious effects of Li-dendrite growth often observed in Li-plating and stripping processes. Aspects of the separately explored uses of the separator materials described above, similar to the separator material used in the present invention, are combined in the present invention, enabling a novel 3D energy storage device with tunable degrees of Li-metal plating, Li-intercalation and Li—Si type charge storage mechanisms.

Dielectric fibermats are used for the bi-modal function of a separator as well as a flexible 2D substrate which energetically guides Li-metal as it plates and strips upon electrode substrates. In conjunction with dielectric based materials, the use of carbon-based conductive and charge storage materials, which, when applied appropriately to specific separators, can introduce Li-bonding directed by polar surface functionality, which in turn can enables safe and sustainable, long-term cycling of high energy and power dense Li-plating type charge storage and batteries.

Aside from surface area, thickness and material related customizations, far more conditioning can be employed to favorably alter the performance of Li-based energy storage devices. The relative anode patterning can determine the relative degree of Lithium plating and Li—Si type charge storage as well as intercalation-type charge storage in composite type electrodes. Additionally, the inclusion of Lithium-insulating materials such as aluminum oxide ($Al_2O_3$) and silicon oxide ($SiO_2$) can promote or suppress one type of charge storage mechanism over another, and most importantly, can suppress the self-pulverization mechanism of active silicon material as it adsorbs and desorbs Li-ions, as well as repair defect sites originating from such degradation mechanisms Such control, using m-situ and/or ex-situ cell methods or design alterations for tuning a cell's charge storage mechanism(s) enables a pathway for the consistent fabrication of hybrid-type charge storage, high power and energy dense microbatteries.

Refer to the Figures.

FIG. 1 is a block diagram of one example conceptual structure 100 of an in-situ energy storage device, e.g. a lithium battery, after a after galvanostatic current is initially applied. The composite components and compositions of matter in the energy storage structure, e.g. a battery, are shown. In this embodiment, the structure 100 includes a composite anode 175 and an electrolyte composite 138. This 100 is an example of a PAL type embodiment where the composite anode 175 and Al2O3 layer 165 is entirely within the trench 150.

The electrolyte composite 138 has a dielectric separator 135 centered within and saturated by solid polymer electrolyte (SPE) 132/132A. The SPE 132 is on either side of the separator 135, e.g. a top layer of the SPE 132A interfaces with a cathode 180 on a top side of the separator 135 and a bottom layer of the SPE 132 interfaces with an electrolyte bottom 126 and/or anode transition layer top 120 on a bottom side of the separator 135. In some embodiments during manufacturing, an SPE layer 132A adheres to the bottom of the cathode 180 before the cathode is assembled into a trench 150. In one embodiment, the polymer components to the SPE are comprised of Polycaprolactone (PCl)/Succinonitrile (SN) where the polymer components, especially the SN, can migrate from the original deposition location to other parts of the cell (e.g., into the internals of electrodes) during the charge/discharge electrochemical cycling and formation of the Lithium metal anode layer 140.

In in-situ embodiments, e.g. a PAL cell, the structure 100 is within a trench 150, e.g. a trench cavity 158 within a substrate 160. An insulating layer 154 and a Lithium metal anode layer 140 contain the structure 100 internals, e.g. anode composite 175, electrolyte composite 138, and cathode 180, within the trench 150. In this non-limiting example in-situ embodiment, all the structure 100 internals are within the trench 150 (trench cavity 158).

Figure 2B:
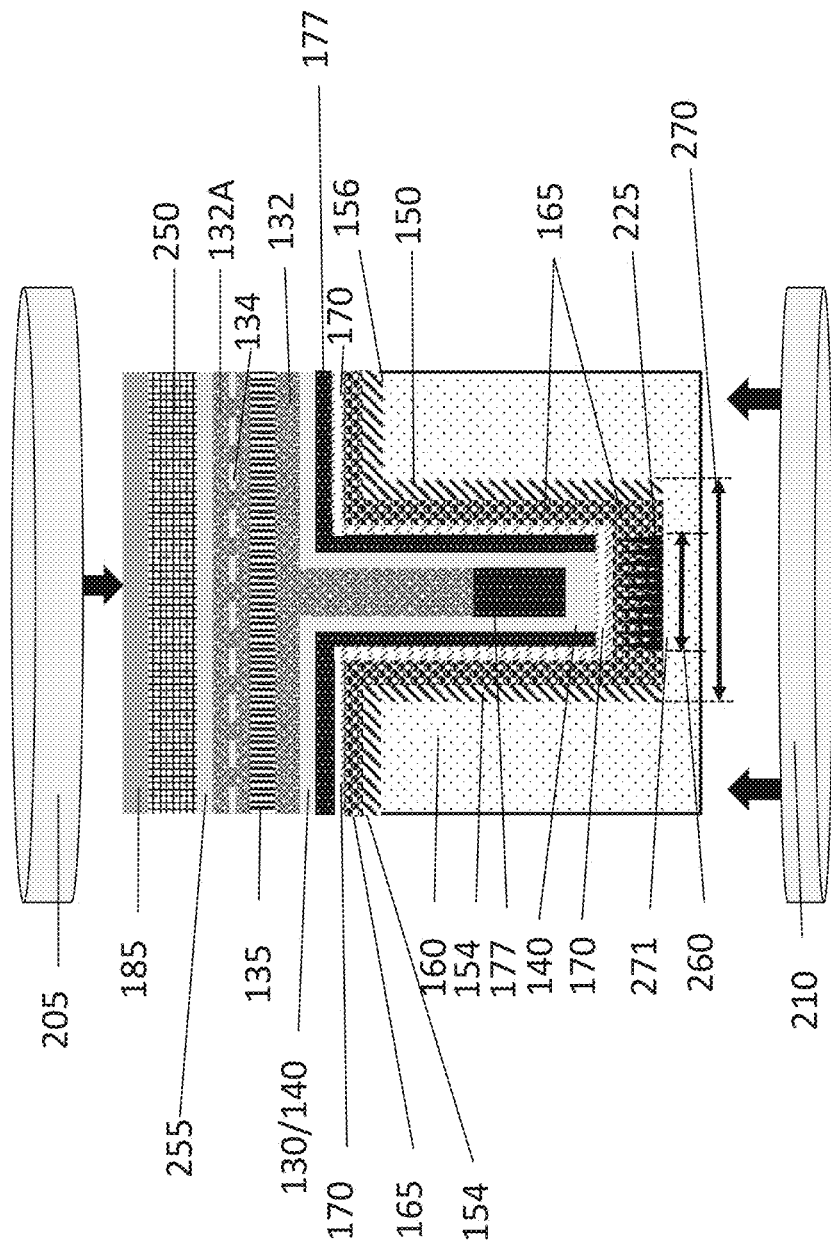
FIG. 2B is a diagram of a novel energy storage partially in-situ structure with a trench base and wall and field anode layer, e.g. a PAH cell, showing component parts during and after current cycling and after formation of a Lithium metal anode layer extending from the field and trench sidewall to the trench base of the device.

In alternative embodiments, e.g. a PAH cell shown in FIGS. 2A and 2B, some of these layers conformally cover the trench sidewalls 151 and top or field 156 of the substrate. In some embodiments, the anode layer 177, a Lithium metal anode layer 130, and a polymer layer 170 are layered on the field 156.

Exterior electrical connections to the structure 100 are made through a cathode contact 185 and substrate contact 199.

As a result of initial material (precursor) selection, placement, and structure and the application of an initial galvanostatic current cycling, movement of materials like Lithium ions, $Li^+$ 110, and polymers/plasticizer mixtures 115 cause a transformation, i.e. a dynamic electrochemical and physical changes, in situ in the trench cavity 158 that create new compositions and structures that result in the final operational structure 100. The anode composite 175 and the electrolyte composite 138 are two of these new compositions and structures that enable the enhanced performance of the battery structure 100.

During the initial galvanostatic current cycling, Lithium ions initially move due to a potential difference and high conductivity of the selected materials to diffuse the substrate 160 with Lithium ions ($Li^+$). In the PAL embodiment, as electrons are introduced through the substrate contact 199 and taken from the silicon atoms in the substrate 160, a Lithium metal anode layer 140 starts to form. The Lithium metal anode layer 140 eventually inhibits relatively high magnitudes of Lithium ions from penetrating or leaving the substrate 160, particularly the lithiated regions, or an electrically active surface 160A, regions, of the substrate 160A, and the Lithium ion diffusion in the Lithiated substrate 160A is substantially decreased. The Lithium metal anode layer 140 helps contain and isolate the battery internals during any mechanical or volume change due to lithiation/de-lithiation of the lithiated electrically active surface 160A of the substrate 160 (formation of a Lithium-silicon alloy) or plating and stripping from the Lithium metal anode layer 140. Lithium ions that move 110 through the structure 100 are provided and accumulated in the formed Lithium metal anode layer 140 therefore reduce the change in lithium ion concentration/density in the lithiated substrate/active surface 160A and hence reduce mechanical stress in the substrate 160—enabling a reversibly sustainable long-lasting novel energy storage device.

Also, due to the initial material (precursor) selection and placement and the novel processes used to create this structure 100, materials, e.g. polymers, plasticizers and Li-ions, move through the structure 100 during a galvanic current cycling to form the composite anode 175.

Selecting different patterns of anode deposition (and by selecting suitable magnitude of initial cycling current) determines how uniformly saturated with Lithium ions (Li-ions) the substrate 160 becomes and how thick the Lithium metal anode layer 140 will become as the Lithium metal anode layer 140 grows and shrinks in thickness during device operation. The level of substrate 160 saturation with Lithium ions (amount of Lithium ion diffusion into the substrate 160 and, as a result the density of Lithium ions in the Lithium-silicon alloy formed) and the thickness of the Lithium metal anode layer 140 determine one or more of the operating characteristics of the storage device 100.

As the Lithium metal anode layer 140 forms, a polymer 170 is in contact with the Lithium metal anode layer 140 and/or chemically and physically adheres to the top-side of the Lithium metal anode layer 140 via a conducting Li-salt containing polymer, e.g. Polyaniline (PANI) mixed with Lithium bis(trifluoromethanesulfonyl)imide (LiTFSI), material to form a novel conductive polymer adhesive layer 170. In an embodiment, the conductive polymer adhesive layer 170 contains PANI, Lithium based salt(s), e.g., LiTFSI and optionally conductive polymers/plasticizer mixtures, e.g. Polycaprolactone (PCl)/Succinonitrile (SN) where especially the SN migrates from the electrolyte to other parts of the cell (e.g., into the internals of electrodes) during the charge/discharge electrochemical cycling and formation of the Lithium metal anode layer 140. The Li-salt containing polymers in the conductive polymer adhesive layer 170 create a high ionic conductive region that reduces the internal resistance of the structure 100 while providing good adhesion between the transformed region of the central anode structure 177 and the active region 190.

Together the lithiated substrate (160, 160A), the Lithium metal anode layer 140, and the conductive polymer adhesion layer 170 comprise an anode transition layer bottom 171 which electrically, chemically, and physically transitions from more independently adhered layers (Active Region 190+polymer 170+anode material 177) to a lower impedance anode composite 175 which is composed of the precursor 3D textured anode material, e.g. porous silicon, graphite, polymer conductive adhesive, and polymer/plasticizer electrolyte mixture with LiTFSI of homogenous unitary construction due to the electrochemically induced intermixing of the anode material 177 and polymer material 170. Therefore, higher adhesion and lower charge transferring impedance is enabled between the polymer material 170, Lithium metal anode layer 140, and lithiated substrate/active surface 160A to the silicon substrate 160 material.

In addition, due to the migration of lithium ions 110 and polymer/plasticizer mixture 115 the central anode structure 177 is transformed into a composite structure of precursor anode material, e.g. graphite, polymer/plasticizer, LiTFSI-Containing PANI and lithiated compounds.

Between the central anode structure 177 and the electrolyte 132, two transition layers form: a polymer/plasticizer and electrolyte layer 126 which is an electrolyte bottom region 126 and a polymer/plasticizer/anode/lithium compound region 120 or an anode transition layer top 120. These two layers also form during the galvanostatic current cycling as selected materials move and combine.

The anode transition layer top 120 comprises precursor anode material, e.g. graphite, and polymer/plasticizer that migrated into the top of the anode from the electrolyte 138. In some embodiments, the polymer includes polycaprolactone (PCI) and the plasticizer includes succinonitrile (SN). Lithium salts, e.g. LiTFSI may also appear in the anode transition layer top 120. The composition of the anode transition layer top 120 creates a more conductive structure which reduces the battery internal resistance. In conjunction with the electrolyte bottom 126, the anode transition top 120 creates a strong adhesion between the anode composition 175 and the electrolyte composition 138, thereby even further reducing impedance due to charge transfer throughout the cell.

As mentioned, due to the selection and placement of materials and structures and after the galvanostatic current cycling, in some embodiments, the anode is transformed in situ into a anode unified, electrically-interconnected composite 175 of several different regions all chemically connected to one another and chemically, electrically, and structurally integrated to form a unified composite-thereby enabling low impedance to desired ion movement through the cell as well as low resistance to electrical flow through desired areas or materials (e.g. graphite material).

The regions of the anode composite 175 include the lithiated substrate 160A (e.g., 3D textured porous silicon, silicon substrate), lithium metal anode layer 140 (that grows and shrinks during charge and discharge cycles both during initial current cycling and during device operation), conductive polymer adhesion layer 170, central anode structure 177, the anode transition layer top 120. Due to the well-integrated nature of the anode composite 175, the volume changes experienced during the charging and discharging of Lithium species in and out of the anode composite 175, do not significantly affect the anode composite 175 nor the bulk substrate 160 in a deleterious manner—as commonly seen in the prior art via a volume-change dependent self-pulverization failure mechanism with Silicon based anode energy storage devices.

In addition, the electrolyte composition 138 is created comprising the electrolyte bottom 126, electrolyte 132, a separator material (e.g. a fabric-like inter-woven layer material like polyacrylnitrile, PAN) and an electrolyte top (above the separator and in contact with the cathode material). The electrolyte 132 is formed as explained above. However, during current cycling the polymer (e.g., PCI) and/or Lithium conducting plasticizer (e.g., SN) migrate throughout the cell vertically, in an up or down direction as current is applied to the full energy storage device. Hence the mobility of these SPE components enables a higher saturation of the anode material 177, thereby further contributing to the formation of the anode composite 175 with higher energy storage capacity and/or density, yet in addition, the electrochemical mobility of these materials with Li-ion movement throughout the cell, creates a well-integrated, void free and low impedance regions designated as the electrolyte bottom 126 and anode transition layer top 120—which also contributes greatly to the reversibly sustainable high performance of the In-Silicon energy storage device.

In addition, the components of the electrolyte material presented herein (e.g., PCI and SN) can be altered in density, hardness and pliability during cell cycling (in-situ). The combination of the polymer (PCI) and plasticizer (SN) components along with the high concentration of Li-salt (LiTFSI) present transform the originally deposited semi-solid polymer electrolyte material into a very hard, durable, yet flexible solid polymer electrolyte-which, via the hard, physical barrier properties of the in-situ formed SPE, can suppress any deleterious effects of Li-metal dendrite formation and potential cell failure.

A separator layer 135 is saturated with the electrolyte 132 and adhered or close to the cathode 180. In some embodiments, the separator 135 adheres to the cathode 180 surface prior to saturating the separator 135 with ion-conductive material 132. Once the separator material is saturated, solid polymer electrolyte material resides on both the top and bottom sides of the separator-thereby contacting the material both above (e.g., cathode) and below (e.g., SPE) the separator, where the separator resides within the solid polymer electrolyte bulk.

The separator 135 acts as a dielectric—but, in addition and critically, the separator 135 is a dielectric which allows for ions (Li-ions) to flow through it 135, but not electrons. If electrons were able to flow through the center region of the cell, then the cell efficiency would decrease proportionally with electrical (electron) conductivity of the separator. In the case of Lithium batteries, dendrites may form due to high separator electrical (electron) conductivity, creating the hazard of separator puncture and electrical connection between the two electrodes-thereby disabling the cell via short circuiting of the cell.

In the present invention, the separator (PAN) 135 is a woven fabric-like polymer material which is not conductive to electrons. However, because it is an interwoven, fabric like material, it can be easily saturated with the polymer electrolyte (PCI/SN). This saturation means that there is complete physical/chemically and therefore ionic transport through the separator 135. In a preferred embodiment, the separator 135 is a polymer electrolyte saturated separator 135. In a preferred embodiment, the electrolyte 132 is a SPE structure, described above, where there is polymer electrolyte (PCI) above, in the middle of and below the separator 135 material.

In some embodiments the PAN separator 135 can be used for the dual function of a dielectric separator as well as a flexible 2D substrate which energetically guides Li-metal as it plates and strips upon surfaces (e.g., carbon-containing surfaces and/or the conductive polymer adhesive material (e.g., LiTFSI-PANI)) present in the battery/microbattery and in contact with the separator. Not only does the separator maintain dielectric separation, of the two electrode materials, but it also works as a scaffold-type structure to maintain homogeneity in Li-plating/stripping morphological structures-thereby suppressing the formation of cell-destroying Li-dendrite structures. Additionally, the use of conductive carbon-coated or adsorbed separators can be used to effectively suppress deleterious effects of Li-dendrite growth often observed in Li-plating and stripping processes by controlling the directionality of Li-metal as it plates on the separator-adsorbed carbon material. Aspects of the separately explored uses of the separator materials described above in the prior art, similar in function to the separator and carbon based material used in the present invention, are contemplated for use in the present invention, enabling a novel 3D energy storage device with tunable degrees of Li-metal plating, Li-intercalation and Li—Si alloying type charge storage mechanisms.

While the description of FIG. 1 discloses one embodiment of an energy storage device, the inventions further disclosed below are not limited to structure 100 or to structures in situ but are intended to be used in any general energy storage structure.

As described below, in some embodiments, the substrate 160, specifically the lithiated substrate region 160A is patterned or textured to create a surface of trenches or "silicon spikes" 225 or 3D spikes/peaks containing porous silicon material (shown in FIGS. 2A and 2B).

In other embodiments, a thin metallic layer, e.g. Aluminum Oxide ($Al_2O_3$), 165 is deposited, e.g. as a precursor material, over the patterned or non-patterned surface 160A of the substrate 160 and on the trench sidewalls 151/liner 154 of the trench and over the field region 156 of the trench. In some embodiments, the layer of $Al_2O_3$, is deposited by standard deposition techniques like atomic layer deposition (ALD).

FIG. 2A is a block diagram of a novel energy storage device with active anode material (LiTFSI-PANI & graphite slurry) layered on the active silicon region at the base of the trench, on the sidewalls and on the substrate field 156, which is formed partially in-situ structure 200 showing some component parts during initial current cycling and before formation of a Lithium metal anode layer.

The structure 200, as an example, is not totally contained within the confines of the 3D trench of the substrate. In this non-limiting example, the cathode contact 185, separator 135, and electrolyte (132, 132A) are outside of the trench 150 and disposed on the field 156, as well as inside the trench. The field 156 is the surface of the substrate 160 outside of the trench 150. Additionally, the active anode material 177, the polymer 170, and, upon cycling or in-situ, the Lithium metal anode layer 140 is layered on the trench sidewalls 151 as well as outside of the 3D trench on the field 156. Structure 200 is shown before being cycled and is a precursor to a PAH embodiment.

Structure 200 is partially encapsulated in the trench 150 of the substrate 160. A liner/insulator 154 covers the sidewalls 151 of the trench 150 and can overlap on the field 156. The liner 154 is made of a dielectric, electrically insulating material like Silicon Dioxide ($SiO_2$) or Silicon Nitride ($Si_3N_4$) or a combination of the multiple insulating layers, deposited by known methods.

The liner 154 does not cover the active surface 160A of the trench base 271, the surface of the trench bottom area 270 between the liner 154 layers on the sidewalls 151 of the trench 150. The electrically active surface 160A and the trench bottom area 270 of the trench base 271 are the bottom area where the trench 150 initially interfaces with the substrate 160 before galvanic cycling causes the transformations at these surfaces to initially form the lithiated substrate region 160A and the Lithium metal layer 140 of the anode transition layer bottom 171 (see FIG. 1).

In one embodiment of this invention, the electrically active surface (160A, 260) is texturized and porosified as described below before deposition of the precursor materials and galvanic current cycling. In some embodiments, the active surface (160A, 260) is 500 microns by 500 microns and the trench bottom area 270 is 1 $mm^2$. In other embodiments, the active surface 260 area is approximately the area of the trench bottom, +/−5%. However, these dimensions are scalable using known methods and other areas are envisioned.

As described in more detail below, in some embodiments a thin metallic layer 165, e.g., Aluminum Oxide ($Al_2O_3$), is deposited over the active patterned surface 225 of the substrate 160. In some embodiments where there is an active patterned/textured surface 225, the patterning/texturing is done before the thin layer of $Al_2O_3$ is applied.

In some embodiments, the $Al_2O_3$ layer 165 is deposited over a non-patterned surface of the substrate 160. In another embodiment, the $Al_2O_3$ layer 165 is deposited over the active patterned surface 225 and partially or entirely over the insulated layer 154 on the sidewalls 151. In still other embodiments, over the $Al_2O_3$ layer 165 deposits entirely on insulated layer 154 and on the field 156 of the substrate 160. The different layering of the $Al_2O_3$ layer 165 are performed by known masked deposition techniques like atomic layer deposition (ALD).

In some embodiments, e.g. the PAH, the $Al_2O_3$ layer 165 is deposited on the whole substrate 160 including the trench base 271 and over the insulated layer 154 on the sidewalls 151 and the field 156. Before the $Al_2O_3$ layer 165 is deposited, the insulated layer 154 is removed from the trench base 271 (whether the trench base 271 is patterned or not). Therefore, the $Al_2O_3$ layer 165 is in direct contact with the substrate (160, 160A) at the trench base 271. However, the $Al_2O_3$ layer 165 is dispose on the insulated layer 154 on the sidewalls 151 and field 156.

The $Al_2O_3$ layer 165 deposited on the sidewalls 151 and field 156 acts as an additional insulating and protective layer (like the insulated layer 154) protecting regions with Li—Si type charge storage and the silicon in the substrate 160 from degradation. Additionally, the $Al_2O_3$ layer 165 deposited on the field 156 can work in conjunction with the LiTFSI-PANI and graphite to induce the separator-controlled Li-plating effect on the field 156.

In another embodiment, the $Al_2O_3$ layer 165 acts as a stable surface for lithium metal plating and stripping when the $Al_2O_3$ layer is in contact with conductive material(s) (e.g., conductive adhesive, LiTFSI-PANI and/or graphite). In yet another embodiment, the $Al_2O_3$ layer 165 acts as a stable surface for lithium metal plating and stripping when the $Al_2O_3$ layer is in contact with conductive material(s) (e.g., conductive adhesive, LiTFSI-PANI and/or graphite), as well as a micro and/or nano-structure stability enhancer-which allows for reversible and sustainable Lithium diffusion in silicon by acting as a robust, yet flexible top surface layer-thereby preventing silicon pulverization failure mechanisms and long-term charge storage performance.

In another embodiment, Li-metal plating and stripping can occur on the sidewalls 151 of the 3D trench when the anode material is layered on the trench base 271, trench sidewalls 151 and substrate field 156.

The layering of the Al2O3 does not necessarily determine if PAL or PAH is created. Primarily, the layering of the anode (graphite slurry+(especially) the conductive adhesive layer) determines if PAL or PAH forms. In some embodiments, when deposited, the Al2O3 deposited on all surfaces—in the trench 150, on the sidewalls 151, and on the field 156. In these embodiments the Al2O3 enables a good insulation, protection, and a Li-metal plating surface on surfaces and suppresses Li-ions penetrating or diffusing into underlying regions (e.g., into the field). An Al2O3 deposited on the non-insulated trench base 271 allows the Al2O3 to enable a mechanically stabilized, reversible Li—Si type charge storage.

Li-plating (Lithium metal layer 130 in FIG. 4) occurs on the field 156 in PAH cells because the anode 177 is layered on the field 156. The Al2O3 acts as a support surface to better planarize the Li-metal plating 130 as well as protect the underlying silicon bulk 160.

In some embodiments the anode composite 175 will include the anode material/polymer/plasticizer/Li compounds 177 along with the polymer (e.g., LiTFSI-PANI mixture) 170, Lithium metal anode layer 140, described in FIG. 1 and the thin metallic layer (e.g., $Al_2O_3$) 165. However, other anode compositions 177, including those known in the art, are envisioned.

In some embodiments, the adhesive region 170 is a layer that covers the trench base 171, the sidewalls 151 of the trench 150, and overlaps on the field 156, e.g. over the liner/insulator layer 154 and $Al_2O_3$ layer 165.

In some embodiments, e.g. the PAH cells, the anode composition (e.g., graphite mixture and conductive adhesive) 177 also covers the sidewalls 151 of the trench 150 and overlaps the field 156, as well, e.g. over the liner/insulator 154 layer, $Al_2O_3$ layer 165, and the conductive adhesion region 170.

Structure 200 has an electrolyte layer 132 with a separator layer 135. In some embodiments, the electrolyte layer 132 is a solid polymer electrolyte (SPE), for example, as described in FIG. 1. However, any electrolyte material would function in the structure 200.

The layer 132A shows one embodiment of the electrolyte composite 138 where the electrolyte saturates through the separator layer 135 and forms layers (132, 132A) on either side of the separator layer 135.

The cathode 250 is electrically connected to a cathode contact 185 which is a conductive material, e.g. a metal like Aluminum (Al). In some embodiments, the cathode contact 185 is connected to another top outside contact 205 like a coin cell conductive spacer and/or casing.

As described later, during operation, the cathode 250 is affected differently and a Lithium metal cathode layer 255 is formed differently in the PAL cells versus the PAH cells.

In some embodiments, a bottom outside contact 210, like a coin cell casing is attached to the substrate 160.

FIG. 2B is a diagram of a novel energy storage 295 partially in-situ structure, e.g. a PAH cell, showing component parts during and after initial current cycling and after formation of a Lithium metal field layer 130/140 forming on the field 156 (over the insulating layer 154, metal layer 165, polymer layer 170, and anode 177) down the trench sidewalls 151 and continuously connecting to the Lithium metal anode layer 140. A Lithium metal cathode layer 255 also forms on the cathode 250.

Depending on where there is deposition of the anode material 177, Lithium metal either plates only at the base of the trench 140 (e.g. in the PAL cell) or at the base of the trench 140, along the sidewalls 151 and on the field 156/130 forming a PAH cell. In other words, the PAL cell has a Lithium metal anode layer 140 only at the trench base while the PAH cell has a continuous Lithium metal field layer 130/140 that forms on the trench bottom 130, up the sidewalls 151 and on the field 156 (over 154, 165, 170, and 177).

In some PAH embodiments the Lithium metal field layer 130/140 is formed on and/or in a mixture of the anode composition (e.g., graphite mixture) layer 177 and the conductive adhesive layer 170. For instance, the thickness of Lithium metal field layer 130/140 increases causing the Lithium metal field layer 130/140 to migrate into and combine with the anode 177 within the trench 150. In this manner, the anode 177 coated sidewalls allow for spatial compensation and mechanical stress/spatial relief from the growing Lithium meatal field layer 130/140.

In some PAH embodiments the Lithium metal field layer 130/140 moves into and combines with the anode composition (e.g., graphite mixture and conductive adhesive layer) layer 177 below the electrolyte layer 132, and with increased cycling the Lithium metal layer 130/140 can extend upward, e.g. to upper level 134 and above, through the electrolyte layer 132 and separator layer 135. Thus, the Lithium metal field layer 130/140 thickness and the top 134 of the Lithium metal field layer 130/140 can vary during and depending on the operational current cycles over the lifetime of the storage device 295.

Testing has shown that in the device 295, the 3-dimensional trench 150 acts as a "compensating space" for the Lithium metal field layer 130/140 growth. The Lithium metal field layer 130/140 plating grows both upward from the field 156 and between the sidewalls 151 through the anode 177. The top 134 of the Lithium metal field layer 130 can grow upward from the field 156 to above the separation layer 135.

The Lithium metal cathode layer 255 is a layer of Lithium metal that forms on the cathode 250. In some embodiments, after many cycles, the Lithium metal cathode layer 255 actually replaces the cathode 250. However, testing has shown that any potential failures that are caused by short circuiting of the Lithium metal field layer 130/140 and the Lithium metal cathode layer 255 occur after over 250 cycles. It is thought that the lifetimes of these cells are extended since the Lithium metal field layer 130/140 upward growth toward the Lithium metal cathode layer 255, and eventual failure, is delayed. Hence, controlling the upward growth of the Li-metal layer can be even further mitigated or enhanced with additional trench patterning in the vicinity of the Li-metal field layer.

FIGS. 3, 3A, 3B, 4, 4A, and 4B are block diagrams of components of different embodiments of these energy storage devices showing the above described features and the Lithium storage "tunability" of the design, structure, and function of the energy storage devices (100, 200, 295) enabled by application of different layering layouts of active precursor materials, specifically active anode materials (e.g., LiTFSI-PANI, graphite slurry) during the initial formation and integration process of the battery components. While these components are shown as not completely encapsulated, embodiments with components both partially and completely in-situ are contemplated. Energy storage devices of larger scale with the same properties are also contemplated.

The initial compositions of matter used to make the devices may be the varied, resulting in differences related to the operational performance of the devices, which vary depending on the material transformations caused by the initial current cycling the device (100, 200, 295) experiences after assembly/deposition of the precursor materials and how the layers, e.g. the anode layer, are initially deposited.

Whether the anode 177 is i. layered only on the trench base 260/225 or within the trench 150 on the trench sidewalls 151, e.g. the PAL embodiment (FIGS. 1 and 3), or ii. the anode 177 is layered on the trench base 260/225, on the trench sidewalls 151, and on the substrate field 156 (shown in FIGS. 2B and 4), e.g. PAH embodiments, determines if:i. Li-metal is plated only in the trench 150, e.g., PAL, or ii. in the trench 150, on the sidewalls 151 and on the field 156, e.g., PAH. This results from the Li-metal being plated only where the conductive adhesive 170, and anode composition 177 layers are deposited. Additionally, the relative amount of Li-metal plated on the trench base 260/225, determines the relative amount of Lithium species which can diffuse reversibly in and out of the lithiated substrate 160A and silicon bulk substrate 160, e.g. in the P and PAL embodiments versus the PAH embodiment. Hence, the relative layering of the anode determines if the Li-metal anode layer at the trench base 160/225 acts a barrier against Li-ion diffusion into and out of the active silicon substrate at the base of the trench (FIG. 4), or enables diffusion in and out of the active silicon trench (in the PAL embodiment of FIG. 3).

For example, if the initial structure contains an anode layered only on the active silicon at the trench base 160/225, e.g. the P embodiment—with no Al2O3 layer- or in the PAL embodiment (with an Al2O3 layer), the spatial and physiochemical mechanism of Li ions permeating (described above in FIG. 1) through the battery precursors, e.g. into the silicon substrate (160, 160A), creates a structure that functions more in a "diffusion mode" with minimal Li-metal plating on the active trench base 271, as shown in the PAL embodiment of FIGS. 3 and 3B. No Li-metal plating or charge storage occurs on the substrate field 156 (FIG. 3A).

However, if the initial structure contains an anode layered on the active silicon at the trench base 160/225, on the trench sidewalls 151, and on the substrate field 156, e.g. the PAH embodiment, the transformation of the precursors creates a structure that function primarily in a "plating mode", as described in FIGS. 4,4A, and 4B. Here, Li-metal plating is the predominant form of charge storage where Li-metal is plated 130 on the substrate field 156 (FIG. 4A) where the Li-metal plating 130 can grow or shrink on the 2D field, down the trench sidewalls 151 and on 140 the trench base 160/225.

Therefore, by choosing the deposition layering of the anode, in combination with ubiquitous Al2O3 deposition, and precursor materials, the performance and characteristics of the energy storage device can be pre-designed and predictably manufactured and controlled. The pre-design selection of primarily a "diffusion mode" or "plating mode" enables significant differences in the average performance metrics including the energy and power density of the energy storage devices.

The deposition layering of the anode precursor materials controls the initial diffusion process of Li-ions through the $Al_2O_3$/Silicon interface into the substrate (160, 160A) and, as a result, the density of Li-ions in the substrate (160, 160A), e.g. the Li-ion density in the formed Lithium-silicon alloy. Accordingly, the operational characteristics of the battery after the battery is initially current cycled are controlled by the anode deposition patterns employed.

Improved storage device performance is partially enabled and/or enhanced by providing a patterned 3D porous silicon ("spiked") 225 substrate (160, 160A) active region 190/260, discussed above, with a thin metallic layer, e.g. $Al_2O_3$, deposited over and throughout the patterned 3D porous silicon 225 substrate. Additionally, other material layer components such as the polymer/plasticizer electrolyte 132 and/or the anode 177 and/or the conductive adhesive 170 components can migrate or move into the patterned 3D porous silicon 225 substrate (160, 160A) active region 190/260 upon deposition and/or with electrochemical cycling-thereby increasing the electrochemically available surface area of charge storage vacancies.

For example, in some embodiments, the substrates 160 contain silicon porous and textured 3D features, e.g. in a 1 mm×1 mm square×250 to 300 micrometer (um) deep square well trench 150 for each battery. Silicon dioxide ($SiO_2$) is used in the liner/insulator 154 to insulate the field and sidewalls of each trench. At the center portion 260 of each trench 150 base 271, insulation is etched away via a combined laser ablation and dilute HF patterning process-significantly increasing the electrochemically accessible silicon surface area 270 of the later Lithiated part of the substrate 160A. In some embodiments, the pattern 225 is formed on the substrate surface 160A at the trench base 271 by a laser raster patterning that creates an array of high aspect ratio 3D "silicon spikes" 225. (Other patterning methods are envisioned.)

The laser raster method allows for a high range of ability to adjust the spike dimensions and aspect ratios. An additional benefit of the laser patterning is that the underlying silicon bulk now also has a "tunable porosity". In some embodiments, the pattern has a pitch of between 5 microns and 50 microns and a depth between 1 micron and 20 microns. In some embodiments, the depth of the pattern is greater than or equal to 0.5 microns.

By tunable porosity is meant that the surface area of the silicon substrate (160, 160A) at the trench base 271 is adjusted by the patterning the surface area and pore-creation and pore-depth penetration into the substrate 160 volume at the substrate surface. This increased surface area and deep pore penetration allows more Lithium ions per unit volume to penetrate over the larger area of the trench base 271 and increases the area per unit volume of substrate into which the Lithium ions penetrate due to the diversified porosity formed within the substrate 160. Increasing or decreasing the pitch and/or depth of the patterning of the trench base 271 causes the density of Lithium ions, e.g. the percentage of Lithium ions in the Lithium-silicon type charge storage, along with other material components such as the $Al_2O_3$ deposited particles 165, polymer/plasticizer electrolyte 132 and/or the anode 177 and/or the conductive adhesive 170 to increase or decrease accordingly for a given anode pattern defined cell.

This effect is preserved for given anode patterned cells even after a layer of $Al_2O_3$ 165 is deposited over the patterned 225 trench base 271. Choosing a correct thickness for the $Al_2O_3$ layer 165 and "tuning" the porosity affects how the particles/molecules of $Al_2O_3$ are distributed, mobilized and spaced throughout the 3D volume 160A of the porous silicon substrate 160 material.

Additionally, the relative anode layering determines if the initial charging of the anode with Li-ion particles are deposited "on" or "in" the active silicon substrate (160, 160A) at the trench base 271, as plated Li-metal or Li—Si type charge storage species. When utilizing a microbattery with the anode layered at the trench base 271, on the sidewalls 151, and on the field 156, e.g. the PAH embodiment, the cell engages in "plating mode", as the $Al_2O_3$ layer acts a barrier to Li-ion diffusion into the silicon bulk and also partially insulates the active silicon surface to better enable homogenous Li-metal plating on the silicon surface. Here, a Li-ion diffusion-barrier is further created from thick Li-metal plating which greatly suppresses diffusion in the silicon and subsequent Li—Si type charge storage species. The thick Li-metal plating and stripping is the primary mode of charge storage in "plating mode" and consequentially, the $Al_2O_3$ particles enable a highly protected active silicon substrate (160, 160A) at the trench base 271 and bulk silicon substrate 160 which displays virtually no sign of volume changes or degradation after greater than 250 charge/discharge cycles.

When microbatteries are assembled with an anode layered only on the active silicon at the trench base, e.g. the PAL embodiment, the $Al_2O_3$ induces "diffusion mode." Here, a Li-ion diffusion-facilitating structure is created which enables high diffusion in the silicon substrate and sustainable Li—Si type charge storage.

Further, in "diffusion mode," the $Al_2O_3$ particles become lithiated, or lithium-encapsulated. These lithium-encapsulated $Al_2O_3$ particles can vary in diameter and spatial distribution, wherein the spatial distance between the initial $Al_2O_3$ particles, when the $Al_2O_3$ deposition thickness is in the preferred embodiment range, allows for the volumetric changes of the lithium-encapsulated $Al_2O_3$ particles to grow without creating a self-pulverization effect. In between neighboring lithium-encapsulated $Al_2O_3$ particles, there is a resultant porosity—both greater than 2 nm in diameter (microporosity) or less than 2 nm in diameter (ultra-microporosity). The porosity and close spatial order of the Lithiated-$Al_2O_3$ particles facilitate the reversible diffusion of Li-ions.

Simultaneously, the lithium-encapsulated $Al_2O_3$ particles creates a mechanically robust "cap" on top of both 2D and 3D active silicon substrate (160, 160A) at the trench base 271, where this "cap" binds and maintains a compressive, yet elastic force on the active silicon substrate (160, 160A) at the trench base 271, and the bulk silicon substrate throughout 160. As the volume expands and contracts in the active silicon substrate (160, 160A) at the trench base 271 and silicon bulk 160 during charge and discharge, concurrently, this $Al_2O_3$ cap region also expands and contracts but stays relatively intact, flexible, Li-conductive and well adhered to the substrate as it suppresses and mitigates against silicon-self-pulverizing degradation effects, nor do the particles in the silicon bulk spatially change with respect to their distance from each other in a significant manner.

During cycling, the lithium-encapsulated $Al_2O_3$ regions prevent/inhibit any pulverized Silicon particles from spatially separating. This enables the preservation of the 3D porous surface volume structure 160A and the bulk silicon substrate 160, (FIGS. 5, 5A, 6A, 6A1, 9A, 9B, 10, 11A, 11B, 12A-C, and 16A) resulting in non-pulverization and low resistance to transfer charge species throughout the composite anode (FIGS. 24A and 24B), active silicon substrate (160, 160A) at the trench base 271, and the bulk silicon substrate throughout 160, even after more than 250 operational charge/discharge cycles. In this way, this technology prevents a common cell failure mechanism of Silicon anode batteries where cycling causes volume changes, self-pulverization, which in turn increases electrochemical resistance beyond sustainable cycling magnitudes.

There are trade-offs in the selection of the thickness of the $Al_2O_3$ layer 165 deposition. A layer 165 that is too thin increases the spatial distance of the $Al_2O_3$ particles/molecules in the $Al_2O_3$ layer 165, which results in a weaker bound "cap" layer on the top surface. As reversible diffusion proceeds in and out of the silicon material, the excessive volume changes also break apart the $Al_2O_3$ layer 165—resulting in high resistance runaway due to large spatial separation of pulverized or degraded silicon material and consequentially cell failure. A layer 165 that is too thick acts as a more absolute barrier to the flow of Lithium ions and electrons into and out of the silicon substrate (160, 160A), i.e. limits the Lithium ion diffusion of the entire cell, which prevents both the lithiation of the silicon substrate (160, 160A) and reversible Lithium plating and stripping. Too thick of an Al2O3 layer can create a fully insulated anode, where the cell experiences far too much resistance to mobilize any Li-ions within the system and the cell experiences charge-transfer failure.

In some embodiments, the thickness of the $Al_2O_3$ layer 165 is between 0.1 nanometer (nm) and 0.7 nm. In some embodiments the thickness of the $Al_2O_3$ layer 165 is between 0.1 nanometer (nm) and 0.5 nm. In some embodiments the thickness of the $Al_2O_3$ layer 165 is 0.5 nm.

In some embodiments, the $Al_2O_3$ layer 165 agglomerates after deposition on the substrate prior to or after deposition of other precursor materials.

In some embodiments, the $Al_2O_3$ layer 165 agglomerates after deposition on the substrate, after deposition of other precursor materials and upon completion of the full energy storage device.

In yet another embodiment, the $Al_2O_3$ layer 165 agglomerates after deposition on the substrate, after deposition of other precursor materials, upon completion of the full energy storage device and after current cycling of the full cell.

FIG. 3 is a block diagram of an energy storage, e.g. battery, embodiment 300 after the device precursor materials deposited and contain an anode layered only on the trench base 271/160/225, tuning a device toward the diffusion mode.

The components of this embodiment 300 are described in the description of FIG. 3, as follows. The components included in FIG. 3 are identical to those outlined in FIG. 2A. However, the difference lies in the anode layering. Where FIG. 2A illustrates the deposited anode materials being on the surface of the trench base 271/160/225, sidewalls 151, and field region 156, FIG. 3 illustrates a similar device, yet with the deposited anode materials residing only on the trench base 271/160/225. No anode materials are in contact with the upper sidewall regions 151 nor on the field 156. In this way, the reversible storage of Li-species is isolated only to the trench base 271/160/225 and underlying active silicon substrate 190/260.

FIG. 3A is an expanded view of the top of the trench 150. An Al2O3 layer 165 is deposited on the trench side walls 151 and the solid polymer electrolyte (SPE) 132 is within the trench 150 and deposited on the Al2O3 layer. There is no composite anode 177 or Lithium metal field layer 130 on the field 156 nor along the sidewalls 151. There is a small Lithium metal anode layer 140 at the base of the composite anode 177.

In addition, a thin Lithium metal cathode layer 255 forms on the cathode 250. The trench base 171) of the energy storage device 300 tuned/transformed toward the diffusion mode, as the active anode 177 material is only layered in the 3D trench. In this embodiment, there is no Lithium metal field layer between the insulation layer 154 on the field 156 and the electrolyte (e.g. SPE) 132.

In FIG. 3B, the thinner Li-metal anode layer (140, 315) on the active silicon substrate (160, 160A) at the trench base 271 is maintained throughout the operation of the cell due to the low resistance and high diffusivity of Lithium at the active silicon substrate (160, 160A) at the trench base 271, as enabled by both the trench-only deposited anode patterning in combination with the deposited $Al_2O_3$ layer.

During operation of the battery 300, i.e. after the initial current cycling transforms/tunes the battery 300 internals, no Lithium metal field layer 130 forms. For example, during operation, as the battery 300 discharges Lithium ions ($Li^+$) flow through the battery 300 layers/components from the Lithium metal anode layer (315, 140) and the active silicon substrate (160, 160A) at the trench base 271 to the cathode layer 250—where the bulk of the Li-species are mobilized from the active silicon substrate (160, 160A) at the trench base 271. Some degree of the composite LMOF/SPE cathode is transformed to Li-metal 255 and plated on the adhered aluminum current collector (250, 185), during the discharge process. This transformation phenomena is proportional with the relative anode layering inherent to the cell design. During operation, as the battery 300 charges, the Lithium ions ($Li^+$) flow through the battery 300 in the opposite direction from the cathode layer 250 to the Lithium metal anode layers (315, 140) and the active silicon substrate (160, 160A) at the trench base 271—where the bulk of Li-species are stored in the active silicon substrate (160, 160A) at the trench base 271. Accordingly, the thicknesses of the Lithium metal anode layer 315/140 and Lithium metal field layer 130 grow and shrink during the operational charge and discharge cycles throughout battery operation during the conversion of Lithium ions to Li—Si alloys (in the active silicon substrate)

and to Lithium metal (at the layers) when forming the Li—Si and Li-metal layers, and back again.

FIG. 3B is an expanded view of the lower anode region 360 of the energy storage device 300 in FIG. 3. After the initial cycling current, the Lithium metal anode layer (315, 140) forms around and throughout the metal, e.g. $Al_2O_3$, layer 165 and, in general, below the conductive polymer adhesive layer 170. The initial current cycling creates a robust, conductive conduit for Li-ions to reversibly pass into and out of the active silicon substrate (160, 160A) at the trench base 271 which is facilitated by the pronounced Lithium encapsulation/nucleation effect of $Al_2O_3$ particles 165 only achieved in cells where the anode is isolated only to the trench base. Additionally, the Li-metal layer forms throughout and around (encapsulates) the topmost $Al_2O_3$ deposited material 16S. Hence, the thin Li-metal layer 315 which forms at the trench base 271 contains the topmost $Al_2O_3$ particles via Li-metal encapsulation of the $Al_2O_3$ particles. The $Al_2O_3$, Li-encapsulated layer may grow upwards in size with more plating on subsequent charge cycles (and decrease with discharge). During operation, the Lithium metal anode layer 315/140 thickness varies between 5 nm and 1000 nm. However, the bulk of Li-ion movement and charge storage takes place in the active silicon via reversible permeation through the active silicon at the base of the trench. Hence, the "thinness" of the $Al_2O_3$ containing Li-metal layer 315/140 facilitates an electrochemically robust in-situ formed conduit for Li-ions to diffuse in and out of the active silicon substrate 160, 160A—as the ions pass through the $Al_2O_3$ containing thin Li-metal layer in a low resistance manner. Isolating the anode to only to the trench base causes a higher density of Lithium-ion charges 350 to be stored in the substrate 160, via the formation of a robust Lithium metal encapsulated $Al_2O_3$ layer at the top of the textured silicon substrate residing at the base of the trench, particularly in the lithiated substrate 160A region.

Note that for the trench-only layered anode case shown in FIG. 3B, the thin $Al_2O_3$ layer 165 is disposed conformally on and inside the porous silicon "spikes" 225 allowing the lower part of the Lithium metal anode layer 315 to penetrate between the silicon "spikes" 225 creating more surface area through which the Li-ion can diffuse in and out of the active silicon substrate (160, 160A).

Figure 5:
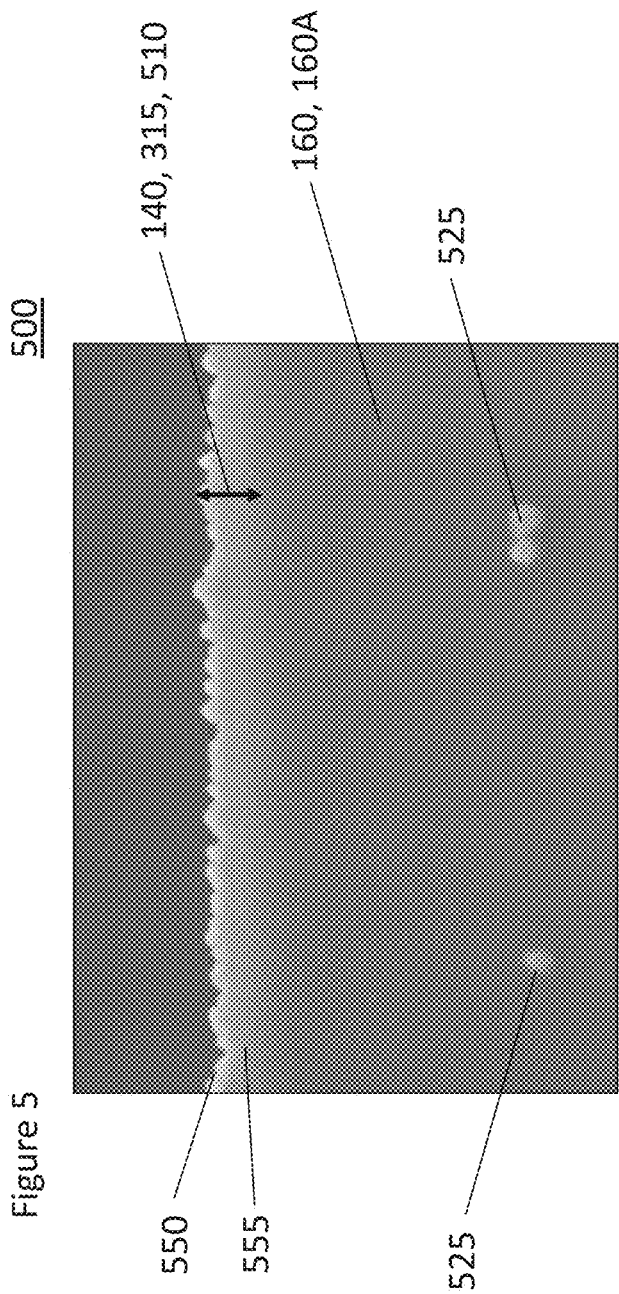
FIG. 5 is a micrograph of a PAL cell trench bottom with Lithium ions encapsulated with Al2O3.
Figure 5A:
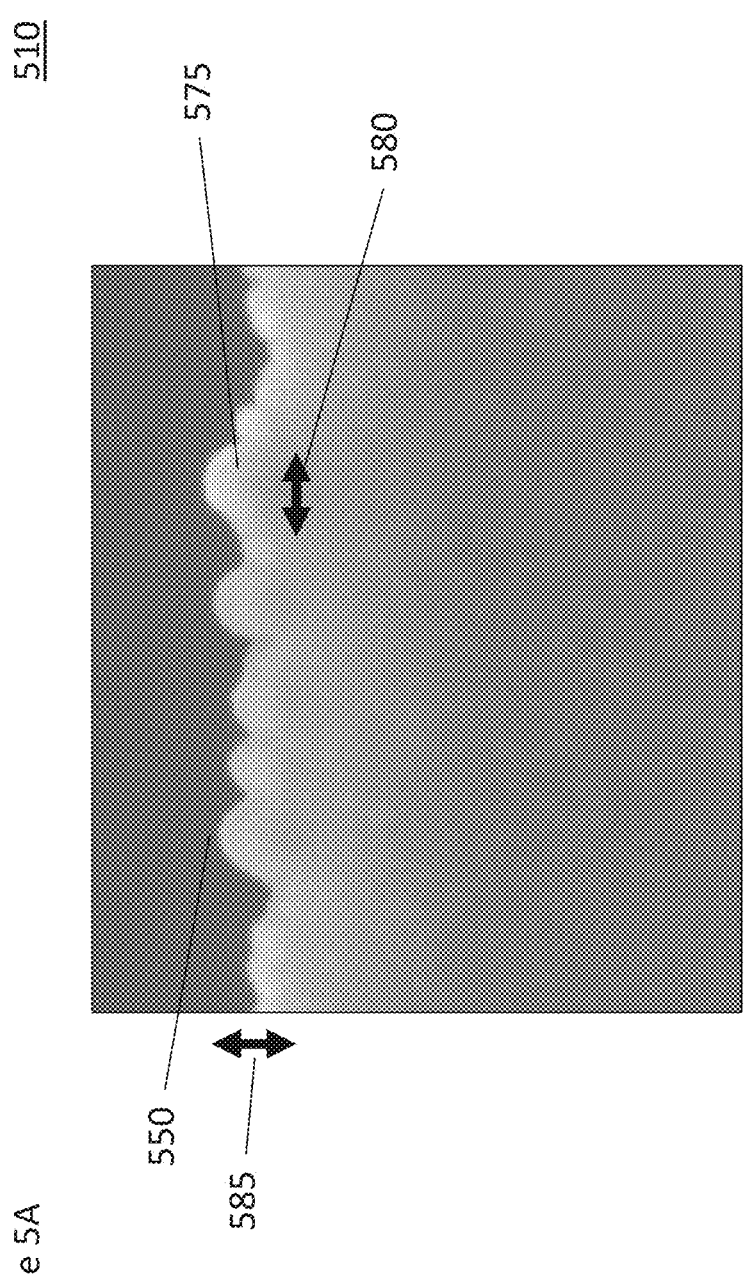
FIG. 5A is an expanded view (not to scale) of a PAL cell trench bottom showing a field region of the energy storage device showing $Al_2O_3$ particles of the $Al_2O_3$ layer protrude above the Lithium-silicon interface.

Additionally, the Li-metal anode layer (140, 315) forms throughout and around (encapsulated) the top $Al_2O_3$ deposited layer. Hence, the thin Li-metal anode layer (140, 315) forms and contains/surrounds the topmost $Al_2O_3$ particles, as Li-metal encapsulated the $Al_2O_3$ particles as shown in FIGS. 5 and 5A. The $Al_2O_3$/Li-encapsulated layer may grow upwards in size with more plating on subsequent charge cycles (and decrease with discharge), however, the bulk of Li-ion movement and charge storage takes place in the active silicon at the trench base 271 of the trench. Hence, the "thinness" of the $Al_2O_3$ containing Lithium metal anode layer (140, 315) facilitates an electrochemically robust in-situ formed conduit for Li-ions to diffuse in and out of the active silicon substrate 160, 160A—as the ions pass through the $Al_2O_3$ containing thin Li-metal layer in a low resistance fashion due to the thin Li-metal encapsulation compressing/aggregating the Li-encapsulated $Al_2O_3$ particles closer together-enabling high diffusion pathways for Li-ions between the Li-encapsulated $Al_2O_3$ particles.

FIG. 4 is a block diagram of an energy storage device 400, e.g. a battery and PAH cell, embodiment after the device anode precursor materials are deposited on the trench base 271/260, sidewalls 151, and field 156 regions, tuning the device toward the plating mode.

FIG. 4A is an expanded view of the field region (156, 440) of the energy storage device 400 tuned/transformed toward the plating mode. During operation of the battery 400, i.e. after the initial cycling current transforms/tunes the battery 400 internals, a Lithium metal field layer 130 of varying thickness forms on the field-layered anode layers (e.g., conductive adhesive layer composite anode 177 and polymer 170 (e.g., LiTFSI-PANI) layers). Additionally, Li-metal plates on 426 the sidewalls 151, down 426 the trench sidewalls 151 and across 140/415 the active silicon layer at the trench base 271. The conductive adhesive layer 170 is directly disposed on and in contact with the Al2O3 layer which in turn is disposed on the insulative liner 154 (e.g. >500 nm thick $SiO_2$) which is adhered to and is in intimate contact with the field 156 of the silicon substrate 160. The same conductive adhesive layer 170 runs along and down the sidewalls 151 and across the electrically active silicon trench base 271. In this way, a high density of electrons can be mobilized to the field 156 and sidewall 151 areas to enable Li-metal plating. Additionally, wherever the conductive adhesive layer 170 is layered, so is the conductive graphite slurry-further enabling Li-metal plating and Li-ion charge storage on the field 156, sidewalls 151, and trench base 271/260.

When Li-ions diffuse from the cathode 250 and into the Lithium and electrically conductive LiTFSI-PANI conductive adhesive 170, the Li-ions are flooded with electrons, since the conductive adhesive layer 170 is directly connected to the electrically active trench base 260. Utilizing the trench base 271, sidewall 151, and field layered anode 177, and upon employing applied current cycling conditions, the plating of Lithium metal 130 on the conductive adhesive layer 170 and anode 177, which is supported by a hard, in-flexible insulative layer 154 on the field 156, then begins to grow both laterally, and vertically. The Li-metal grown on the conductive adhesive layer 170 and anode 177 grows through the composite anode 177 and upward through the electrolyte 132, the fibermat separator 135 and the upper electrolyte region 132A (e.g. SPE)132 (See FIG. 8B3).

The Lithium metal filed layer 130 which plates on the field 156 and down the trench 150 sidewalls 151 resides above the conductive adhesive layer 170. The Lithium metal anode layer 140 plated on the $Al_2O_3$ deposited layer 165 remains below the conductive adhesive layer 170, e.g. between the conductive adhesive layer 170 and the active silicon substrate (160, 160A), since the active silicon layer has a ready supply of electrons to facilitate Li-metal plating.

Note that the Lithium metal anode layer (140, 315) at the (trench base 271 and Lithium metal field layer (130, 140) are part of the same electrode (the anode composite 175). As described in FIG. 1, the full anode composite 175 includes the active silicon 160A, the anode 177, the LiTFSI-PANI layer 170, the Lithium metal anode layer (140, 315), the $Al_2O_3$ layer 165, the Lithium metal field layer (130, 140). These layers are all electrically connected. The insulation layer 154, $Al_2O_3$ layer 165, adhesive layer 170, anode 177, and Lithium metal field layer (130, 140) extend along the trench wall 151 and wrap over the field 156.

In the case of the trench 150, sidewall 151, and field 156 anode patterned device (PAH), upon applied current initial cycling conditions, "too-thick" of a Lithium metal anode layer (140, 415) is plated on the $Al_2O_3$ deposited layer 165 for Li-ions to effectively diffuse into the active silicon substrate (160, 160A) at the trench base 271. The trench, sidewall and field anode conditions create a Li-plating type battery, where relatively very little Lithium diffuses in and out of the silicon bulk (160, 160A), hence the Li-plating mode designation.

In this embodiment, the Lithium metal field layer 130 is thicker. In some embodiments, the larger thickness of the Lithium metal field layer 130 varies between 100 nanometers (nm) and 45 microns as the battery 400 charges and discharges during operation. The combination of the fiber-mat structured separator 135, the carbon based conductive adhesive layer 170 and the composite anode layer 177 plays a key role in the stabilization of the thick Lithium metal field layer 130 and prevention of failure-mode-inducing Li-metal dendrite formation. The separator 135 allows for the Lithium metal field layer 130 to plate through the woven fibermat separator, where the separator acts as a homogenous plating scaffold, and preventing dendrite growth. The conductive adhesive 170 and composite anode 177 layers enable an excess, homogenous supply of electron current distributed across the conductive adhesive 170 and composite anode 177 coated field layer-thereby enabling near-equal distribution of charge at positions of the Li-metal layer grown on the field region 156.

FIG. 4B is an expanded view of the anode region 460 of the energy storage device in FIG. 4 showing a low density of (Li-ion) charge stored 450 in the substrate (160, 160A) due to the trench base, sidewall and field patterned anode and the resulting thick Lithium metal anode layer (415, 140) plated on the top surface of the $Al_2O_3$ particle 165 containing active silicon substrate (160, 160A) at the trench base 271. Since the current density is so diffused over the large anode layered area of PAH, the lithium ions do not have enough directed/concentrated charge density to encapsulate and penetrate through the $Al_2O_3$ particles 165 like observed in PAL, therefore, the $Al_2O_3$ particles 165 act as a conductive, robust support structure for Li-metal plating at the base of the trench 415, 140. Since no significant amount of Li-ions penetrate the layer of $Al_2O_3$ particles 165, all of the Li-ions directed at the base of trench (and sidewalls and field for that matter) result in relatively thick Li-metal plating.

Another effect from the trench base, sidewall and field patterned anode is that after the thick Lithium metal anode layer (140, 415) is plated at the trench base 271, the thick Lithium metal anode layer (140, 415) can (optionally) planarize the 3D silicon, e.g. "flatten the spikes" 225F. This phenomenon most likely this occurs because the thicker Li-metal plating process is most energetically favorable on a 2D surface. Hence, the thick Lithium metal anode layer (140, 415) plating layer can be disposed on a flat, planarized active silicon area (160, 160A) at the trench base 271 under the conductive adhesive layer 170. The planarized surface (160, 160A) causes more efficient plating and stripping processes, enhanced Li-diffusion barrier properties to the Si-substrate and therefore more sustainable Li-metal plating type storage device performance.

In some embodiments, after the initial cycling current, the Lithium metal anode layer (415, 140) forms between the metal, e.g. $Al_2O_3$, layer 165 and the conductive polymer adhesive layer 170. The trench, sidewall and field layered anode does provides too low of an electrochemical force on the diffusing Lithium ions at the active silicon trench base for the lithium ions to encapsulate the $Al_2O_3$ particles 165, as compared to the energy storage device 300 in FIG. 3 with the trench-base only anode (PAL) which received all electrochemical mobilizing force directly at the active silicon trench base. Contrarily, the trench, sidewall and field anode containing PAH cell results in a dominant plating mode on top of the $Al_2O_3$ particles 165—since there are not enough Li-ion current density in the beginning stages of cycling to create enough Li-conductive pathways through the Al2O3 residing on the top silicon surface. Instead, the Li-metal grown on the Al2O3 layer simply seeds the plating of the next Li-metal layer 140 added upon subsequent cycling-thereby creating a thicker Li-metal layer 140 which virtually suppresses all Li-diffusion in and out of the silicon substrate. The $Al_2O_3$ particles act as a plating surface, resulting in a thick Lithium metal anode layer 140/415 which in combination with the $Al_2O_3$ particles 165 suppresses the far majority of Li-ion diffusion into the active silicon substrate (160, 160A) at the trench base 271. During operation for the plating mode, the Lithium metal anode layer 140/415 thickness varies between 50 nm and 20 microns, larger than in the diffusion mode.

Again, the Lithium metal filed layer 130/140 which plates on the field 156 and the trench 150 sidewalls 151 remains above the conductive adhesive layer 170. The Lithium metal anode layer 140 deposited on the $Al_2O_3$ deposited layer 165 remains below the conductive adhesive layer 170.

In summary, the initial cycling of the batteries and where the anode is layered determines if a Lithium metal field layer 130 plates on the field 156 vertically (on top of the conductive adhesive layer), through/on the composite anode 177 on the trench sidewalls, along the active silicon at the trench base and upward from the field through the separator 135 and electrolyte layers (132, 132A).

The separator 135 and conductive adhesive 170 and composite anode 177 layers enable stable, non-dendritic Li-metal plating and stripping to repeatedly occur on the field 156) and laterally (along the conductive adhesive layer 170 and composite anode layer 177 along the trench sidewall 151 and along the active silicon (160, 160A) at the trench base 271). In conjunction with this manner of Li-metal plating, there is also Li-ion diffusion through the separator 135, electrolyte (132, 132A) and composite anode 177, and conductive adhesive layer 170 where the Li-species mobility and diffusion occurs through the bulk center region of the 3D trench and directly above the 3D trench.

The batteries which have the anode layered only in the trench with an anode isolated on the active silicon layer at the trench base, e.g. P and PAL cells, do not have a Lithium metal field layer 130 yet do have a thin Lithium metal anode layer 315 plated on the active silicon at the base of the trench and enable a much a higher charge density of Lithium ions in the silicon substrate (160, 160A) compared to the trench, sidewall and field patterned anode cells, e.g. PAH.

The high degree of Li—Si type charge storage in the P and PAL cells is a direct result of the relatively thin Lithium metal anode layer (140, 315) which grows/shrinks on the $Al_2O_3$ layer 165 deposited on the active silicon surface 160, 160A. In the formation process (initial cycling) of the trench only deposited anode cell, the Li-metal effectively encapsulates the $Al_2O_3$ particles-providing a well-adhered, robust Li-conductive $Al_2O_3$/Li-metal cap on the top silicon surface 160, 160A-which facilitates a high cycle life of reversible Lithium diffusion in and out of the silicon substrate (160, 160A) at the base of the trench 271.

On the other hand, batteries that have a continuous anode layered on the trench base 271, sidewalls 151, and field 156, e.g. the PAH cells, have a thicker variable thickness of their Lithium metal field layer 130 and a Lithium metal anode layer 140/415 and a far lower charge density of Lithium ions in the silicon substrate (160, 160A), if any, due to the diffusion barrier effect of the thick Lithium metal anode layer (140, 415) which forms on the $Al_2O_3$ layer 165.

Hence, both thick Lithium metal anode layer (140, 415) and thin Lithium metal anode layer (140, 315) batteries with varying degrees of reversible Li—Si energy storage capacity are possible in the present invention.

Lithium ions (Li$^+$) flow through the battery 400 layers/components during the operational charge and discharge cycles over the device (100, 200) lifetime resulting in more or fewer Lithium metal atoms stored (plated) in the Lithium metal anode layer (315, 415) and Lithium metal field layer 130 as they grown and shrink.

As the battery charges and discharges the thickness of the Lithium metal field layers 130 and a Lithium metal anode layers (140, 315, 415) vary reversibly as the Lithium ions transition through the layers of the battery and accumulate in the layers as Lithium metal during the battery operational lifetime. The thicknesses of the Lithium metal layers change (increase and decrease) as the amount of Lithium metal stored in the respective layer also changes (increases and decreases). Additionally, the thickness of the active silicon substrate (160, 160A) at the trench base 271 and the respective silicon bulk 160 can vary in volume—where the silicon expands when charged and compresses when discharged. This phenomenon is a direct result of Li-ions diffusing into the silicon and out of the silicon (160, 160A), during charge and discharge sequences, respectively.

Batteries with anode layered isolated to the active trench base, e.g. PAL, have a robust lithium encapsulated Al$_2$O$_3$ cap on the silicon surface which facilitates the reversible diffusion of Li-ions and where the lithium encapsulated cap on the silicon surface prevents the pulverization of the silicon material during the volume expansion and compression phenomena. Due to the formation process involving the Li-metal encapsulation of Si-adhered Al2O3 particles simultaneously with the construction of Li-active conduits and pathways during initial cycling, the integration of the composite anode with the bulk silicon substrate is seamless and therefore presents very low resistance to transfer Li-based charge across the Si-interface-enabling high reversible diffusion in and out of the silicon substrate. For batteries which utilized trench base, sidewall and field patterned anodes, e.g. PAH, which do not create a high-diffusion facilitating Lithium encapsulated Al$_2$O$_3$ top silicon surface (160, 160A), the volume expansion and compression phenomena is far less heightened, as relatively very little lithium diffuses in and out of the silicon material, and instead stores the far majority of charge in the form of Li-metal on both the field 130 and on top 140 of the active silicon substrate (160, 160A) at the trench base 271. For these cells, the composite anode is well integrated with thick plated Li-metal 140, but only above the Al2O3/Si-interface-thereby facilitating low resistance to transfer charge in and out of the Li-metal composite anode residing above the Si-interface at the base of the trench, where the resistance to transfer Li-ions across the Si interface is unsustainably high.

Embodiments are disclosed where composite electrodes (e.g. the cathode 250 and anode 175) operating at high voltage and capacity. The electrodes combine with a high voltage stable and ionically conductive solid-polymer-electrolyte and with electrochemically-active surface additives to enable low-resistance. In some embodiments, the Lithium metal field layers 130 and the Lithium metal anode layers (140, 315, 415) are formed initially by applying the initial cycling currents with magnitudes that control the formation and maximum operational thicknesses of the Lithium metal layers (315, 415, 140, and 130)—where the dominant control of Li-metal anode and field layers is controlled by the relative patterning of the anode, as described above.

In some embodiments the Lithium metal layers (315, 415, 140, and 130) are formed in-situ, e.g. during the electrochemical cycling of the battery/microbattery which is housed within electrically insulated trenches 150 with the trench base 271 patterned on a 3D silicon substrate 160. Lithium metal layers 130/140 are formed while being hybridized with Lithium-Silicon species in the same composite electrode. The silicon substrate (160, 160A) acts as both the insulative packaging material (for parts layered with e.g., SiO$_2$) as well as active electrode material, e.g. part of the composite anode 175, where the relative degree of active silicon electrode access is tuned by anode patterning selection and application and via the initial current cycling conditions.

Layering of the anode to exclusively the 3D trench base or on the base, sidewalls and field of the substrate, in combination with the initial current cycling conditions, control and modulate the initial flow or diffusion of Lithium ions 110 through the Al$_2$O$_3$/Si interface for a given precursor material selection and structure. Additionally, as described above and below, the layering of the anode determines the relative robustness and flexibility of the lithium encapsulated Al$_2$O$_3$ cap at the top of the active silicon surface. In all, the degree of Li—Si (in the silicon bulk) as well as Li-metal plating (on field, sidewalls and 3D trench base) is determined by where the anode is patterned on the Si-substrate.

Lithium can be stored in two ways in the anode 175 at the trench base 271 during the current cycling:

1. Plated as a Lithium metal in the Lithium metal anode layers (140, 315, 415), as well as on top of the conductive adhesive layer 170 on the field 156 and along the sidewalls 151 (as stated above, this Lithium metal 140 and 130 is continuous and connect) and
2. Diffused as Lithium ions in the silicon substrate (160, 160A) in a Lithium-silicon type species in combination with minimal Lithium metal plating on the silicon surface at the base of the 3D trench.

The amount of plating and diffusion determine one or more of the operational performance characteristics of the energy storage device (100, 200) and are controlled by the relative layering and placement of the anode in/on the Si-substrate. When used, the Al$_2$O$_3$ layer 165 forming the Al$_2$O$_3$/Si interface also has a role in determining how much plating and diffusion occurs at the trench base 271 and substrate (160, 160A) while the composite anode 175 is being formed. Additionally, after formation of the composite anode, the Al$_2$O$_3$ layer 165 forming the Al$_2$O$_3$/Si interface also has a role in determining the sustainability of the combined plating and diffusion dependent charge storage mechanisms of the anode. Most importantly, the lithiated Al$_2$O$_3$/Si interface prevents the well-known self-pulverization of the silicon anode components through:

1. creating an electrochemically robust, Li-conductive Li/Al2O3/Si top surface of the active silicon substrate 160, 160A which allows flexibility and maintains contact pressure on the active silicon substrate as it expands and contracts during cycling, therefore preventing cell failure through high resistance Si pulverization phenomena and
2. a novel phenomenon where the Al$_2$O$_3$ particles are mobilized, along with the "front-line" of the Lithium diffusing species, as Lithium diffuses deeper and deeper into the substrate (FIG. 10, FIG. 11 FIG. 12).

The mobilized Lithium-encapsulated Al$_2$O$_3$ particles prevent the silicon pulverization failure mechanism by acting as a stability support structure when spatial and mechanical changing defects occur as lithium diffuses to a previously untouched crystalline silicon surface. Due to the Li-conductive and highly mobile species, succinonitrile (SN), which is a primary component in the polymer electrolyte, SN saturates new electrochemically accessed silicon surface area, which may contain a defect. Since SN mobilizes Lithium species and since $Al_2O_3$ is encapsulated and mobilized by the combined Lithium-ion/SN mobile system, $Al_2O_3$ particles are also deposited at defect sites deep in the Silicon substrate 160. As the cell is further cycled, more lithium plates around $Al_2O_3$ particles-giving the appearance of larger $Al_2O_3$ particles deep in the substrate and most importantly, enabling a "glue" like effect of lithium metal to encapsulate $Al_2O_3$ particles and bind the particles to the silicon defective sites-thereby preventing further degradation of the defect sites via high resistance mechanical separation and consequentially runaway self-pulverization effects with repeated charge/discharge cycling.

For example, as shown in FIGS. 4,4A, and 4B, when a trench base, sidewall and field patterned anode (PAH cell) is used, the formation process creates an anode 175 where the charge storage mechanism at the anode 175 is primarily thick lithium plating (on charge) and stripping (on discharge) in the Lithium metal anode layers at the trench base 140 and the field areas 130/426. As in shown in FIGS. 3, 3A, and 3B, when the anode is layered exclusively at the trench base 271, then the formation process creates an anode 175 where the charge storage mechanism is a combination of thin Lithium plating 315, on the active silicon substrate (160, 160A) at the trench base 271 only, no charge storage 130 on the field area 156, and where the primary form of charge storage occurs in the form of Li—Si species in the active silicon substrate (160, 160A) at the trench base 271.

Further, the trench-only layered anode (PAL cell) enables the bulk of the Li-based charge density to be directed at or around and encapsulating the $Al_2O_3$ particles at the $Al_2O_3$/Si interface, enabling effective $Al_2O_3$ particle encapsulation with lithium that creates a dense, protective cap layer on the active Si surface which is also permeable to reversible Li-ion diffusion. This Li-metal encapsulation of the particles greatly decreases the space between adjacent $Al_2O_3$ particles, leaving approximately ion-diffusion sized pores between encapsulated panicles enabling more optimal "diffusion space" (greater than or less than 2 nm pore sizes) between the $Al_2O_3$ particles for Lithium ions to migrate through (in either direction) during and after the initial cycling current. In some embodiments, the average size of the $Al_2O_3$ particles during the initial current cycling is between 6 nm and 20 nm in diameter, with the average size of the lithium metal layer encapsulating the $Al_2O_3$ particles (during the initial current cycling) between 8 to 15 nm.

However, the trench base, sidewall and field layered anode (PAH cell) does not encapsulate the $Al_2O_3$ particles, and instead, utilizes the Li+ and electron-insulating properties of $Al_2O_3$ particles to enable a more homogenous surface for reversible Li-metal plating. Additionally, this creates a robust, well adhered, Lithium barrier to diffusion into the Silicon bulk, thereby preventing any potential Si-pulverization failure mechanism and promoting sustainable Li-metal plating/stripping.

Hence, when the anode layering (PAL cell) is isolated entirely to the trench base, the diffusion space between the lithium-encapsulated $Al_2O_3$ particles is more optimized for reversible diffusion across that interface, resulting in lithium being stored both in the silicon anode substrate (160, 160A) volume (as Li/Si alloys. Li—Si species. etc.) as well as on the silicon substrate 160 or $Al_2O_3$/Si interface (as Li-metal plating in the Lithium metal anode layer). When the anode is beyond the trench and on the sidewalls and field, and lithium does not have the environment to exclusively direct charge density at the trench base and thereby the encapsulation of $Al2O3$ particles with lithium metal, cannot be achieved. Li-plating on the anode layered field 156 region prevails along with plating on the sidewalls 151 and silicon anode active region 190/260 at the base of the trench ($Al_2O_3$/Si interface), which prevents the majority of lithium species from ever reaching the silicon anode substrate (160, 160A) and storing charge as Li/Si alloys or Li—Si species.

The degree of Lithium storage as Li-metal plating vs Li—Si species is tunable for the innovative batteries shown in the current invention. It should be noted that always some charge is stored in the graphite and carbon-based components of the composite silicon anode via intercalation, insertion or adsorption type processes—but the majority of charge is stored in the above described fashions. Such versatility in charge storage mechanisms allows the user to determine the relative degree of both lithium metal and Li—Si type charge storage within the full cell-thereby enabling control of relative power and energy density provided by the in-situ formation within each energy-storage-device as a function of the user-selected anode patterning.

FIG. 5 is an SEM micrograph 500 of a silicon-aluminum-oxide interface 550 and Li—$Al_2O_3$ interaction at a trench base 271 showing the anode of an energy storage device after short term operational current cycling with a thinner Lithium metal anode layer (140, 315, 510) and a higher diffusion of Lithium ions and mobility of Li-Al2O3 coordinated structures 525 into the substrate (160, 160A) for the trench-only patterned anode device.

The cross section of this formed electrode was obtained early in the lifecycle of the trench-only patterned cell. Lithium ions are shown diffused into the substrate (160, 160A) with as we can observe the contrasting gray/lighter colored material in the bulk substrate below the surface, upon the initial current cycling—as can be observed in higher concentration from the lithium deposits (white band of dense small dot below Li-encapsulated $Al_2O_3$ particles) 555 seen contrasting the silicon bulk beneath the surface and throughout the bulk of the micrograph. Larger deposits comprised of deeper, mobilized lithium-encapsulated $Al_2O_3$ particles 525 are observed in the micrograph.

FIG. 5A is a micrograph of a magnified area 510 of the thinner Lithium metal anode layer (140, 315, 510) shown in FIG. 5 showing the Li—$Al_2O_3$ interaction at the silicon-aluminum interface 550 at the trench base 271 and Lithium metal surrounding $Al_2O_3$ particles 575 for the trench only patterned short-term cycling case.

The micrograph shows Lithium metal encapsulating 575 $Al_2O_3$ particles residing on the silicon-aluminum interface 550. The encapsulation 575 helps form the initial Lithium metal anode layer (140, 315, 510) and illustrates how the increased densification and diffusion-facilitating pore-size minimization effects of the layer 510 are increased due to the lithium-encapsulation process "pushing" enlarged Li—$Al_2O_3$ particles closer together. The encapsulation 575 after initial cycling is roughly 8 to 20 nm in thickness with a preferred embodiment of 13 nm. This allows for more optimal "diffusion space" (greater than or less than 2 nm pore sizes) between the $Al_2O_3$ particles for Lithium ions to migrate through (in either direction) during and after the lower initial cycling current In some embodiments, the average size of the $Al_2O_3$ particles prior to the initial current cycling is between 6 nm and 20 nm in diameter 580. The diameter of the $Al_2O_3$ particles (with Lithium metal encapsulation) after initial current cycling increases significantly to roughly between 20 nm to 100 nm 580 with the average size of the top-most lithium metal layer encapsulating the $Al_2O_3$ particles (after the initial current cycling) between 20 to 50 nm 580. Hence, the lithiation of the $Al_2O_3$ particles saturate the particles to significantly alter (increase) the average dimensions 580 and position 525 of the original deposited $Al_2O_3$ nanoparticles. As will be discussed later, as lithium penetrates deeper into the silicon substrate with progressive cycling, $Al_2O_3$ particles are mobilized into the substrate, in parallel with Li-ion diffusion 525, growing progressively larger with repeated Li-metal encapsulation.

Additionally, this creates a robust, well adhered, Lithium conductive "cap" on the top silicon surface—which in part, as described above and below, prevents breakdown, self-pulverization and consequently high resistance runaway of the cell. As can be predicted, the 3D patterning of the trench base 271, e.g. by increasing the area of the silicon-aluminum interface 550 where the encapsulation 575 occurs, also enables a structural enhancement of the 3D silicon electrochemically active material. The encapsulation of the top most layer forms upon initial current cycling and helps enable both the diffusion necessary for reversible Li/Si alloying in the substrate (160, 160A) and Li-plating mechanism forming on the Lithium metal anode layer (140, 315, 510) as well as on the field 325 and sidewall 151 regions. In some embodiments, the average roughness, i.e. the average distance 585 the $Al_2O_3$ particles of the $Al_2O_3$ layer 165 protrude above the Lithium-silicon interface 550 is about 10 nm, prior initial current cycling and roughly 50 nm ($Al_2O_3$+Lithium encapsulation) immediately after lithiation from initial current cycling 585.

FIG. 6A is a micrograph 600 of a Lithium metal anode layer 140 at the silicon-aluminum-LiTFSi-PANI interface resulting from Li and $Al_2O_3$ interaction at a trench base 271 showing the anode 177 of an energy storage device after long term (>250 cycles) term operational current cycling with a thinner Lithium metal anode layer 140 containing $Al_2O_3$ particles in the bulk of the Li-metal layer, creating an electrochemically robust, yet flexible Li— $Al_2O_3$ layer (about 220 nm) which enables higher diffusion of Lithium ions into the substrate 160/160A for the PAL cell with an anode patterned only in the 3D trench, while also preventing mechanical breakdown during volume changes under lithiation/de-lithiation processes.

The micrographs (FIGS. 6A and 6A1) were obtained at the end of the cycle-life of the battery/cell—illustrating the effects of Li-plating and Li—Si species formation on the electrode material after repeated charge and discharge cycling.

As can be observed, not only is the 3D structure of the active silicon (160, 160A) intact after more than hundreds of cycles with the Lithium metal anode layer (140, 315, 650) on the 3D surface (160, 160A) conforming to the originally textured 3D silicon structure (160, 160A), but the overall thickness of the original lithium encapsulated $Al_2O_3$ top surface layer is roughly 220 nm (see FIG. 6A1)—very thin for hundreds of cycles compared to the trench, sidewall and field anode (PAH) cell formulation. Hence, such a relatively thin layer of Lithiated $Al_2O_3$ on the top silicon surface allows for reversible ion diffusion across the interface (the primary mode of charge storage in this embodiment) and is also robust and flexible enough to maintain the 3D structure of the silicon anode 175 after hundreds of volume expanding and compressing charge and discharge cycles. It is noteworthy to illustrate that the Li-metal plating (140, 315, 650) at the trench base 271 of the active silicon (160, 160A) occurs below the conductive adhesive layer 170 and upon long term cycling, the lithium encapsulated $Al_2O_3$ layer 165 is contained within the final Li-metal layer ($Al_2O_3$ particles are completely encapsulated with Li-metal) for the trench only anode patterned formulation.

FIG. 6A1 is a magnified micrograph 625 of the Lithium metal anode layer shown in FIG. 6A. FIG. 6A1 shows the 220 nm thickness of the Lithium metal anode layer (140, 315, 650) where the original $Al_2O_3$ particle layer is completely contained within the Li-metal plated layer upon long term cycling-thereby enabling the robust and durable $Al_2O_3$ integrated Li-metal layer 165 which preserves the 3D porous silicon structures after hundreds of cycles.

Figure 7:
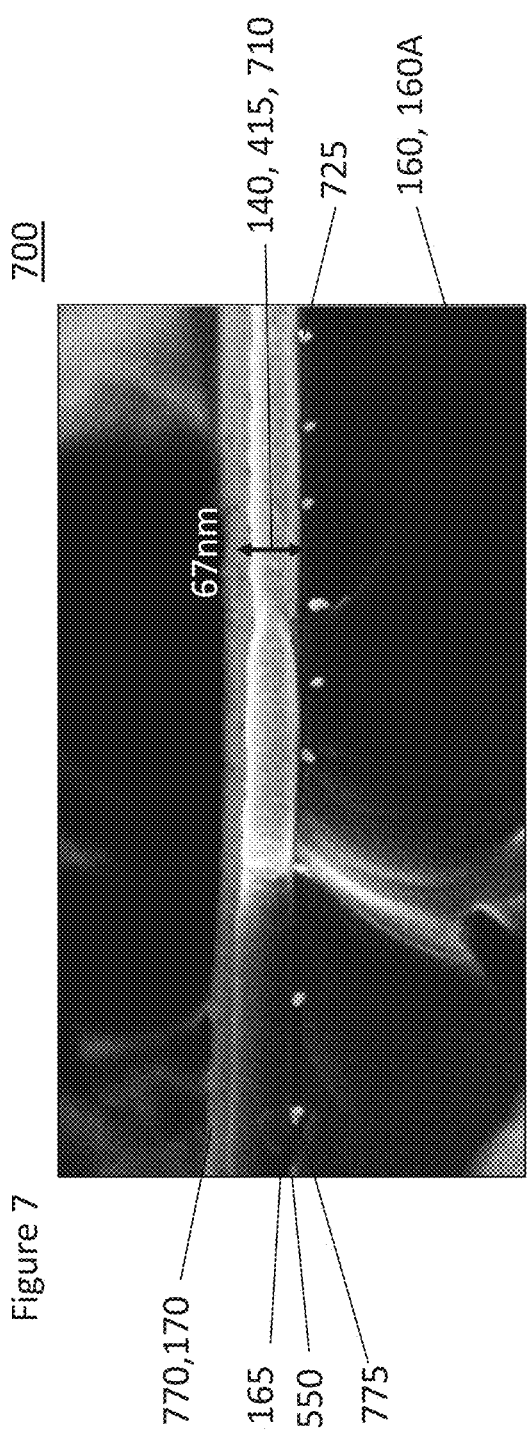
FIG. 7 is a micrograph of a Lithium metal anode layer plated below the LiTFSI/Pani layer and on the Al2O3/Si interface at the trench base after short term operational current cycling for the cell with an anode in the 3D trench, layered on the trench bottom, trench sidewalls, and on the field, a PAH cell.

FIG. 7 is a micrograph 700 of a silicon-aluminum interface region 550 of the anode of operating energy storage device (200, 400) where the micrograph 700 was obtained after a trench, sidewall and field anode layered battery/cell (PAH) was initially current cycled, showing a thicker Lithium metal anode layer (140, 415, 710) at the Si-interface anode—in plating mode. Where the trench only anode PAL case displayed 13 nm of Li-metal encapsulated 575 around and on top of the $Al_2O_3$ particles (FIGS. 5 and 5A), this anode patterning case displays thick Li-metal only (not containing $Al_2O_3$ particles) (140, 415, 710) residing above the surface of the silicon-aluminum interface 550 as well as above the top surface of the $Al_2O_3$ particles (725, 775) and under the conductive polymer adhesive layer (770, 170).

The $Al_2O_3$ particles 725 from the $Al_2O_3$ in the $Al_2O_3$ layer 165 are shown at the silicon-aluminum interface 550. While there is a large spacing between the $Al_2O_3$ particles 725, there is little evidence of Lithium ions diffusing into the substrate (160, 160A). However, there is a thick Lithium metal anode layer (140, 415, 710) formed over the silicon-aluminum interface 550. The conductive polymer adhesive layer (770, 170) is shown forming on the Lithium metal anode layer (140, 415, 710).

Even though the periodic spacing between the $Al_2O_3$ particles 725 would make it appear that Lithium ions should be able to flow between the $Al_2O_3$ particles, there is no Lithium seen below the plated Lithium metal anode layer (140, 415, 710) and the $Al_2O_3$ particles 725. Also notice that the $Al_2O_3$ particles 725 are not surrounded/encapsulated by Lithium. Since this embodiment of the anode electrode 460 was patterned in the trench, on the sidewalls and on the field, the current flow rate was too low and in the majority directed to the field area 156—thereby not providing enough energy to allow Lithium ions to diffuse through the initial $Al_2O_3$ layer 165. Since the $Al_2O_3$ layer 165 is technically insulating to Li-ion diffusion, a cell which facilitates the charge flow, primarily, across the Silicon trench base interface is required for Lithium to energetically diffuse between the $Al_2O_3$ particles in layer 165 and form the encapsulated $Al_2O_3$ particles we see above in FIGS. 5 and 5A and thin robust $Al_2O_3$ particle containing Li-metal layer shown in FIGS. 6A and 6A1. An anode patterned primarily on the field creates a diffuse current density at the trench base and therefore the energetics of Li-ion diffusion are not high enough to diffuse between nor form a plated Li-metal layer around the $Al_2O_3$ particles in layer 165. Accordingly, the Lithium ions collected on the silicon-aluminum interface 550 above the $Al_2O_3$ layer 165 form a relatively thick Lithium metal anode layer (140, 415, 710) with little or no diffusion into the substrate (160, 160A)—where the lithium metal layer increases in thickness upon subsequent cycling. The formed "thick" Lithium metal anode layer (140, 415, 710) acts as a barrier to additional Lithium ions flowing into the silicon substrate 160/160A. The addition of more Lithium ions, upon subsequent cycles, increases the Lithium metal anode layer (140, 415, 710) and consequentially, a thicker diffusion barrier (140, 415, 710) forms, as Lithium metal causes the layer to grown thicker and thicker while not diffusing into the substrate (160, 160A) nor encapsulating the $Al_2O_3$ particles 725 below the Lithium metal anode layer (140, 415, 710) barrier.

Therefore, for trench, sidewall and field patterned anodes, e.g. PAH cells, the $Al_2O_3$ layer 165 acts as a barrier to diffusion of the Lithium ions and causes little ion diffusion into the substrate (160, 160A) but results in a large amount of plating of the Lithium metal anode layer (140, 415, 710). Most Lithium ions do not pass into the silicon substrate (160, 160A), but instead plate a thicker Lithium metal anode layer (140, 415, 710).

In summary, for the same deposited target thickness (e.g. 0.5 nm) of $Al_2O_3$ layer 165, trench, sidewall and field layered anode cells (PAH cells) result in more Li-metal plating because the Li-ions during current cycling cannot surround nor bypass the $Al_2O_3$ particles 725—hence the $Al_2O_3$ layer 165 with a correct thickness acts as a (nearly) impenetrable plating surface and in parallel, enables a stable conductive surface for sustainable Li-metal plating and stripping mechanism for long term cycling of the cell.

However, as seen above, when the anode is layered exclusively in the 3D trench, e.g. the PAL cell, the Lithium ions (Li-ions) can diffuse reversibly into the silicon substrate (160, 160A) because, when the anode is confined to the trench base, the energetics of ion diffusion are high enough at the $Al_2O_3$/Si interface to allow the Li-ions both bypass the $Al_2O_3$ particles and nucleate around them-resulting in the combined Li-metal plating and silicon bulk diffusion (Li/Si alloying, Li—Si coordinated charge storage) process/structure.

FIG. 8A is a scanning electron microscope (SEM) cross section micrograph 800 of an active silicon trench base 271 region of an operating energy storage device (100, 200, 400) after the end of its life cycle (208 cycles) which contained a trench, sidewall and field patterned anode, e.g. a PAH cell. The low magnification SEM cross section 800 illustrates a thick (4 micron) homogenously plated Lithium metal anode layer (140, 415, 816) under the conductive polymer layer 170 and on the $Al_2O_3$ 810/165 embedded within the top silicon surface (160, 160A), without any sign of dendritic formation.

FIG. 8A1 is a higher magnification SEM cross section 812 that highlights the area of the "white" box 812 in the lower magnification SEM 800 in FIG. 8A.

The high magnification SEM 812 illustrates a hardened, dense silicon layer which contains both $Al_2O_3$ particles and some amount of lithium species. The 649 nm thick, hardened, and densified silicon/$Al_2O_3$/Lithium layer (165, 810) enables a stable, low-Li-diffusion barrier layer in addition to the thick Lithium metal anode layer (140, 415, 816) residing above it, progressively increasing in thickness after hundreds of charge/discharge cycles. Hence, not only during the initial current cycling, but also upon long-term operational cycling, the trench, sidewall and field patterned anode containing energy storage device continues to evolve high diffusion barrier layers in order to:

1) prevent the Si-self-pulverization failure mechanism known in prior art Si-electrodes and
2) maintain a stable, dendrite-suppressing electrode surface for long term Li-plating and stripping charge storage mechanism (140, 415, 816).

FIG. 8B1 is a SEM cross section micrograph 820 of a field 156 of an operating energy storage device that had an anode layered (PAH cell) on the trench 150, sidewall 151, and field 156 region after long-term (208 cycles) current cycling. FIG. 8B1 is a tilted SEM cross section 820 which illustrates the very thick Lithium metal field layer (130, 825) smoothly plated, without dendrites on the material residing on the field 156, after 208 operational charge and discharge cycles. The separator layer (135, 835) is observed protruding from below the smooth Li-metal plated layer 825/130 with the graphite (anode) layer 177 and LiTFSI-PANI 170 layers are also visible and in physical contact with the separator. The smooth homogenous, thick Li-metal plating (130, 825) is further displayed in FIG. 8B2, along with the display of a portion of the separator fibermat (845) which resides over the 1 mm×1 mm 3D trench of the energy storage device 400 and illustrates no Li-metal plating phenomena through nor on the separator since all of the Li-ion charge mobility in the portion of the separator directly over the active 3D trench has no conductive anode material is contact with the separator, and therefore no source from which Li-metal can grow/plate.

FIG. 8B2 is a magnified SEM cross section of FIG. 8B1 showing the thick, smooth Lithium metal field layer (130, 825). Notice that Li-metal plating does not occur over this portion of the separator (845). This is because the electrical-connection necessary for the vertical growth of Li-metal plating is not present under that portion of the separator (845). Whereas, over the field 156, a hard, thick (e.g. SiO2) insulative liner 154 is present on the field 156 which helps to support long term stability in plating, when a highly electrically conductive LiTFSI-PANI layer 170 as well as conductive graphite layer 177 is above the insulative layer 154. The Li-metal plates on and grows up and laterally, from, the LiTFSI-PANI layer 170 as described in the above sections-due to the abundance of electron density in the conductive polymer and graphite layers. Hence, the field 156 experiences the plating of the Li metal field layer (130, 825), vertically through the separator (see FIG. 8B3) and laterally on the field and down the 3D trench sidewall 151 and along the active silicon trench base 271. Hence, the full active anode of this energy storage device 400 conformally resides along and on anywhere the LiTFSI-PANI conductive polymer resides 170 resulting in Li-metal plating/stripping type charge storage.

FIG. 8B3 is a micrograph 840 showing a Lithium metal field layer (130, 825) plated through the separator (135, 835) for the trench, sidewall and field layered anode (PAH) cell. The insulating layer 154, e.g. $SiO_2$, is deposited on the field 156. The conductive adhesive layer (e.g. LiTFSI-PANI) 170 is deposited on the insulating layer 154 as well as the graphite layer 177 is deposited on the conductive adhesive layer 170. After initial current cycling and a larger number of operational current cycles, the materials in the conductive adhesive layer 170 and anode 177 integrate, as the solid polymer electrolyte material is also ubiquitous throughout the separator and aids in interlayer integration and in-situ mobility. In this embodiment, a thick Lithium metal field layer (130, 825) is shown plated through the 30.4 micron separator (135, 835).

Figure 9B:
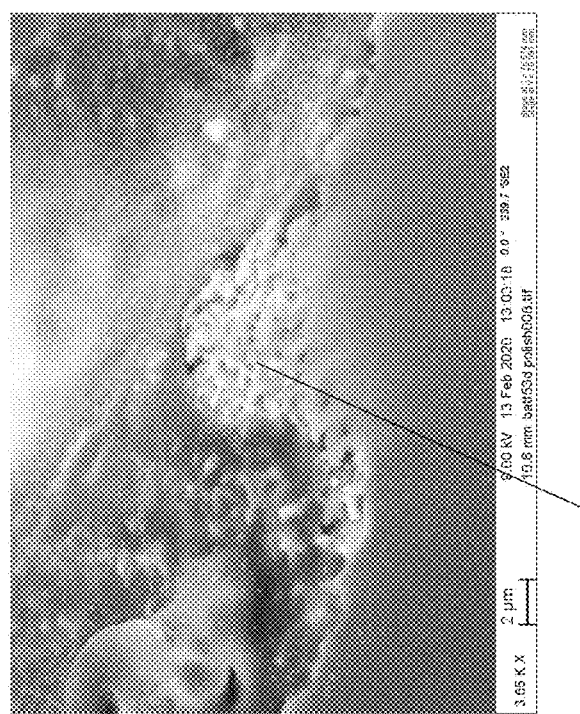
FIG. 9B is a magnified SEM cross section of one of the peaks and associated valleys of FIG. 9A further displaying the well-preserved 3D porous silicon texturing after greater than 250 charge/discharge cycles.
Figure 9A:
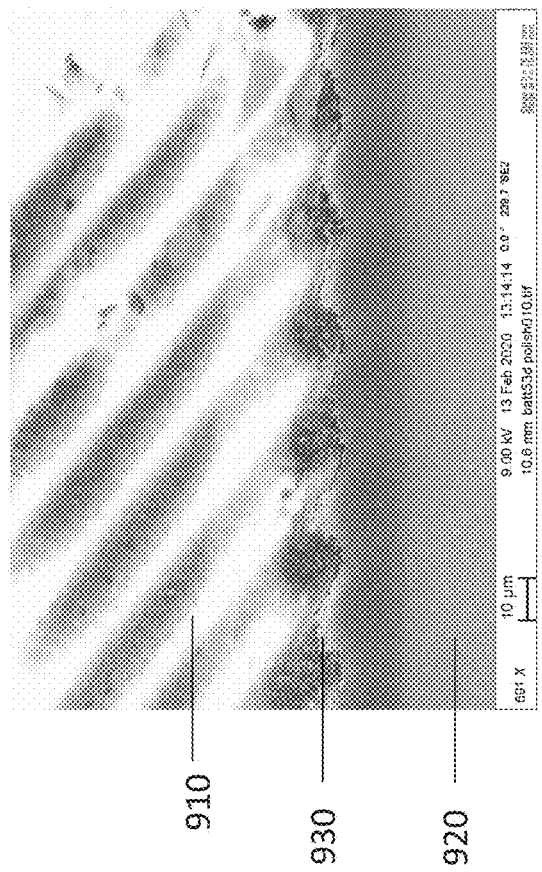
FIG. 9A is an SEM cross section the active silicon region from a portion of an enlarged textured porous silicon disc (15.5 mm diameter) representative of cells with an anode patterned in the 3D trench only, e.g. a PAL cell, after greater than 250 operational current charge/discharge cycles and displaying the 3D porous silicon texturing still intact.

FIG. 9A is a micrograph 900A showing a middle cross section 920 of a composite anode 177 and bulk silicon substrate after long term operational current cycling where the cell only contained an anode patterned on the active silicon area. The middle cross section 900A is between a top surface 910 and a bottom surface 920, with an intact, 3D porous silicon features 930 present after more than 250 charge/discharge cycles.

FIG. 9B displays a high magnification SEM cross section 900B of one of the 3D porous silicon peaks 930. The micrograph 900B shows an 3D porous silicon textured peak 930 still structurally intact in its original highly porous 3D peak and valley fashion, after more than 250 charge/discharge cycles, prevented by an Aluminum Oxide ($Al_2O_3$) layer 165. This particular silicon sample is an enlarged sample of the size of a typical coin cell e.g., 15.5 mm in diameter which was used to better understand the failure-prevention mechanism of the $Al_2O_3$ containing silicon anode. However, the anode was patterned exactly as the "trench only" (PAL) patterned/textured anode in that only the active silicon substrate 160/160A (no sidewall or field) contained any patterned anode material. Materials used, cycling performed, and testing metrics were the same for this sample as the microbattery samples shown in other embodiments disclosed. Importantly, the experimental sample was prepared in order to gain better insight into the impact of the Al2O3 additive in the "trench only" PAL patterned anode formulation, specifically with regard to its prevention of the breakdown of the top 3D porous silicon layer and the underlying silicon bulk, and effectively—the results in FIG. 9A and FIG. 9B are evidence that the additive maintains high quality Li-active 3D porous silicon, without breakdown, after more than 250 cycles.

A SEM-EDS (elemental dispersive X-ray) map spectra analysis showed the relative elemental composition of selected chemical species throughout the 3D silicon spike 225 shown in FIG. 9B, after more than 250 current cycles, when the anode patterning was synonymous with the trench only PAL cell microbatteries.

The analysis showed that both Silicon (Si) and Aluminum (Al) are ubiquitous throughout the entire 3D silicon spike 225—illustrating the high loading capability of Al in the 3D porous silicon using the ALD method of deposition of the $Al_2O_3$ layer 165. Silicon still maintained its original 3D porous silicon spike structure after more than 250 cycles maintaining structural robustness due to the $Al_2O_3$ distribution in 3D Silicon (160, 160A). Nitrogen (N) was distributed throughout the Silicon 3D spike 225 illustrating the homogenous distribution of the electro-mobile, Li-conductive succinonitrile (SN) present in the solid polymer electrolyte-which enables electrochemically mobile lithium pathways into the 3D and bulk Silicon (160, 160A). Both Oxygen and Carbon showed to be in highest concentration on the top surface of the 3D spike 225 with relatively very low concentration of the species throughout the bulk of the porous 3D spike 225. This indicates that the succinonitrile component of the polymer electrolyte is far more mobile than the other components of the electrolyte (PCI) or Lithium salt containing conductive polymer (LiTFSI-PANI)—as nitrogen is highlighted more in the bulk of the 3D porous Silicon peak than oxygen and carbon.
Hence.

After more than 250 current cycles, the high surface area 3D silicon texturing is robustly intact due to the ability of Lithium metal to nucleate around the $Al_2O_3$ particles, where this mechanism enables a lithium conductive pathway for lithium to be transferred into and out of the silicon bulk (160, 160A), while also enabling a lithiated $Al_2O_3$ particle species to maintain mechanical structure of the 3D silicon substrate (by protecting the silicon substrate wherever the Al2O3 particles exist)—where no pulverization of silicon nor degradation of the 3D structure is observable after more than 250 cycles.

The homogenous distribution and high loading of the $Al_2O_3$ is distributed evenly in top portion of 3D Silicon substrate—a source of structural robustness.

The Lithium species which assist/force the $Al_2O_3$ particles in migrating deeper into the silicon bulk are the Nitrogen containing, Li-conductive succinonitrile particles. The fact that nitrogen is more ubiquitous throughout the bulk 3D structure validated that succinonitrile acts as an electro-active diffusion/migration conduit for both Lithium species and $Al_2O_3$.

The chemical composition of the cross section 950 illustrated the silicon-electrode-self-pulverization-suppression mechanism of the $Al_2O_3$ particles. This enables a stronger anode 177 surface that prevents pulverization especially when the $Al_2O_3$ particles are combined with Succinonitrile, Li-conductive and Li-Species.

FIG. 10 is a transmission electron micrograph (TEM) 1100 of the active silicon region of the same sample used in FIGS. 9A and 9B The TEM is from a portion of an enlarged textured porous silicon disc (15.5 mm diameter) representative of cells with an anode layered in the 3D trench (PAL cell) only. After greater than 250 operational current charge/discharge cycles the TEM 1100 displays the peaks 1110 and valleys 1120 of the 3D porous silicon patterning/texturing still intact and greater than 2 microns 1130 of stable dense Lithium-Silicon species 1140 residing below the 3D textured porous silicon.

Delineated track pathways 1150 from mobilized Al2O3 particles are observed, as indicated with the dashed arrows 1160, typically. The line across the silicon/aluminum/lithium interface 1170 displays the spatial area where EDS spectra was collected. The solid arrow 1180 displays the region of interest (a cylindrical 3D band) which is shown to be protruding, towards the viewer and which spans the length of the Si/Al/Li interface.

The approximately 2 um layer of dense lithiated silicon is observed 1140, directly beneath the surface of the textured porous silicon, as imaged via the TEM 1100 and shown with the 2 micron long scale bar 1130. Vertical tracks 1150 are seen delineating the migration pathway of the Al2O3 particles into the silicon substrate, in parallel with $Li^+$ and SN (as shown via the integration of SN into the silicon), upon progressive cycling, where the delineated track span the entire depth of the Li—Si dense species 1140—as indicated by the dashed arrow, typically 1160. Where Braga et al. was able to illustrate progressive electrochemical accessibility of Li+ in electrodes via SN, here the same mechanism, yet in a silicon electrode system and with the addition of Al2O3 particle mobility. Further, in the present invention, the succinonitrile also facilitates electro-active diffusion and migration of both lithium and Al2O3 particles deeper into the silicon bulk proportionally with progressive cycling. In this way, the concerted solid polymer electrolyte deep pore saturation, while carrying lithium ions and lithiated Al2O3 particles, allows increased electrochemical access to deeper regions of the silicon substrate where those new areas are prevented from silicon pulverization upon long term cycling due to the transported Al2O3 particles. Thus, additives in the entire silicon surface create a mechanical "cap" that holds the silicon substrate together, while also facilitating a mobile Al2O3 particle mechanism which prevents silicon mechanical failure when lithiated.

Less than a micron below the lithiated silicon, there is a band of highly concentrated Al2O3 which is presumably densely lithiated—as indicated by the micrograph 1100 contrast and pointed out with the large arrow 1180. EDS line spectra, where the spatial area and distance covered in obtaining the EDS spectra is shown by the line spanning across the Si-interface 1170.

FIG. 11A is a plot of the quantitative results from an EDS line spectra 1170 shown in FIG. 10, displaying the relative concentrations of silicon 1150A and aluminum 1150B as measured from the bottom portion of the line 1170. The black arrow 1160A in FIGS. 11A and 11B points out the relative local maxima of Aluminum concentration which corresponds to the of black arrow 1180 in FIG. 10 which correlates with a 3D protruding layer spanning the length of the Si/Al/Li interface.

FIG. 11B is a plot displaying an augmented portion (Y-axis, counts, expanded) of the FIG. 11A plot of the quantitative results from the EDS line spectra 1170, displaying the relative concentrations of silicon 1150A and aluminum 1150B as measured from the bottom portion (0 nm position=600 nm depth below the Si/Al/Li interface) of the line 1170. The black arrow 1160A displays the relative local maxima of Aluminum concentration which correlates with a 3D protruding layer spanning the length of the Si/Al/Li interface-indicating that the 3D protruding layer has a high concentration of aluminum.

FIGS. 11A and 11B shown the results of the EDS line spectra shown in FIG. 10—where position 0 on the graphs indicates a depth of 600 nm into the silicon substrate and position 600 nm indicates the surface position at a depth of 0 nm. The concentrations of both silicon 1150A and aluminum 1150B are displayed for both FIGS. 11A (1160A) and 11B (1160A), where FIG. 11B is an augmented version of FIG. 11A in order to highlight the relative concentration of Aluminum at various depths. In fact, at roughly 500 nm of depth, as indicated by the black arrows in all 3 Figures (and aligning with the dense 3D band protruding from the TEM, towards the viewer), we observe the aluminum concentration increases to approximately three-times the surrounding local concentration 1160A.

Hence, clearly, the Al2O3 deposited layer is creating a large semi-mobilized highly lithiated concentration of coordinated Li-Al2O3 within a micron below the Silicon surface. Further, as more lithium diffuses into the silicon system and more Li—Si species are created, Al2O3 particles are further lithiated and mobilized by the Li-ion/SN electrode-penetrating system. What the Al2O3 particles do to the system as they traverse deeper in the silicon substrate is the focus of FIGS. 12A, 12B, and 12C.

FIG. 12A is a low magnification SEM cross section of the bulk active silicon region 1200 from a portion of an enlarged textured porous silicon disc (15.5 mm diameter) representative of cells with an anode layered 910 in the 3D trench only, e.g. a PAL cell, after greater than 250 operational current charge/discharge cycles.

FIG. 12A displays the lithiation of the silicon bulk throughout 1210. A 100 micron scale bar 1220 is shown for reference and a double sided arrow 1230 indicates a continuous crack 1230 through approximately the middle of the lithiated silicon substrate.

FIG. 12B is a high magnification SEM cross section of the bulk active silicon region 1200. Enlarged, lithiated Al2O3 particles 1250 can be observed bridging the crack 1230 in 3 distinct locations, and in a periodic effect (bridging particles indicated with dashed arrows). A 10 micron scale bar 1260 is shown for reference and a dashed box 1270 indicates the bridging Al2O3 particle 1270A highlighted in FIG. 12C.

FIG. 12C is a high magnification SEM of the area 1270. The enlarged, lithiated Al2O3 particle 1270A can be observed bridging the crack 1230/1280, and mechanically binding the two separate sides together. The lithiated Al2O3 particle is 4.4 microns 1270B by 1.4 microns 1270C in dimension.

When a defect forms, such as a crack 1280 in the silicon substrate, mobile $Al_2O_3$ particles nucleate at the high energy defect sites, creating a mechanical bridging effect across defect sites. In parallel with the mobile Al2O3 particles the electro-mobile Li+ and SN pathways are observed as the spiderweb like features randomly penetrating the substrate in FIG. 12A, FIG. 12B and FIG. 12C. As the cell is cycled and the substrate repeatedly expands and contracts, Al2O3 particles become spatially larger as the particles are further lithiated and agglomerated. Not only do Al2O3 particles prevent the mechanical degradation of the substrate through the "bridging" type mechanism displayed here, but as the Al2O3 particle sizes become larger, they implement volume induced-stress compensation, acting as "spacers" embedded within the silicon substrate. Therefore, the Al2O3 particles enables the silicon substrate to maintain a low resistive, high mechanical adhesion within the silicon bulk during extended charge and discharge processes.

Hence, lithiated $Al_2O_3$ acts as:
1. a top robust, electrochemically conductive cap which binds together the anode 177 materials below and above it, with flexible properties.
2. 2.structural support elements which prevent the bulk of the silicon-based electrode material (160, 160A) from self-pulverizing when the silicon material experiences considerable volume changes (like steel rods in concrete).
3. a mobile structural support additive which translates through silicon media as facilitated by mobile lithium conductive and/or lithium-containing species, as these species translate/diffuse/migrate deeper into the silicon electrode.
4. Since it is known that succinonitrile saturates newly formed defects in the silicon bulk (e.g., cracks, voids, etc. as shown with attached reference and because in the present invention SN is Li-conductive and mobilizes Li-species which "push" or "carry" $Al_2O_3$ particles, both $Al_2O_3$ and Li-species saturate new defect sites.
5. At the $Al_2O_3$ and SN saturated defect sites, as more Li-ions are mobilized into these sites, more Lithium plates around the $Al_2O_3$ sites. This effectively creates a structural stabilizing mechanism for the defect site, similar to steel pylons (steel poles) inserted into concrete. The $Al_2O_3$ particles are like the support structures (pylons) and the plated Lithium around the $Al_2O_3$ particles is the "glue" (or concrete in our analogy) and therefore the defect site is held together by this cooperative, multistep mechanism between SN, $Al_2O_3$, Li-ions and Li-plating on $Al_2O_3$. This mechanism allows for the defect site to not self-pulverize due to the presence of $Al_2O_3$.
6. As Lithium-encapsulated $Al_2O_3$ particles 1250 move deeper into the substrate, the $Al_2O_3$ particles 1250 increase in size as more and more lithium is coordinating with Al2O3 with cycling and every "push" or "carry" of $Al_2O_3$ particles 1250 deeper into the substrate. The size of the $Al_2O_3$ particles 1250 as they move deeper into the substrate, for a given area, is proportional with the current density observed through that portion of the electrode and/or to the initial loading of $Al_2O_3$ particles 1250 on the top active silicon surface.
7. The $Al_2O_3$ particles 1270A "heal" any cracks or defects 1230 which are created as the Lithium "front-line" penetrates deeper into the substrate. FIG. 12C shows this explicitly—as the $Al_2O_3$ particles 1270A bridge two sections of a cleaved silicon surface-thereby keeping resistance of the cell low, preventing Si-pulverization and preventing cell failure.

FIG. 13A is an SEM cross section 1300A of a LMOF/SPE composite electrode 1310 calendered with an SPE saturated PAN separator 1320, in this case resulting in approximately 114 micron thick 1330 composite cathode and separator structure. The inset 1331 displays a high magnification SEM cross section of an LMOF particle 1340 which is approximately 453 nm in height 1350 entirely saturated with solid polymer electrolyte (SPE) 1340A.

The LMOF/SPE composite is lithium manganese fluoride (LMOF) cathode 250 combined with a polycaprolactone (PCl), succinonitrile (SN) and Lithium bis(trifluoromethanesulfonyl)imide (LiTFSI) solid polymer electrolyte (SPE) 132, designated LMOF/SPE 1310. The scale bar 1320 displays the thickness (114 microns) of the uncompressed, yet flexible LMOF/SPE. The bottom portion 1330 of the cross section displays the SPE-saturated PAN separator 135 which adhered to the LMOF/SPE composite cathode 250. The inset 1331 displays a high magnification of one area of the composite cathode 250, displaying a given LMOF particle 1340, which is completely saturated by LMOF/SPE 1340A and is roughly 453 nm in diameter 1350.

FIG. 13B is an SEM cross section 1300B showing an aluminum foil 1360 laminated LMOF/SPE composite cathode 1370/250 with good adhesion to SPE 1380/132. The non-calendered form of the electrode 1370/250 displays excellent integration with current collector and polymer electrolyte.

FIG. 13C is a high magnification SEM cross section 1300C showing an LMOF/SPE composite cathode 1390 displaying excellent adhesion to SPE, where the approximate interface between the two materials is displayed with the dashed line 1395 showing seamless, low resistance integration of the two layers.

The well-formed integration of cathode 250 and electrolyte components 138 is critical to the high functioning, low resistance full microbattery cells. The LMOF/SPE composite cathode and SPE integration displays a cathode and electrolyte system where the resistance experienced by the cell (e.g., in voltage internal resistance drops, interfacial resistance, etc.) is minimized through the electrode and electrolyte integration materials and methods shown here.

FIG. 14A is a schematic of a coin cell 1400, 1410, 1410A used to benchmark the aluminum spacer 1420, conductive epoxy adhered 1430, aluminum metal laminated 1440 LMOF/SPE calendered composite cathode 1450 and SPE electrolyte 1460/PAN separator 1470 against a Li-metal 1480 anode compressed with stainless steel spacer 1490.

FIG. 14B is a series of Nyquist plots 1400B obtained from electrochemical impedance spectroscopy (EIS) of the cell shown in FIG. 14A which were obtained at 0V bias, 50 m V perturbation amplitude and over the frequency range of 1 MHz to 199 mHz. EIS spectra were obtained after the cell was progressively cycled to higher voltages and then discharged to 1.0V followed by a greater than 10 minute of rest time. The series of Nyquist plots illustrate the cell resistance decreasing from a 4.3V upper charge limit 1410B to 4.8V upper charge limit 1420B, followed by an increase in cell resistance when charged to 5.0V 1430B and even further increase in cell resistance when charged to 5.3 V upper voltage limit. Hence, the LMOF/SPE and SPE electrolyte combination displays a very high upper voltage limit of 4.8V prior to cell degradation and increased resistance.

FIG. 14C is an SEM cross section 1400C of a representative silicon packaged 1410C microbattery used in the current invention, after a few charge & discharge current cycles. The top cathode, cathode current collector and separator portion of the cell has been removed in order to illustrate the hardening effect of the Li-conductive plasticizer component of the SPE 1420C, succinonitrile (SN). upon electrochemical charge and discharge. Hence, the novel SPE formulation used in the current study enables high ionic conductive Li-mobile capability while the "hardening" effect suppresses the formation and degradation effects of Li-metal dendrites-thereby serving as an excellent SPE to be used for in-situ plating of Li-metal.

Figure 15A:
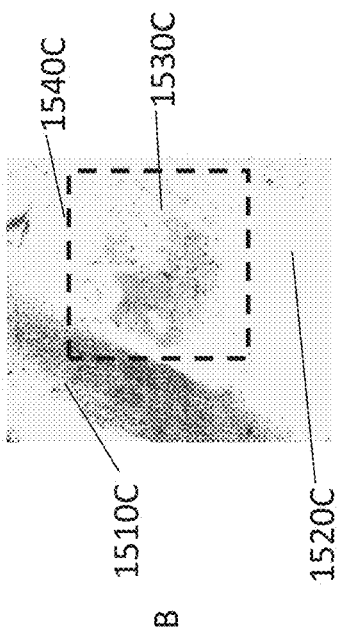
FIG. 15A is the post-cycled aluminum current collector adhered LMOF/SPE composite electrode of a P cell showing a significant portion of the original LMOF/SPE composite cathode remaining on both the field portion and an overlaying active trench region with little to no plated Li-metal replacing the LMOF/SPE composite cathode.

FIG. 15A is a micrograph 1500A of a post-cycled Aluminum current collector 1510 adhered LMOF/SPE composite electrode of cell P (no aluminum oxide additive; trench only anode) displaying a relatively significant portion of the original LMOF/SPE composite cathode 250 remaining on both the field 1520/156 portion and the overlaying active trench region 1530/150 as outlined by the 1 mm×1 mm area of the 3D well 1540; with little to no plated Li-metal replacing the LMOF/SPE composite cathode.

Figure 15B:
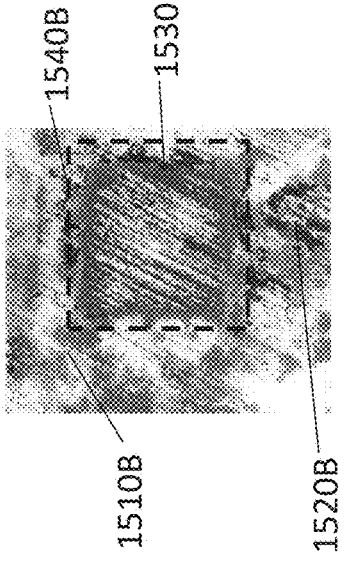
FIG. 15B is the post-cycled aluminum current collector adhered LMOF/SPE composite electrode of a PAL cell showing a reduced portion of the original LMOF/SPE composite cathode remaining on both the field portion and the overlaying active trench region with some Li-metal replacing the LMOF/SPE composite cathode.

FIG. 15B is a micrograph 1500B of the post-cycled Aluminum current collector 1510B adhered LMOF/SPE composite electrode of a cell PAL (trench only patterned anode with aluminum oxide additive) displaying a reduced portion of the original LMOF/SPE composite cathode remaining on both the field 1520B/156 portion and the overlaying active trench region 1530B/150 as outlined by the 1 mm×1 mm area of the 3D well 1540B; some Li-metal replacing the LMOF/SPE composite cathode.

Figure 15C:
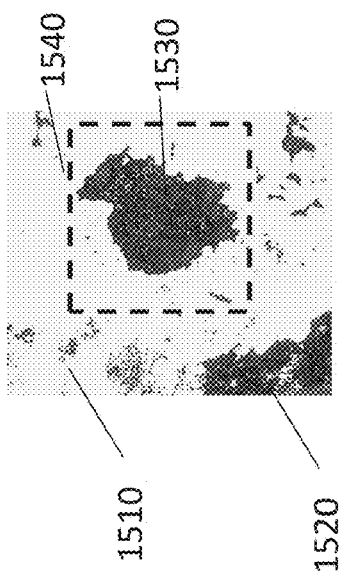
FIG. 15C is the post-cycled aluminum current collector adhered LMOF/SPE composite electrode of a PAH cell showing no portion of the original LMOF/SPE composite cathode remaining on both the field portion and the overlaying active trench region where the Li-metal has virtually replaced all the LMOF/SPE composite cathode.

FIG. 15C is the post-cycled Aluminum current collector 1510C adhered LMOF/SPE composite electrode of cell PAH shown in the current invention; displaying a no portion of the original LMOF/SPE composite cathode remaining on both the field 1520C portion and the overlaying active trench region 1530C as outlined by the 1 mm×1 mm area of the 3D well 1540C, Li-metal has virtually replaced all the LMOF/SPE composite cathode.

The arrow 1550 illustrates an increase in Li-metal replacement of the LMOF/SPE electrode moving from left to right and coinciding with the progression from P to PAL to PAH—as dependent on the relative presence of Al2O3 (not present in P). When the anode location is only in the trench as in the P and PAL cell, there is low Li-metal field 156 formation 130 and minimization of in-situ Li-metal replacement of LMOF/SPE composite cathode during cycling. In the PAH cell where the anode is located both in trench 150 and on field 156, there is a high Li-metal field formation 130 and a maximization of in-situ Li-metal replacement of LMOF/SPE composite cathode during cycling.

Figure 16B:
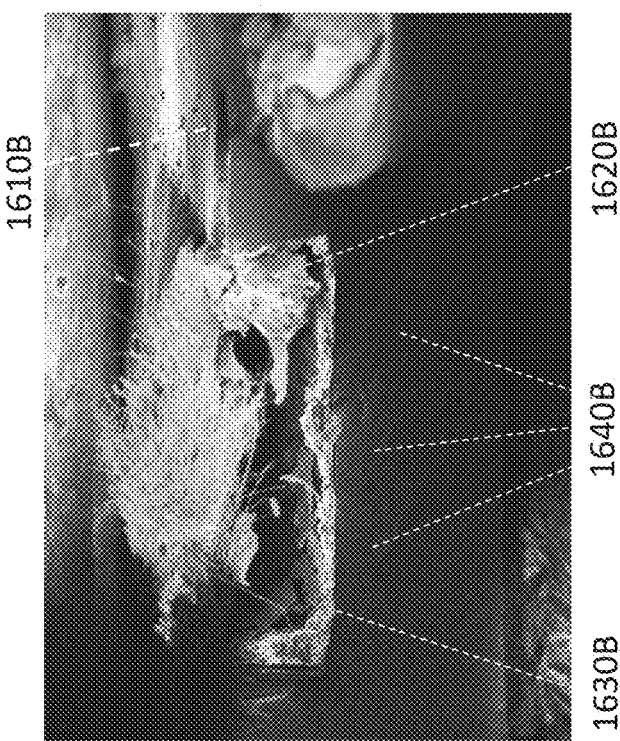
FIG. 16B is the post cycled SEM cross section of PAH cell illustrating a thick Li-metal field layer, as discussed in FIGS. 8B1 and 8B2, and No Li—Si type charge storage in the bulk silicon substrate while possessing a thick Li-metal layer at Si-trench base interface, as discussed in FIGS. 8A and 8A1.
Figure 16A:
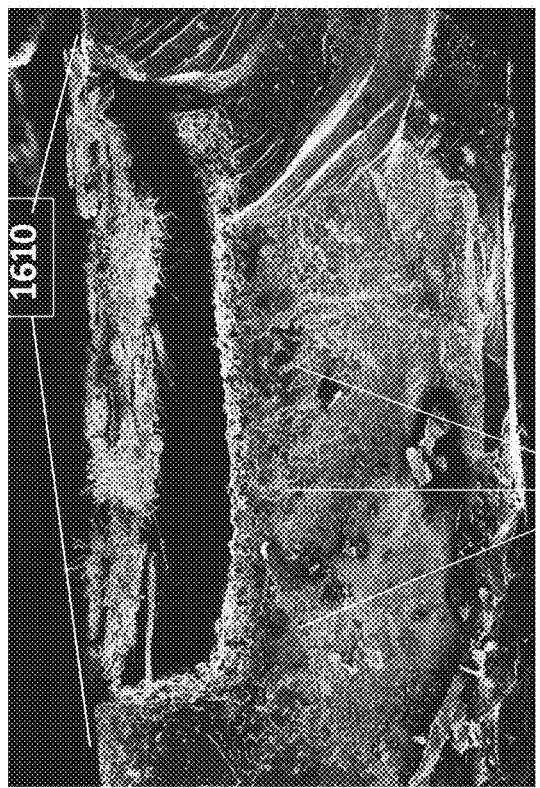
FIG. 16A is the post cycled SEM cross section of PAL cell illustrating no Li-metal field layer and significant Li—Si type charge storage in the bulk silicon substrate while possessing a thin Li-metal layer at Si-trench base interface, as discussed in FIGS. 6A and 6A1.

FIG. 16A is the post cycled SEM cross section of PAL 1600 (anode located only in 3D trench with aluminum oxide additive) used in the current invention illustrating no Li-metal field layer 1610 and significant Li—Si type charge storage in the bulk silicon substrate 1620 (as seen with spiderweb like features in silicon bulk) while possessing a thin Li-metal layer at Si-trench base interface, as discussed in FIGS. 6A and 6A1.

FIG. 16B is the post cycled SEM cross section of PAH 1600B (anode located both in-trench, on the sidewalls 151, and on field 156, with aluminum oxide additive) illustrating significantly thick Li-metal field layer 1610B/130 (as also discussed in FIG. 8B1, FIG. 8B2 and FIG. 8B3) along with significant sidewall 1620B/426 and trench base 1630B/140 Li-metal plating and virtually no Li—Si type charge storage in the bulk silicon substrate 1640B (no contrasting spiderweb like features) while possessing a thick Li-metal layer at Si-trench base interface, as discussed in FIGS. 8A and 8A1.

Figure 17A:
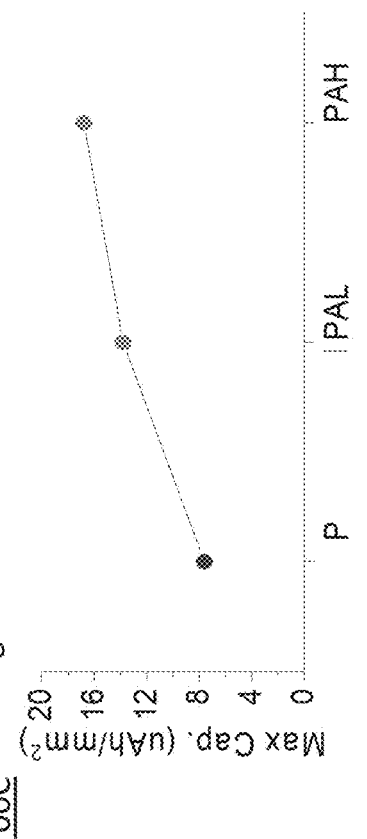
FIG. 17A is a plot illustrating the average working voltage during discharge current cycling 1700 for P, PAL, and PAH microbattery cells.

FIG. 17A is a plot 1700 illustrating the average working voltage during discharge current cycling 1700A for example P, PAL and PAH microbattery cells. The average working voltage decreases in proportion to the amount of Li-metal plated in the system and on opposing electrodes (as discussed in FIGS. 15A, 15B, and 15C)—illustrating a decrease in average working voltage as the microbattery decreases the inherent potential difference between the two electrodes as the microbattery becomes more of a Li-metal symmetric type cell (in-situ formed Li-metal cell symmetry: P<PAL<PAH), in-situ, as a consequence of repeated current cycling.

Figure 17B:
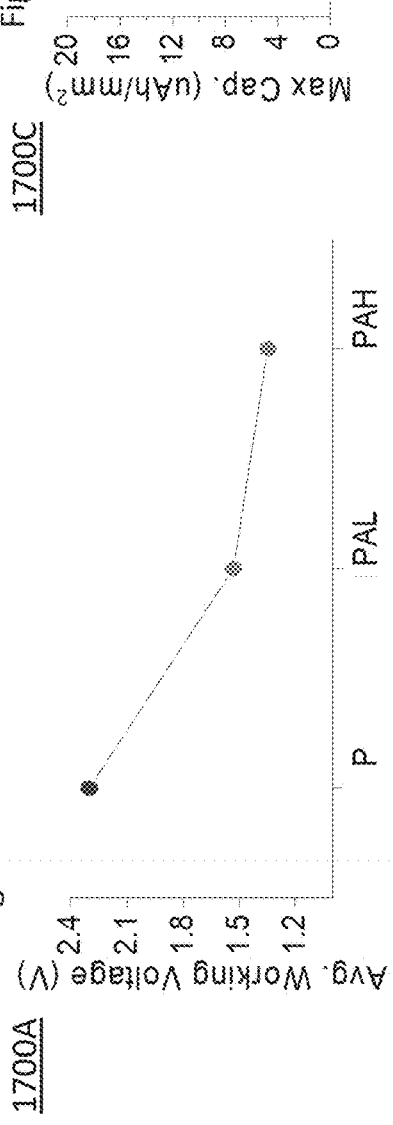
FIG. 17B is a plot illustrating the average open circuit voltage, after charging and prior to discharge current cycling for P, PAL, and PAH microbattery cells.

FIG. 17B is a plot 1700B illustrating the average open circuit voltage, after charging and prior to discharge current cycling 1700B for example P, PAL and PAH microbattery cells. The average open circuit voltage, after charging and prior to discharge decreases in proportion to the amount of Li-metal plated in the system and on opposing electrodes (as discussed in FIGS. 15A, 15B, and 15C)—illustrating a decrease in average open circuit voltage prior to discharge as the microbattery decreases the inherent potential difference between the two electrodes as the microbattery becomes more of a Li-metal symmetric type cell (in-situ formed Li-metal cell symmetry. P<PAL<PAH), in-situ, as a consequence of repeated current cycling.

Figure 17C:
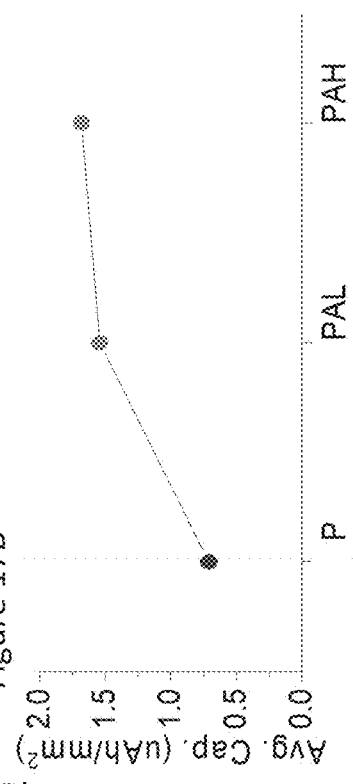
FIG. 17C is a plot illustrating the maximum discharge capacity for P, PAL, and PAH microbattery cells.

FIG. 17C is a plot 1700C illustrating the maximum discharge capacity for each cell 1700C, illustrating that the greater concentration of Li—Si (PAL) or Li-metal (PAH) plated in-situ within the microbattery enables a higher discharge capacity: P<PAL<PAH microbattery cells.

The PAL lasted 271 cycles and PAH lasted only 208 cycles. In addition, the high energy density and areal capacity of Li-metal benchmarking is illustrated by the most Li-metal containing cell (PAH; ~16.8 uAh/mm$^2$). However, the reliability and high capacity quality of PAL (~13.8 uAh/mm$^2$), where Li-metal is only employed mostly as an interfacial stabilizer, in conjunction with aluminum oxide, and where Li—Si is the primary form of charge storage—illustrates that the substrate enabled, silicon active device in the current invention, rivals the highest capacity enabled by the benchmarking in-situ Li-metal system.

Figure 17D:
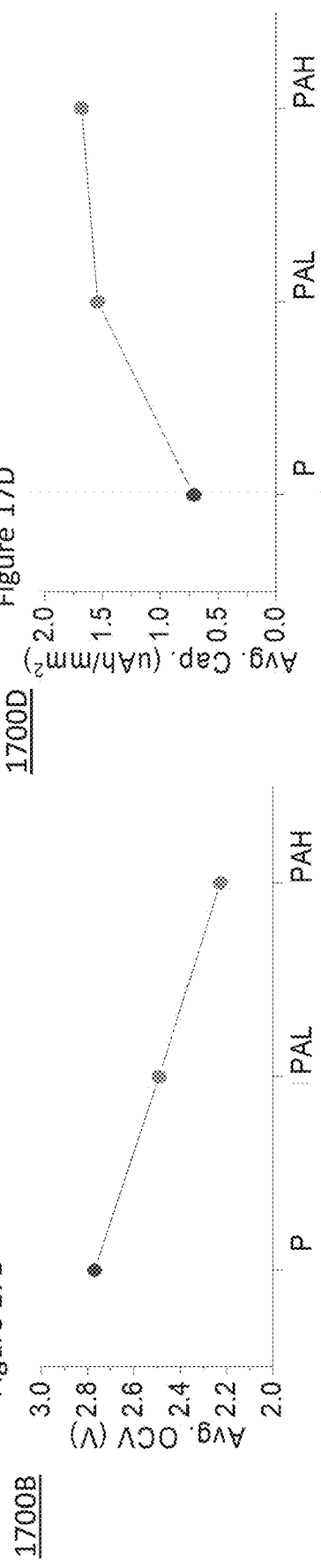
FIG. 17D is a plot illustrating the average discharge capacity P, PAL, and PAH microbattery cells.

FIG. 17D is a plot 1700D illustrating the average discharge capacity for each example cell over 200 charge discharge cycles (note that the P cell only lasted 60 cycles and therefore the P cell average discharge capacity is only averaged over 60 cycles), illustrating that the greater concentration of Li—Si (PAL cell) or Li-metal (PAH cell) plated in-situ within the microbattery enables a higher average discharge capacity: the P cell<PAL cell<PAH cell microbattery cells.

FIG. 18A is a plot 1800A of the initial charge 1810 (Charged to 3.1V using 20 uA of applied current) and discharge 1820 (Discharged to 0.02 V using 3 uA of applied current) profile plots of an example P cell, showing a combined intercalation and plating type charge storage profile and a discharge profile illustrating characteristic bi-modal humps/plateaus of Li-ions intercalating/inserting into LMOF active cathode material. No degradation of electrodes or expected change in this charge/discharge voltage profile is observed.

FIG. 18B is a plot 1800B of the initial charge 1810B (Charged to 3.1V using 10 uA of applied current) and discharge 1820B (Discharged to 0.01V using 3 uA of applied current) profile plots of an example PAL cell, showing a combined Li-Graphite intercalation, Li—Si insertion, Al2O3 layer encapsulation with lithium metal and plating type charge storage profile where the Li-Al2O3 encapsulation creates repeated drops in voltage (Li-metal formation around Al2O3) with fast recoveries to higher voltage which illustrate continued Li—Si type insertion.

FIG. 18B1 is a plot 1800B1 of the initial discharge profile 1820B1 illustrating a fast Li-metal plating mechanism (Voltage drops to low values quickly) against the aluminum current collector/LMOF-SPE composite cathode where the total discharge time (<400s) illustrates a high irreversible capacity due to significant Li-metal plating/Al2O3 encapsulation and Li—Si insertion during the initial charge cycle.

FIG. 18C is a plot of the initial charge 1810C (Charged to 3.1 V using 20 uA of applied current) and discharge 1820C (Discharged to 0.02 V using 3 uA of applied current) profile plots of PAH, showing a combined Li-Graphite intercalation, with lithium metal and plating type charge storage profile on $Al_2O_3$/Si surface with no $Al_2O_3$ encapsulation nor Li—Si type insertion.

FIG. 18C1 is a plot of the initial discharge profile 1820C1 illustrating a fast Li-metal plating mechanism (Voltage drops to low values quickly) against the aluminum current collector/LMOF-SPE composite cathode where the total discharge time (<200s) illustrates a high irreversible capacity due to significant Li-metal plating during the initial charge cycle.

FIG. 19A is a plot 1900 of the maximum charge 1910 (Charged to 5.0V using 40 uA of applied current) and discharge 1920 (Discharged to 0.5 V using 4 uA of applied current) profile plots of a P cell, showing initially a small horizontal plateau indicated a minimal degree of Li-metal plating between the LiTFSI-PANI and Si surface, with some degree of high/low voltage perturbations which indicate minima loading of lithium as Li—Si type charge storage in the silicon bulk, followed by a very sloped charge storage profile indicating the highly polarized but relatively short lived charge storage at the in-situ formed Li-metal/LiTFSI-PANI interface via the presence of capacitor type charge storage. A discharge profile 1920 illustrating characteristic bi-modal humps/plateaus of Li-ions intercalating/inserting into LMOF active cathode material.

FIG. 19B is a plot 1900B of the maximum charge 1910B (Charged to 4.6V using 40 uA of applied current) and discharge 1920B (Discharged to 1V using 5 uA of applied current) profile plots of a PAL cell, showing initially an elongated horizontal plateau indicated a significant degree of Li-metal plating between the LiTFSI-PANI and Si surface, with a high degree of high/low voltage perturbations which indicate a high loading of lithium via Li—Si type charge storage in the silicon bulk, followed by a gently sloped charge storage profile indicating the combined polarized charge storage at the in-situ formed Li-metal/LiTFSI-PANI interface with the presence of more capacitor type charge storage during insertion/intercalation of forming Li—Si in the silicon bulk. A discharge profile 1920B illustrates characteristic bi-modal humps/plateaus of Li-ions intercalating/inserting into LMOF active cathode material along with some Lithium metal plating on Aluminum at voltages less than 1.5 V.

FIG. 19C is a plot 1900C of the maximum charge 1910C (Charged to 4.2V using 30 uA of applied current) and discharge 1920C (Discharged to 1V using 14 uA of applied current) profile plots of a PAH cell, showing only an elongated horizontal plateau indicating only Li-metal plating between the LiTFSI-PANI and Si surface, with a no high/low voltage perturbations indicating no loading of lithium via Li—Si type charge storage in the silicon bulk. A discharge profile 1920C illustrates only Li-metal plating on the aluminum cathode current collector as we observe an immediate voltage drop upon discharge to 1.5V and the characteristic horizontal plating profile thereafter.

FIG. 20A is a plot 2000 of the long term cycling discharge capacity plot in uAh/mm$^2$ for a P cell illustrating only a single local maxima of high discharge capacity followed by an exponential decay type curve which never recovers to another high local maxima. This indicates irreversible cell failure (at 60 cycles) due to the initial (only) high capacity charge storage event and failure of the cell due to the resulting high resistance resulting from silicon defect creation and silicon interfacial mechanical separation during high charge loading.

FIG. 20B is a plot of the long term cycling discharge capacity plot in uAh/mm$^2$ for the first 200 cycles of a PAL cell, illustrating continuous local maxima of high discharge capacity followed by exponential decay type curves of varying length and slopes, where the decay curves always recover to another high local maxima. This indicates sustainable high capacity rechargeable cell performance (271 total cycles) due to the Si-pulverization prevention mechanism enabled by the Al2O3 3D textured Si additive. Both mobile (into the silicon bulk) and static (cap) forms of Al2O3, as discussed in above, enable Si-protection in the Li—Si type charge storage full cell.

FIG. 20C is a plot of the long term cycling discharge capacity plot in uAh/mm$^2$ for the first 200 cycles of a PAH cell, illustrating continuous local maxima of high discharge capacity, with an early stage high capacity series of discharges (cycles ~15 to 20; all yielding 16.8 uAh/mm$^2$) due to high Li-metal plating primarily on the 2D anode patterned field portion of the substrate, followed by exponential decay type curves of varying length and slopes, where the decay curves always recover to another high local maxima. This indicates sustainable high capacity rechargeable cell performance (208 total cycles) due to the Si-pulverization prevention mechanism enabled by the Al2O3 3D textured Si additive, primarily the static (cap) form of Al2O3 enables Si-protection in the in-situ symmetric Li-metal full cell.

Figure 21C:
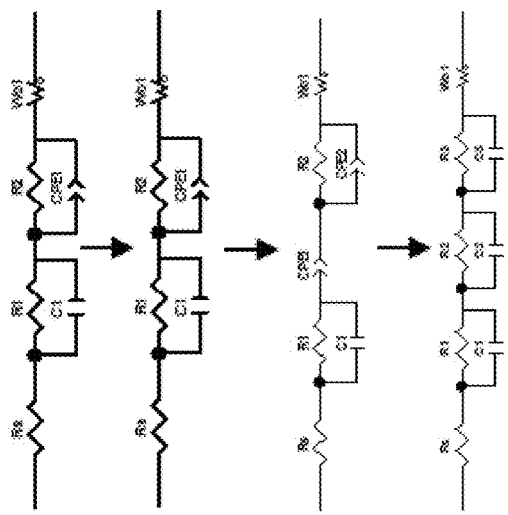
FIG. 21C displays the RC models used to model the capacitor (C), resistor (R), constant phase elements (CPE) and Warburg impedance (W) elements utilized in extracting quantitative values extracted from a PAH cell EIS spectra which generated Nyquist plots during 4 distinct life cycle stages: Pre-cycle, prior to maximum capacity, after maximum capacity and at the end of cell life cycle—as represented by the RC models moving top to bottom.
Figure 21B:
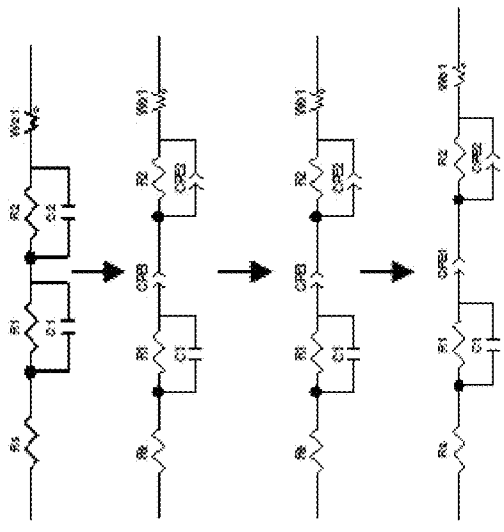
FIG. 21B displays the RC models used to model the capacitor (C), resistor (R), constant phase elements (CPE) and Warburg impedance (W) elements utilized in extracting quantitative values extracted from a PAL cell EIS spectra which generated Nyquist plots during 4 distinct life cycle stages: Pre-cycle, prior to maximum capacity, after maximum capacity and at the end of cell life cycle—as represented by the RC models moving top to bottom.
Figure 21A:
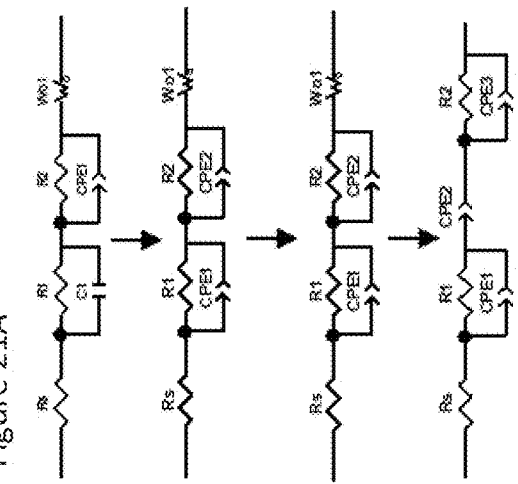
FIG. 21A displays the RC models used to model the capacitor (C), resistor (R), constant phase elements (CPE) and Warburg impedance (W) elements utilized in extracting quantitative values from a P cell's Electrochemical Impedance Spectroscopy (EIS) spectra which generated Nyquist plots during 4 distinct life cycle stages: Pre-cycle, prior to maximum capacity, after maximum capacity and at the end of cell life cycle—as represented by the RC models moving top to bottom.

FIG. 21A displays the RC models used to model the capacitor (C), resistor (R), constant phase elements (CPE) and Warburg impedance (W) elements representing quantitative values extracted from a P cell EIS generated Nyquist plots during 4 distinct life cycle stages: Pre-cycle, prior to maximum capacity, after maximum capacity and at the end of cell life cycle—as represented by the RC models moving top to bottom.

FIG. 21B displays the RC models used to model the capacitor (C), resistor (R), constant phase elements (CPE) and Warburg impedance (W) elements representing quantitative values extracted from a PAL cell EIS generated Nyquist plots during 4 distinct life cycle stages: Pre-cycle, prior to maximum capacity, after maximum capacity and at the end of cell life cycle—as represented by the RC models moving top to bottom.

FIG. 21C displays the RC models used to model the capacitor (C), resistor (R), constant phase elements (CPE) and Warburg impedance (W) elements representing quantitative values extracted from PAH cell EIS generated Nyquist plots during 4 distinct life cycle stages: Pre-cycle, prior to maximum capacity, after maximum capacity and at the end of cell life cycle—as represented by the RC models moving top to bottom.

Figure 22C:
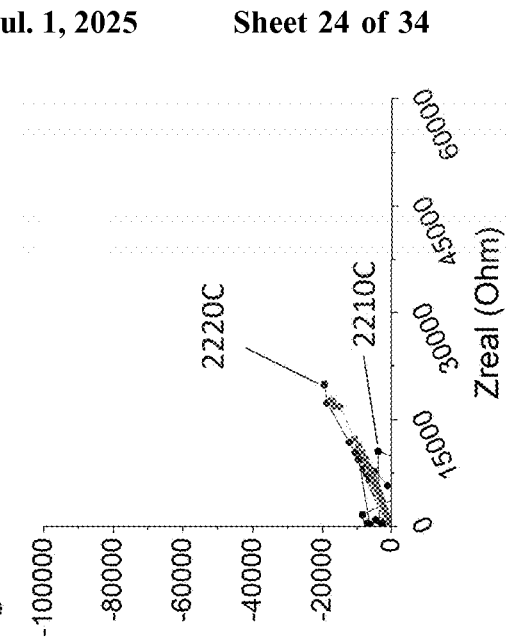
FIG. 22C displays the Nyquist plots of a PAH cell acquired via EIS at the 4 distinct life cycle stages: Pre-cycle, prior to maximum capacity, after maximum capacity and at the end of cell life cycle.
Figure 22B:
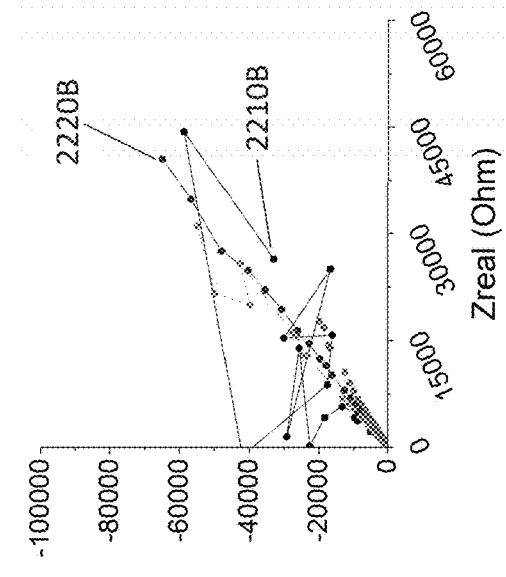
FIG. 22B displays the Nyquist plots of a PAL cell acquired via EIS at the 4 distinct life cycle stages: Pre-cycle, prior to maximum capacity, after maximum capacity and at the end of cell life cycle.
Figure 22A:
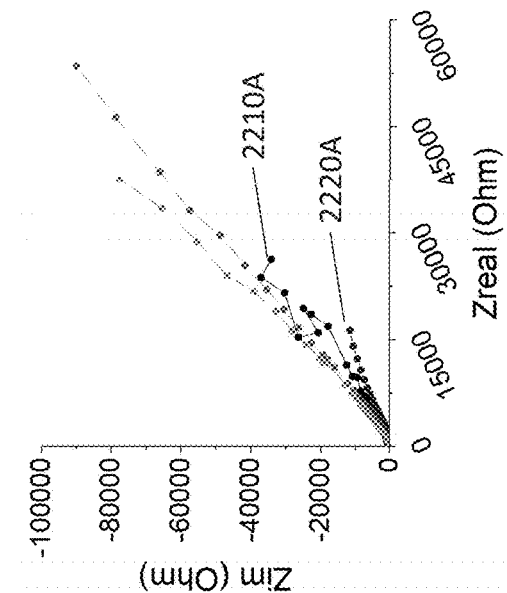
FIG. 22A displays the Nyquist plots of a P cell acquired via EIS at the 4 distinct life cycle stages: Pre-cycle, prior to maximum capacity, after maximum capacity and at the end of cell life cycle.

FIG. 22A displays the Nyquist plots of a P cell acquired via EIS at the 4 distinct life cycle stages: Pre-cycle 2210A, prior to maximum capacity, after maximum capacity and at the end of cell life cycle 2220A. EIS spectra were obtained using a 50 mV perturbation voltage, at 0V bias voltage over the frequency range 1 MHz to 199 mHz, upon discharge and sufficient rest time.

FIG. 22B displays the Nyquist plots of a PAL cell acquired via EIS at the 4 distinct life cycle stages: Pre-cycle 221 OB, prior to maximum capacity, after maximum capacity and at the end of cell life cycle 2220B. EIS spectra were obtained using a 50 mV perturbation voltage, at 0V bias voltage over the frequency range 1 MHz to 199 mHz, upon discharge and sufficient rest time.

FIG. 22C displays the Nyquist plots of a PAH cell acquired via EIS at the 4 distinct life cycle stages: Pre-cycle 2210C, prior to maximum capacity, after maximum capacity and at the end of cell life cycle 2220C. EIS spectra were obtained using a 50 mV perturbation voltage, at 0V bias voltage over the frequency range 1 MHz to 199 mHz, upon discharge and sufficient rest time.

The overall decrease in, primarily, composite cathode induced cell resistance can be broadly observed between the 3 systems as evidenced by the smaller sized Nyquist plots. Composite cathode resistance are where the P cell>PAL cell>PAH cell.

FIG. 23A is a plot that displays an augmented portion of the full Nyquist plots of a P cell shown in FIG. 22A, highlighting the high and mid-frequency (greater than 1 Hz) regions of each EIS spectra acquired at the 4 distinct life cycle stages: Pre-cycle 2310A, prior to maximum capacity, after maximum capacity, and at the end of cell life cycle 2320A.

FIG. 23B is a plot that displays an augmented portion of the full Nyquist plots of a PAL cell shown in FIG. 22B, highlighting the high and mid-frequency (greater than 1 Hz) regions of each EIS spectra acquired at the 4 distinct life cycle stages: Pre-cycle 2310B, prior to maximum capacity, after maximum capacity, and at the end of cell life cycle 2320B.

FIG. 23C is a plot that displays an augmented portion of the full Nyquist plots of a PAH cell shown in FIG. 22C, highlighting the high and mid-frequency (greater than 1 Hz) regions of each EIS spectra acquired at the 4 distinct life cycle stages: Pre-cycle 2310C, prior to maximum capacity, after maximum capacity, and at the end of cell life cycle 2320C.

The general trend of the high/mid resistance responding composite anode can be observed between the 3 sets of Nyquist plots where the P cell>PAH cell>PAL cell.

FIG. 24A displays the average resistivity values (normalized to the square area of the cathode for each cell) of all 4 EIS spectra acquisition stages of an example P cell, PAL cell, and PAH cell during their cycle life. Cycle-life average series resistance (Rs), a composite anode resistance (R1) and composite cathode resistance (R2) are displayed quantitatively. Rs and R2 values decrease in the order. P cell>PAL cell>PAH cell indicating that the internal resistance and composite cathode resistance of the microbattery cells decreases as the cell becomes more Li-metal symmetric. R1 values decrease in the order: the P cell>PAH cell>PAL cell indicating that the composite anode resistance of the microbattery cells decreases as the cell becomes more Li-metal symmetric (5.9 ohms*cm$^2$), yet decreases significantly further with the seamless integration of the Li/Al$_2$O$_3$/Si composite electrode which enables sustainable Li—Si type charge storage (2.8 ohms*cm$^2$).

FIG. 24B is an SEM cross section, taken post cycle-life of a PAL cell, showing the composite anode at the active silicon interface taken showing base of the 3D silicon trench where the top surface is the composite graphite/LiTFSI-PANI/Li-metal displaying seamless integration with the bulk silicon interface 2410B when the anode is patterned only in the 3D trench, where below this interface we observe Li-metal, Li—Si species and their associated Li+ conductive, electro-mobile pathways 2420B. This illustrates the physical evidence for the resistivity being less than half the trench+sidewall+field patterned for PAH cell microbattery.

FIG. 24C is an SEM cross section, taken post cycle-life of a PAH cell, showing the composite anode at the active silicon interface where the top surface is the composite graphite/LiTFSI-PANI/Li-metal displaying a void-containing, higher resistance interface induced by cleaving of the cell. This illustrates weaker mechanical integration of the deposited anode material with the bulk silicon interface 2410C when the anode is patterned not only in the 3D silicon trench but additionally when the anode is patterned on the sidewalls and field regions. Below this interface we observe virtually no Li-metal, Li—Si species nor their associated Li+ conductive, electro-mobile pathways 2420B-illustrating the physical evidence for the resistivity being more than 2× higher than the trench-only patterned PAL cell microbattery.

FIG. 25A a plot displaying the average capacitance values (normalized to the square area of the cathode for each cell) of all 4 EIS spectra acquisition stages of an example P cell, PAL cell, and PAH cell during their cycle life. Cycle-life average capacitance of the composite anode capacitance (C1) and composite cathode capacitance (C2) are displayed quantitatively. The average capacitance values representing the composite anode (C1) display nearly 2 orders of magnitude increase when Al2O3 is added to the Si-substrate-indicating the sustainable use of the active silicon substrate enables significant increases in capacitance charge storage for both Li—Si and Li-metal plating charge storage systems.

FIG. 25B is an SEM cross section, taken post cycle-life of a PAL cell, showing the aluminum current collector which initially had the LMOF/SPE composite cathode adhered to it. The 3D textured Aluminum/Li/LMOF-SPE surface observed post-cycling displays higher surface area than the PAH cell analog (due to incomplete transformation of the LMOF/SPE cathode to Li-metal)—and therefore supports the higher (C2 PAL) capacitance value observed in FIG. 25A.

FIG. 25C is an SEM cross section, taken post cycle-life of a PAH cell showing the aluminum current collector which initially had the LMOF/SPE composite cathode adhered to it. As observed here, at the end of the cell's cycle life, the 2D very smooth Aluminum/Li-plated surface observed post-cycling displays lower surface area than the PAL cell (due complete transformation of the LMOF/SPE cathode to Li-metal)—and therefore supports the lower capacitance value observed in FIG. 25A.

Figure 26:
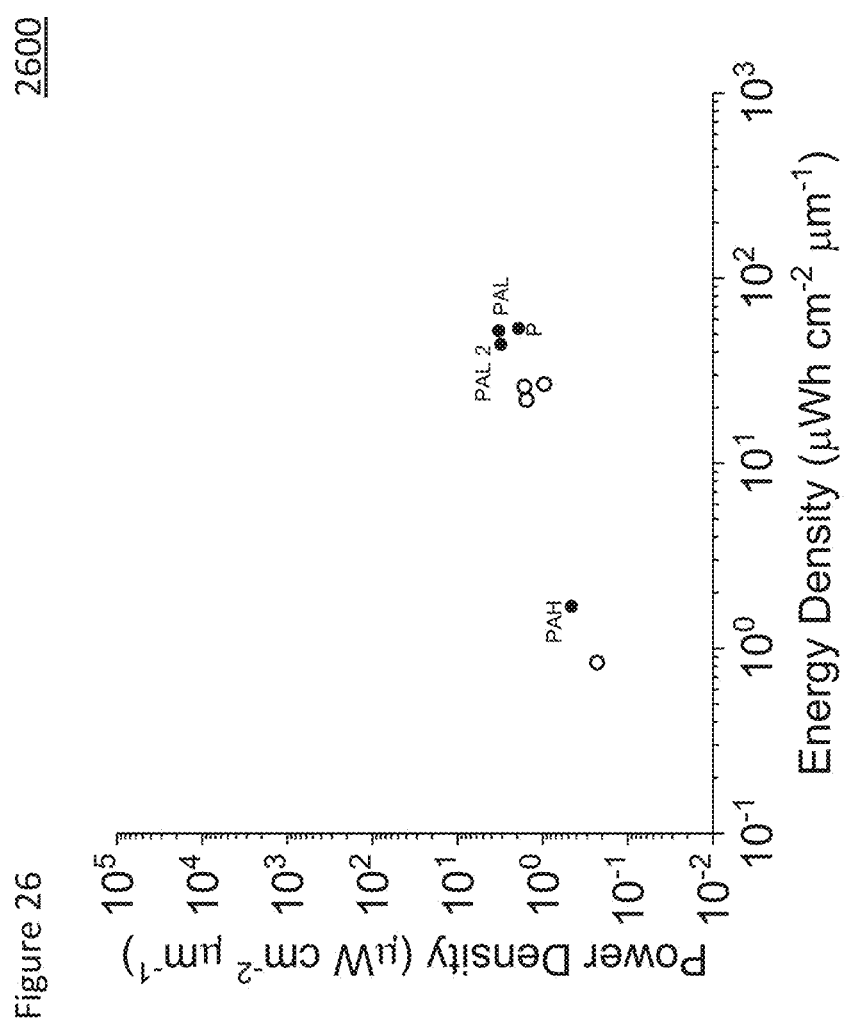
FIG. 26 is the Ragone plot illustrating the volumetric energy density vs the volumetric power density of P, PAL, and PAH cells.

FIG. 26 is the Ragone plot illustrating the volumetric energy density vs the volumetric power density of a P cell, PAL cell, and PAH cell where other commercial and state of the art microbatteries are displayed for comparison. The P, PAL, PAH cells provide a unique combination of high energy density and high-power density, topping out at 53 uWh cm-2 um-1 and 2.9 uWcm-2 um-1, respectively—filling a relatively high power and energy density gap unseen from comparable commercial and state of the art microbattery technology. The trench-only patterned anode design produces consistently (as displayed with 2 different trench-only anode patterned microbatteries: a PAL cell and PAL2 cell) high energy and power dense microbatteries which can have greater than 4× the cycle life of the non-$Al_2O_3$ containing analog (P cell). Whereas wide layering of the anode across both 2D and 3D surfaces (PAH cell) produces a far greater Li-metal dense and symmetric microbattery-yielding over twice the power density of the trench-only, non-$Al_2O_3$ containing anode patterned microbattery, P cell, when adjusted for the same active anode area (Ragone plot displays values normalized to active anode area—as shown in FIG. 27).

FIG. 27 is the quantitative table 2700 associated with the Ragone plot in FIG. 26 illustrating the volumetric energy density, the volumetric power density, C-Rate, active anode used in the density calculations and the maximum (conservative) and minimum (best case) values used as thickness values in calculating the density values of the P cell, PAL cell, and PAH cell.

The table of calculated volumetric energy and power density for the P cell, PAL cell, PAL2 cell, and PAH cell at both best case and conservative value estimates. Due to difficulties in measuring the active material thickness from deconstructed full cells, the table shows both the conservative active material thickness (entire thickness of all active+inactive cell) estimates (800 microns) of our microbattery cells as well as best case estimate of 400 um (estimated active cell component only). Values calculated for wide patterned anode via cm2 area of trench-overlaying+field-residing LMOF/SPE composite electrode multiplied by conservative or best-case thicknesses. Values calculated for trench-only patterned anode via cm2 area of trench-overlaying LMOF/SPE composite electrode multiplied by conservative or best-case thicknesses.

Figure 28C:
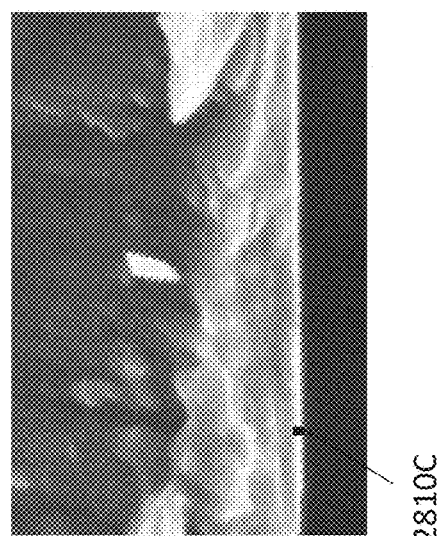
FIG. 28C is a higher magnification SEM cross section of the highlighted region in FIG. 28B highlighting the thin Li-metal layer adhered to the dense, solidified LiTFSI-PANI layer.
Figure 28B:
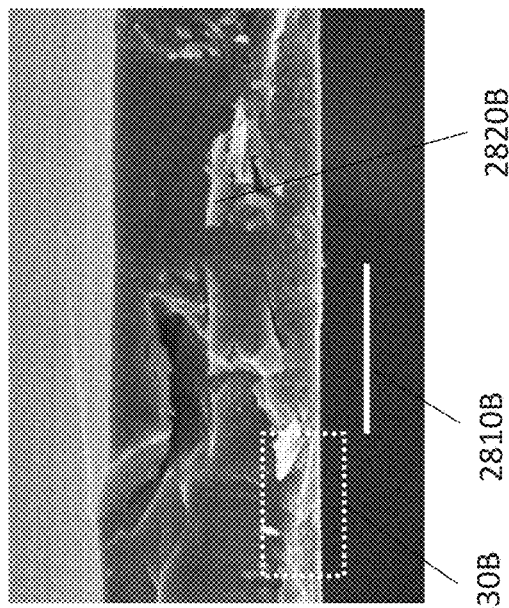
FIG. 28B is a higher magnification SEM cross section of a P cell highlighting the dense, hardened LiTFSI-PANI layer.
Figure 28A:
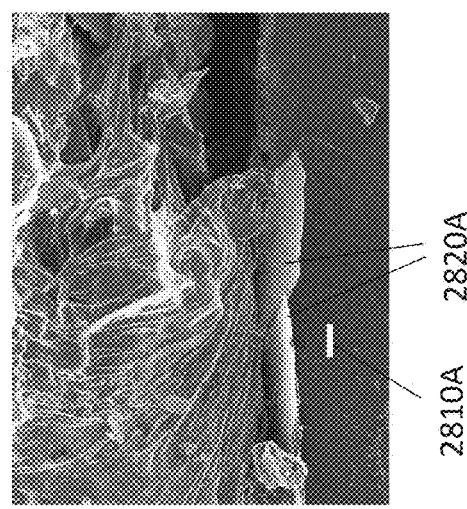
FIG. 28A is the post-cycled SEM cross section of a P cell showing a 10 micron scale bar where the cross section cleaving process displays a very dense, solidified LiTFSI-PANI layer between SPE/graphite mixture and silicon bulk layers.

FIG. 28A is the post-cycled SEM cross section of a P cell showing a 10 micron scale bar 2810A where the cross section cleaving process displays a very dense, solidified LiTFSI-PANI layer 2820A between SPE/graphite mixture and silicon bulk layers. The hardened, dense LiTFSI-PANI layer from the P cell (non-Al2O3 containing, trench only layered anode cell) displays poor adhesion and integration with the active silicon surface—with brittle mechanical properties which cause the interface to experience high resistance.

FIG. 28B is a higher magnification SEM cross section of the P cell highlighting the dense, hardened LiTFSI-PANI layer with a 1 micron scale bar 2810B where a very dense, solidified LiTFSI-PANI layer 2820A is observed protruding from above the Si-interface where a region 2830B is further highlighted for analysis in FIG. 28C.

FIG. 28C is a higher magnification SEM cross section of the highlighted region in P cell 2830B further highlighting the dense, hardened LiTFSI-PANI layer and the very thin (19 nm) sized Li-metal layer 2810C which was grown in-situ between the LiTFSI-PANI/Si interface. Such a thin Li-metal layer results from the inability of the LiTFSI-PANI layer to adhere and integrate well with the active silicon electrode, as no Al2O3 is present to enable the Li-metal encapsulated "anchor" effect which the Al2O3 additive enables for the active Si-trench base, when employed. Hence, with no anchor effect, Li-metal plating ceases as the LiTFSI-PANI becomes detached from the source of electrons (the silicon surface). Subsequent charging of the cell results in a more densely Li-concentrated LiTFSI-PANI layer, resulting in the brittle, hardened, densified interlayer properties observed here.

Figure 29B:
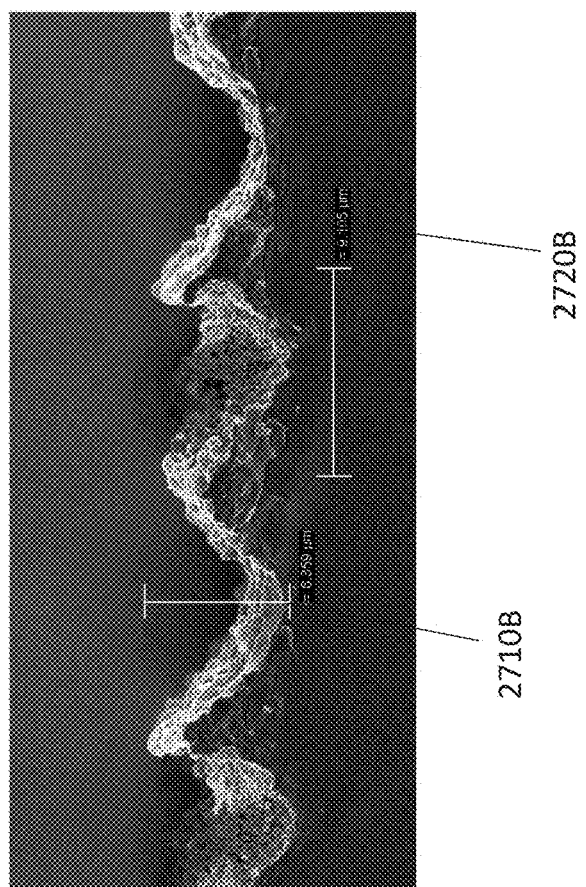
FIG. 29B is a higher magnification SEM cross section of FIG. 29A displaying the 3D porous peaks and valley created from the laser ablation texturing process-displaying a peak height of 6.3 microns and a peak pitch of 9.1 microns.
Figure 29A:
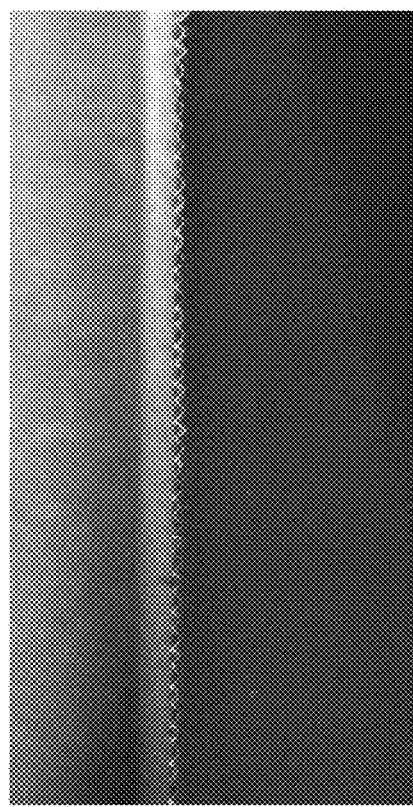
FIG. 29A is an SEM cross section of laser ablation created 3D porous silicon textured at the base of the 3D 1 mm×1 mm square trench-displaying consistent 3D Si-texturing throughout the trench base.

FIG. 29A is an SEM cross section of laser ablation created 3D porous silicon textured 225 at the base of the 3D 1 mm×1 mm square trench-displaying consistent 3D Si-texturing throughout the trench base.

FIG. 29B is a higher magnification SEM cross section of FIG. 29A displaying the 3D porous peaks and valley 225 created from the laser ablation texturing process-displaying a peak height 2710B of 6.3 microns and a peak pitch 2720B of 9.1 microns.

FIG. 30A is an SEM cross section showing a top Si-only surface 3110A, the silicon bulk under the top surface 3120A, the interface between the two regions 3130A and the line 3140A which maps the trajectory for the EDS line spectra utilized for obtaining EDS spectra of FIG. 31B.

FIG. 30B is the EDS line spectra from the cross section shown in FIG. 30A showing the relative elemental concentrations of silicon, carbon, aluminum and oxygen (displayed as horizontal line spectra in that order) via a top Si-only surface 3110B, the silicon bulk under the top surface 3120B, the interface between the two regions 3130B-illustrating the presence of significant Al concentration, as Al has higher concentration than oxygen throughout the active silicon bulk.

FIG. 30C shows the X-ray reflection spectra of the sample shown/used in FIGS. 30A and 30B where very subtle fringe lattice features (3110C, 3120C, 3130C) highlighted with downward vertical arrows.

Figure 31:
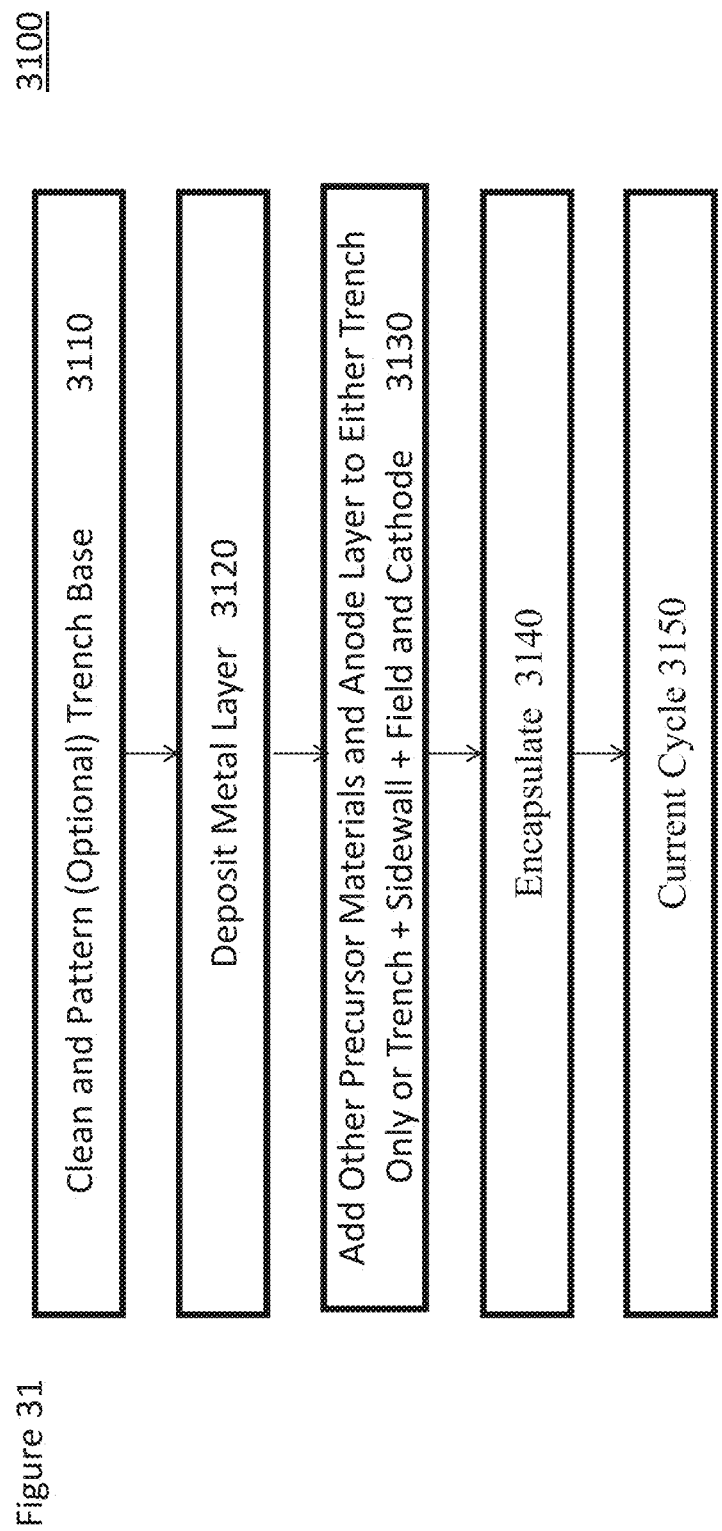
FIG. 31 is a flow chart showing the steps of one embodiment of a process for making an energy storage device.

FIG. 31 is a flow chart showing the steps of one embodiment of a process 3100 for making an energy storage device.

Step 3110 of the process 3100 begins with the substrates 160 being fabricated from a p+ high Boron-doped (~1E19) 200 mm silicon wafer using a single mask with the following general steps:
1) Full Huang Clean+Spin, rinse and drying (SRD).
2) Thermal Growth of approximately 1 micron thermal oxide.
3) Removal of back side oxide via HF.
4) Spin on 10 micron photoresist (AZ4620 MUV Resist)—expose and develop Mask.
5) Reactive Ion Etch (RIE) to remove patterned thick oxide.
6) RIE (BOSCH Process) to etch and planarize the Silicon trenches.
7) Wet and dry strips to remove photoresist and clean wafer.
8) Second thermal oxide growth to insulate 3D trench sidewalls 154.
9) Maskless RIE process to open oxide at 3D trench base 271.

The trench base 271 is cleaned, as described above. For example, any insulation, e.g. 154, is etched away using known processes like a combined laser ablation and dilute HF (hydrofluoric acid) exposure followed by drying. This increase the electrochemically accessible silicon surface area for later lithiation of the substrate 160A.

Optionally, the trench base 271 can be patterned. The optional 3D silicon texturing/patterning 225 and porosity tuning was performed in the center of the trenches using a Talisker Ultra picosecond laser (wavelength of 355 um at 0.8 W at 200 Khz or 0.4 uJ/pulse; 5 pulse per second pulses; spot size of 15 um). A raster spacing range from 8 um to 25 um was explored as well as single direction scans, rotated overlays, and multiple repeats.

In step 3120, a metal layer is optionally deposited over the patterned (or non-patterned) trench base 271, and on the insulation layers) 154 adhered to the trench sidewalls 150 and substrate field 156 using known deposition methods. In some embodiments, Aluminum Oxide ($Al_2O_3$) is deposited to a thickness between 0.1 nm and 0.7 nm. In some embodiments the thickness of the $Al_2O_3$ layer 165 is 0.5 nm. Other metals layers are envisioned, e.g. Niobium oxides.

In one non-limiting example, samples were cleaned with diluted hydrofluoric acid (HF). Atomic Layer Deposition (ALD) was performed on a Cambridge NanoTech Inc. tool (Savannah 100 & 200 system) at 250 C and low vacuum. Pulses of 15 milli second (ms) pulse width of Trimethyl Aluminum were administered, followed by 15 second wait time, then 15 ms pulse width of water was administered, followed by another 15 second wait time. The above steps were repeated 5 times for the target 5 Angstrom (0.5 nm) $Al_2O_3$ deposition thickness.

In step 3130 the remaining precursors are added to the trench 150. Namely, the anode is patterned either only within the trench 150 and in contact with the active silicon trench base 271 or within the trench 150 and in contact with the active silicon trench base 271 and on the insulation layers) 154 adhered to the trench sidewalls 150 and substrate field 156.

For example, a LiTFSI-PANI interfacial additive (for example, formed in polymer adhesive layer 170) was applied via spin-coating or micro-pipetting, air dried, and crosslinked between 120C-160C for 3-10 minutes. A graphite slurry (graphite particles in an N-Methyl-2-pyrrolidone (NMP), Polyvinylidene fluoride (PVDF) and conductive carbon mixture) was applied via spin-coating or micropipetting, air drying, and compression into the trenches with custom stainless-steel 3D molds. Chiplets were diced at various stages and sizes depending on the experiment. The polymer electrolyte was then deposited by either casting, pipetting or spin coating, followed by and polyacrylonitrile (PAN) separator components and then another layer of the polymer electrolyte. The PAN separator was placed in direct contact with the conductive adhesive and carbon material layered field and over the 3D trench. LMOF/SPE composite cathode material which was laminated to an Aluminum current collector. Component assembly into stainless steel coin-cells was conducted inside a glovebox as necessary for environmental control. Aluminum and stainless-steel spacers and springs were used to establish mechanical pressure and interlayer contact within the coin cell and optionally, conductive silver epoxy was utilized to conductively attach the backside of the silicon substrate to the inner surface of the coin cell.

The Polyacrylnitrile (PAN) separator 135 was produced by an electrospinning method. A 10 wt % PAN (Mw 150,000, Sigma Aldrich) was dissolved in DMF.

Electrospinning was performed by utilizing an 18 kV voltage, a feeding rate of 3 ml/hour, and an aluminum foil on a rotating drum as the collector. Five hours of electrospinning was performed to achieve a fibermat thickness about 70 microns, prior to integration or calendering.

The polyaniline (PANI) emeraldine base (Molecular weight 10,000, 90 milligram, mg), trifluoromethanesulfinimide (270 mg), lithium bis(trifluoromethanesulfonyl)imide (LiTFSI) (30 mg) and hexafluoro-2-propanol solvent (7 milliliter, mL) were mixed to form the additive.

In one embodiment, the LMOF used in the cathode 180 was synthesized via an all solid state ball mill reaction: $LiMnO_2$ ($Mn^{+3}$)+$LiF \rightarrow Li_2MnO_2F$ ($Mn^{+3}$). The LiF, $Li_2O$ and $LiMnO_2$ precursors were combined in a 2:1:1 molar ratio. SPE 132 was made briefly by mixing Polycaprolactone (PCl; Average molecular weight (Mn)=80 000, Aldrich) Succinonitrile (SN; 99% purity, Aldrich), and Lithium bis (trifluoromethanesulfonyl)imide (LiTFSI; 99% purity, J&K Chemical) in mass ratio of PCL/SN/LiTFSI of 20:10:18 with anhydrous acetonitrile in two steps. The composite LMOF/SPE cathode material was formulated with 70% LMOF, 15% SPE, 10% conductive additive (e.g., carbon black) and 5% PVDF. The resulting slurry was casted on aluminum foil (16 um thick) with a casting tool to obtain the desired dried thickness. The dried electrodes were optionally calendered together with a PAN separator.

In step 3140 the device is encapsulated using known methods such as coin cell encapsulation via a crimping process.

In step 3150 the device is current cycled for the in-situ formation process during initial cycling and tested for extended cycle life performance.

Figure 32:
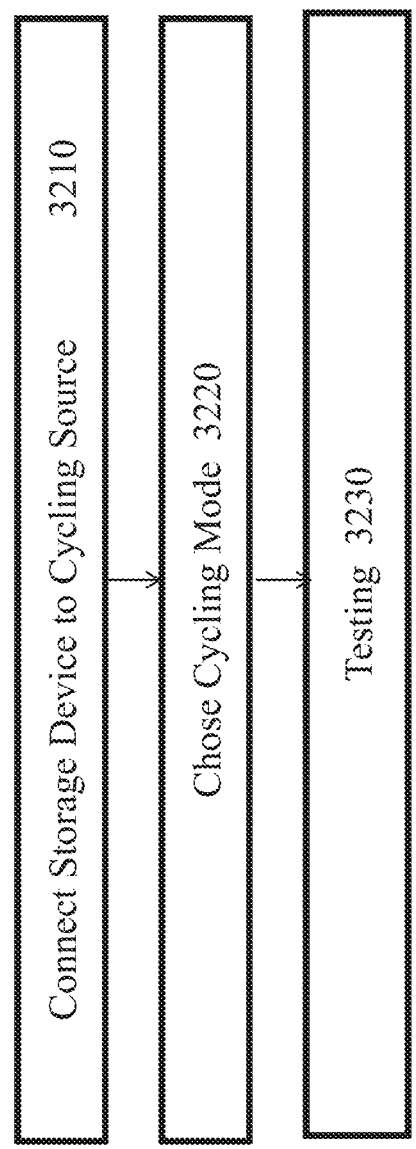
FIG. 32 is a flow chart showing a process of current cycling a battery.

FIG. 32 is a flow chart showing the steps of one embodiment of current cycling and testing 3200 an energy storage device.

In step 3210, the full coin cells, i.e. encapsulated devices, connected to a current source. In an example embodiment, the current source was a multichannel Arbin battery testing tool in galvanostatic mode.

In step 3220, the initial charge cycling mode was chosen, as described above, to aid in desired cell operational performance.

Cells were cycled without charge saturation steps. Low rate of initial charge cycling was less than 10 uA/mm$^2$ normalized to the active silicon trench base area. High rate of initial charge cycling was greater than 20 uA/mm$^2$ normalized to the active silicon trench base area. Initial discharge current cycling used was typically 3 uAh/mm$^2$ normalized to the active silicon trench base area.

In other embodiments low rate initial charge cycling was between 1 to 15 uA/mm$^2$ normalized to the active silicon trench base area. In other embodiments, high rate initial charge cycling was between 15 to 30 uA/mm$^2$ normalized to the active silicon trench base area.

Testing is done in step 3230. One example testing sequence conducted an electrochemical impedance spectroscopy on both the uncycled and cycled coin cells using a Parstat 4000 potentiostat using with a 50 mV excitation amplitude over a 1 MHz to 199 mHz frequency range. Cells were given enough time for equilibrium voltages to obtain less than 500 uV of voltage drift prior to conducting EIS measurements. EIS spectra were taken at different stages of various cell's cycle-life (e.g., pre-cycle, early cycle, mid cycle, and end of cycle life).

Additional electrochemical testing conditions, cell performance and properties are also displayed in the tables below.

Example properties of cell types P, PAL, and PAH are given in the table below.

| Property | Type P | Type PAL | Type PAH |
|---|---|---|---|
| LMOF Cathode Size (mm2) | 11.7 | 10.1 | 10.1 |
| Average Upper Voltage Cutoff (V) | 5.10 | 4.95 | 4.77 |
| Average Lower Voltage Cutoff (V) | 0.79 | 0.95 | 0.93 |
| Average Discharge Current (μAmp) | −5.3 | −8.4 | −13.8 |
| Average Charge Current (μAmp) | 45.1 | 14.1 | 14.2 |

Discharge capacity for the microbatteries was calculated by dividing the uAh of discharge cycle by the square area of the cell cathode in centimeters. Energy density was calculated by taking the Coulombs ($(dq=I*dt)$) for each time point (dt) in the discharge curve and multiplying by the corresponding incremental voltage (dV). The sum of these incremental products is the total energy of the discharge, which was then divided by the square area of the active anode times the height of the active cell. The power was calculated by the product of the incremental voltage and applied current (dV*I) for each increment in the discharge curve. The representative power was taken as the average power over the entire discharge curve. The average was then divided by the square area of the active anode times the height of the active cell. Areas used in calculating the energy and power densities were based on the patterned active anode area, since the patterned anode area and cathode plating varied so widely between P, PAL, PAL2, and PAH cells. In order to represent realistic energy density and power density values for both types of anode patterned microbatteries, both conservative (800 ums) and best case (400 ums) were utilized as cell heights in calculating the volume of the cell due to the fact that the silicon substrate is virtually inactive in trench+field anode patterning (PAH) yet active in trench only anode patterning (PAL). The following table presents energy density and power density information for the three cell types (P, A, and S) at two active layer 160A thicknesses.

For both SEM-EDS and transmission electron micrograph-EDS (TEM-EDS) techniques, samples were prepared using a FEI Helios dual beam FIB, using low energy finish polishing techniques. TEM was acquired on a 300 kV JEOL FE TEM, using an EMISPEC EDS system. SEM was performed on a Zeiss LEO SEM using a Brucker EDS system operated at lower energies so as not to have excessive depth penetration.

Atomic Layer Deposition (ALD) was performed on a Cambridge NanoTech Inc. tool (Savannah 100 & 200 system) at 250° C. and low vacuum. Pulses of 15 ms pulse width of trimethyl aluminum were administered, followed by 15s wait time, then 15 ms pulse width of water was administered, followed by another 15s wait time. The above steps were repeated 5 times for the target 0.5 nm $Al_2O_3$ deposition thickness.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The terminology used herein was chosen to explain the principles of the embodiments and the practical application or technical improvement over technologies found in the marketplace or to otherwise enable others of ordinary skill in the art to understand the embodiments disclosed herein. Devices, components, elements, features, apparatus, systems, structures, techniques, and methods described with different terminology that perform substantially the same function, work in the substantial the same way, have substantially the same use, and/or perform the similar steps are contemplated as embodiments of this invention.

We claim:

1. A method of making an energy storage device compromising:

cutting or etching one or more trenches in a silicon substrate, each of the trenches having a trench base, the silicon substrate having an electrically active surface at one or more of the trench bases, the trenches having one or more sidewalls, and the silicon substrate having one or more field regions outside of the trench bases;

depositing one or more layers of insulator on the sidewalls;

removing the one or more layers of insulator from the electrically active surface at the trench base; and forming a layer of lithium-encapsulated aluminum oxide (Li—$Al_2O_3$) particles on the electrically active surface, wherein the forming comprises:
   depositing $Al_2O_3$ particles directly on the electrically active surface;
   depositing one or more precursor materials into the trench on the $Al_2O_3$ particles, where depositing the precursor materials in the trench includes depositing lithium bis(trifluoromethanesulfonyl)imide (LiTFSI); and
   cycling a current through the energy storage device to encapsulate the $Al_2O_3$ particles in lithium.

2. The method, as in claim 1, further comprising a step of texturing and creating porosity in the electrically active surface, to create a 3D textured surface on the electrically active surface, before depositing the $Al_2O_3$ particles.

3. The method, as in claim 2, where the step of texturing and creating porosity is performed via laser ablation where the porosity is created in the 3D textured surface and into the silicon substrate.

4. The method, as in claim 2, where the 3D textured surface has one or more features with a pitch between 1 micron and 25 microns and a depth between 0.5 micron and 20 microns.

5. The method, as in claim 2, where the 3D textured surface determines one or more operational characteristics of the energy storage device.

6. The method, as in claim 5, where the layer of Li—$Al_2O_3$ particles is patterned only within the trench and on top of the 3D textured surface.

7. The method, as in claim 5, where the layer of Li—$Al_2O_3$ particles is patterned in the trench and on top of the 3D textured surface, the layers of insulator, and the field regions.

8. The method, as in claim 5, where one of the operational characteristics is the layer of Li—$Al_2O_3$ particles protecting the substrate from degradation being a lithium metal anode layer made of lithium metal, created upon electrochemical formation on the active surface.

9. The method, as in claim 2, wherein the step of texturing and creating porosity in the electrically active surface is performed before the depositing the $Al_2O_3$ particles.

10. The method, as in claim 1, where the $Al_2O_3$ particles are deposited to a thickness between 0.1 nanometer (nm) and 0.7 nm.

11. The method, as in claim 1, where one of the precursor materials is a solid polymer electrolyte (SPE) that further comprises a separator that is saturated and surrounded by the SPE.

12. The method, as in claim 11, where the separator is a dielectric material that is conductive for Lithium ions and not conductive for electrons.

13. The method, as in claim 12, where the SPE saturated dielectric material is in contact with a conductive adhesive or a carbon-based material which is attached to the electrically active silicon trench base.

14. The method, as in claim 1, where the $Al_2O_3$ particles are deposited to a thickness between 0.1 nanometer (nm) and 0.5 nm.

15. The method, as in claim 1, where the $Al_2O_3$ particles are deposited to a thickness of 0.5 nm.

16. The method, as in claim 1, wherein the $Al_2O_3$ particles have an average size between 6 nm and 20 nm in diameter.

17. The method, as in claim 16, wherein the current is cycled such that the lithium encapsulating the $Al_2O_3$ particles has an average size between 8 nm and 15 nm.

18. The method, as in claim 1, wherein the layer of Li—$Al_2O_3$ particles includes spaces between the Li—$Al_2O_3$ particles that are larger than 2 nm.

19. The method, as in claim 1, wherein the layer of Li—$Al_2O_3$ particles includes spaces between the Li—$Al_2O_3$ particles that are smaller than 2 nm.

20. The method, as in claim 1, wherein the removing the one or more layers of insulator comprises a combined laser ablation and dilute HF patterning process.

* * * * *